United States Patent
Ohta et al.

(10) Patent No.: US 10,150,033 B2
(45) Date of Patent: Dec. 11, 2018

(54) POSITION CALCULATION SYSTEM, POSITION CALCULATION DEVICE, STORAGE MEDIUM STORING POSITION CALCULATION PROGRAM, AND POSITION CALCULATION METHOD

(75) Inventors: Keizo Ohta, Kyoto (JP); Jun Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 639 days.

(21) Appl. No.: 13/209,756

(22) Filed: Aug. 15, 2011

(65) Prior Publication Data

US 2012/0044177 A1 Feb. 23, 2012

(30) Foreign Application Priority Data

Aug. 20, 2010 (JP) .................................. 2010-185315
May 30, 2011 (JP) .................................. 2011-120680
Jun. 6, 2011 (JP) .................................. 2011-126525

(51) Int. Cl.
*A63F 13/428* (2014.01)
*A63F 13/211* (2014.01)
(Continued)

(52) U.S. Cl.
CPC .......... *A63F 13/428* (2014.09); *A63F 13/211* (2014.09); *A63F 13/2145* (2014.09);
(Continued)

(58) Field of Classification Search
CPC ........ G06F 3/041; G06F 3/017; G06F 3/0346; G06F 3/013; G06F 3/038; G06F 3/0383; G06F 3/0412; G06F 3/0416; G06F 3/048–3/04815; G06F 3/0484–3/04845; G06F 3/0487; G06F 3/0488; G06F 3/14;
(Continued)

(56) References Cited

U.S. PATENT DOCUMENTS 4,210,329 A 7/1980 Steiger et al.
5,009,501 A 4/1991 Fenner et al.
(Continued)

FOREIGN PATENT DOCUMENTS

CN 1593709 3/2005
CN 1868244 11/2006
(Continued)

OTHER PUBLICATIONS

Apr. 26, 2012 Office Action for U.S. Appl. No. 13/019,928, 18 pages.
(Continued)

*Primary Examiner* — Nathan Danielsen
(74) *Attorney, Agent, or Firm* — Nixon & Vanderhye, P.C.

(57) ABSTRACT

An example position calculation system calculates a position in a three-dimensional virtual space based on an operation on a controller device. In the position calculation system, the position in the virtual space is calculated based on an attitude of the controller device and an input position on a predetermined input surface of the controller device. More specifically, the position calculation system may calculate, as the position in the virtual space, a position on a surface which is determined in accordance with the attitude of the controller device in the virtual space, based on the input position.

36 Claims, 40 Drawing Sheets

(51) Int. Cl.
*A63F 13/2145* (2014.01)
*G06F 3/0346* (2013.01)
*G06F 3/0488* (2013.01)
*A63F 13/22* (2014.01)
*A63F 13/5255* (2014.01)
*A63F 13/54* (2014.01)

(52) U.S. Cl.
CPC .......... *A63F 13/22* (2014.09); *A63F 13/5255* (2014.09); *A63F 13/54* (2014.09); *G06F 3/0346* (2013.01); *G06F 3/04886* (2013.01); *A63F 2300/1075* (2013.01); *A63F 2300/301* (2013.01); *A63F 2300/6045* (2013.01); *A63F 2300/6669* (2013.01); *A63F 2300/6676* (2013.01)

(58) Field of Classification Search
CPC ............... G06F 3/1454; G06F 3/147; G06F 2203/0383; G06F 2203/0384; G06F 2203/04802; G06F 2203/04808; G06F 2203/04809; G09G 5/00; G09G 2354/00; A63F 13/21; A63F 13/211; A63F 13/214; A63F 13/2145; A63F 13/22; A63F 13/42; A63F 13/426; A63F 13/428; A63F 13/525; A63F 13/5255; A63F 13/54; A63F 2300/1075; A63F 2300/301; A63F 2300/6045; A63F 2300/6669; A63F 2300/6676
USPC .............. 345/156–158, 168–169; 463/36–39
See application file for complete search history.

(56) References Cited

U.S. PATENT DOCUMENTS

| | | |
|---|---|---|
| 5,440,326 A | 8/1995 | Quinn |
| 5,452,104 A | 9/1995 | Lee |
| 5,602,566 A | 2/1997 | Motosyuku et al. |
| 5,608,449 A | 3/1997 | Swafford, Jr. et al. |
| 5,619,397 A | 4/1997 | Honda et al. |
| 5,820,462 A | 10/1998 | Yokoi et al. |
| 5,825,350 A | 10/1998 | Case, Jr. et al. |
| 5,825,352 A | 10/1998 | Bisset et al. |
| D411,530 S | 6/1999 | Carter et al. |
| 5,943,043 A | 8/1999 | Furuhata et al. |
| 6,020,891 A | 2/2000 | Rekimoto |
| 6,069,790 A | 5/2000 | Howell et al. |
| 6,084,584 A | 7/2000 | Nahi et al. |
| 6,084,594 A | 7/2000 | Goto |
| 6,104,380 A | 8/2000 | Stork et al. |
| 6,126,547 A | 10/2000 | Ishimoto |
| 6,164,808 A | 12/2000 | Shibata et al. |
| 6,183,365 B1 | 2/2001 | Tonomura et al. |
| 6,201,554 B1 | 3/2001 | Lands |
| 6,208,329 B1 | 3/2001 | Ballare |
| 6,238,291 B1 | 5/2001 | Fujimoto et al. |
| 6,252,153 B1 | 6/2001 | Toyama |
| 6,254,481 B1 | 7/2001 | Jaffe |
| 6,323,846 B1 | 11/2001 | Westerman et al. |
| 6,340,957 B1 | 1/2002 | Adler et al. |
| 6,347,290 B1 | 2/2002 | Bartlett |
| 6,379,249 B1 | 4/2002 | Satsukawa et al. |
| 6,396,480 B1 | 5/2002 | Schindler et al. |
| 6,400,376 B1 | 6/2002 | Singh et al. |
| 6,411,275 B1 | 6/2002 | Hedberg |
| 6,425,822 B1 | 7/2002 | Hayashida et al. |
| 6,466,198 B1 | 10/2002 | Feinstein |
| 6,466,831 B1 | 10/2002 | Shibata et al. |
| 6,498,860 B1 | 12/2002 | Sasaki et al. |
| 6,500,070 B1 | 12/2002 | Tomizawa et al. |
| 6,509,896 B1 | 1/2003 | Saikawa et al. |
| 6,538,636 B1 | 3/2003 | Harrison |
| 6,540,610 B2 | 4/2003 | Chatani |
| 6,540,614 B1 | 4/2003 | Nishino et al. |
| 6,557,001 B1 | 4/2003 | Dvir et al. |
| 6,567,068 B2 | 5/2003 | Rekimoto |
| 6,567,101 B1 | 5/2003 | Thomas |
| 6,567,984 B1 | 5/2003 | Allport |
| 6,570,557 B1 | 5/2003 | Westerman et al. |
| 6,582,299 B1 | 6/2003 | Matsuyama et al. |
| 6,657,627 B1 | 12/2003 | Wada et al. |
| 6,690,358 B2 | 2/2004 | Kaplan |
| 6,716,103 B1 | 4/2004 | Eck et al. |
| 6,798,429 B2 * | 9/2004 | Bradski ................. G06F 1/1626 345/156 |
| 6,834,249 B2 | 12/2004 | Orchard |
| 6,847,351 B2 | 1/2005 | Noguera |
| 6,856,259 B1 | 2/2005 | Sharp |
| 6,888,536 B2 | 5/2005 | Westerman et al. |
| 6,897,833 B1 | 5/2005 | Robinson et al. |
| 6,933,923 B2 | 5/2005 | Feinstein |
| 6,908,386 B2 | 6/2005 | Suzuki et al. |
| 6,921,336 B1 | 7/2005 | Best |
| 6,930,661 B2 | 8/2005 | Uchida et al. |
| 6,939,231 B2 | 9/2005 | Mantyjarvi et al. |
| 6,954,491 B1 | 10/2005 | Kim et al. |
| 6,966,837 B1 | 11/2005 | Best |
| 6,988,097 B2 | 1/2006 | Shirota |
| 6,990,639 B2 | 1/2006 | Wilson |
| 6,993,451 B2 | 1/2006 | Chang et al. |
| 7,007,242 B2 | 2/2006 | Suomela et al. |
| D519,118 S | 4/2006 | Woodward |
| 7,023,427 B2 | 4/2006 | Kraus et al. |
| 7,030,856 B2 | 4/2006 | Dawson et al. |
| 7,030,861 B1 | 4/2006 | Westerman et al. |
| 7,038,662 B2 | 5/2006 | Noguera |
| 7,053,887 B2 | 5/2006 | Kraus et al. |
| 7,068,294 B2 | 6/2006 | Kidney et al. |
| 7,088,342 B2 | 8/2006 | Rekimoto et al. |
| 7,109,978 B2 | 9/2006 | Gillespie et al. |
| 7,115,031 B2 | 10/2006 | Miyamoto et al. |
| 7,128,648 B2 | 10/2006 | Watanabe |
| 7,140,962 B2 | 11/2006 | Okuda et al. |
| 7,142,191 B2 | 11/2006 | Idesawa et al. |
| 7,158,123 B2 | 1/2007 | Myers et al. |
| 7,173,604 B2 | 2/2007 | Marvit et al. |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,184,020 B2 | 2/2007 | Matsui |
| 7,225,101 B2 | 5/2007 | Usuda et al. |
| 7,233,316 B2 | 6/2007 | Smith et al. |
| 7,254,775 B2 | 8/2007 | Geaghan et al. |
| 7,256,767 B2 | 8/2007 | Wong et al. |
| 7,271,795 B2 | 9/2007 | Bradski |
| 7,275,994 B2 | 10/2007 | Eck et al. |
| 7,280,096 B2 | 10/2007 | Marvit et al. |
| 7,285,051 B2 | 10/2007 | Eguchi et al. |
| 7,289,102 B2 | 10/2007 | Hinckley et al. |
| 7,295,191 B2 | 11/2007 | Kraus et al. |
| 7,301,526 B2 | 11/2007 | Marvit et al. |
| 7,301,527 B2 | 11/2007 | Marvit |
| 7,301,529 B2 | 11/2007 | Marvit et al. |
| 7,321,342 B2 | 1/2008 | Nagae |
| 7,333,087 B2 | 2/2008 | Soh et al. |
| RE40,153 E | 3/2008 | Westerman et al. |
| 7,339,580 B2 | 3/2008 | Westerman et al. |
| 7,352,358 B2 | 4/2008 | Zalewski et al. |
| 7,352,359 B2 | 4/2008 | Zalewski et al. |
| 7,365,735 B2 | 4/2008 | Reinhardt et al. |
| 7,365,736 B2 | 4/2008 | Marvit et al. |
| 7,365,737 B2 | 4/2008 | Marvit et al. |
| D568,882 S | 5/2008 | Ashida et al. |
| 7,376,388 B2 | 5/2008 | Ortiz et al. |
| 7,389,591 B2 | 6/2008 | Jaiswal et al. |
| 7,391,409 B2 | 6/2008 | Zalewski et al. |
| 7,403,220 B2 | 7/2008 | MacIntosh et al. |
| 7,431,216 B2 | 10/2008 | Weinans |
| 7,446,731 B2 | 11/2008 | Yoon |

(56) References Cited

U.S. PATENT DOCUMENTS

| | | |
|---|---|---|
| 7,461,356 B2 | 12/2008 | Mitsutake |
| 7,479,948 B2 | 1/2009 | Kim et al. |
| 7,479,949 B2 | 1/2009 | Jobs et al. |
| 7,510,477 B2 | 3/2009 | Argentar |
| 7,518,503 B2 | 4/2009 | Peele |
| 7,519,468 B2 | 4/2009 | Orr et al. |
| 7,522,151 B2 | 4/2009 | Arakawa et al. |
| 7,540,011 B2 | 5/2009 | Wixson et al. |
| 7,552,403 B2 | 6/2009 | Wilson |
| 7,570,275 B2 | 8/2009 | Idesawa et al. |
| D599,352 S | 9/2009 | Takamoto et al. |
| 7,607,111 B2 * | 10/2009 | Vaananen ............. G06F 1/1626 345/156 |
| 7,614,008 B2 | 11/2009 | Ording |
| 7,619,618 B2 | 11/2009 | Westerman et al. |
| 7,626,598 B2 | 12/2009 | Manchester |
| 7,647,614 B2 | 1/2010 | Krikorian et al. |
| 7,656,394 B2 | 2/2010 | Westerman et al. |
| 7,663,607 B2 | 2/2010 | Hotelling et al. |
| 7,667,707 B1 | 2/2010 | Margulis |
| 7,692,628 B2 | 4/2010 | Smith et al. |
| 7,696,980 B1 | 4/2010 | Piot et al. |
| 7,699,704 B2 | 4/2010 | Suzuki et al. |
| 7,705,830 B2 | 4/2010 | Westerman et al. |
| 7,710,396 B2 | 5/2010 | Smith et al. |
| 7,719,523 B2 | 5/2010 | Hillis |
| 7,721,231 B2 | 5/2010 | Wilson |
| 7,730,402 B2 | 6/2010 | Song |
| 7,736,230 B2 | 6/2010 | Argentar |
| 7,762,891 B2 | 7/2010 | Miyamoto et al. |
| D620,939 S | 8/2010 | Suetake et al. |
| 7,782,297 B2 | 8/2010 | Zalewski |
| 7,791,808 B2 | 9/2010 | French et al. |
| 7,827,698 B2 | 11/2010 | Jaiswal et al. |
| D636,773 S | 4/2011 | Lin |
| 7,934,995 B2 | 5/2011 | Suzuki |
| D641,022 S | 7/2011 | Dodo et al. |
| 8,038,533 B2 | 10/2011 | Tsuchiyama et al. |
| 8,105,169 B2 | 1/2012 | Ogasawara et al. |
| D666,250 S | 8/2012 | Fulghum et al. |
| 8,246,460 B2 | 8/2012 | Kitahara |
| 8,256,730 B2 | 9/2012 | Tseng |
| 8,317,615 B2 | 11/2012 | Takeda et al. |
| 8,337,308 B2 | 12/2012 | Ito et al. |
| 8,339,364 B2 | 12/2012 | Takeda et al. |
| 8,529,352 B2 | 9/2013 | Mae et al. |
| 8,567,599 B2 | 10/2013 | Beatty et al. |
| 8,613,672 B2 | 12/2013 | Mae et al. |
| 8,684,842 B2 | 4/2014 | Takeda et al. |
| 8,690,675 B2 | 4/2014 | Ito et al. |
| 8,702,514 B2 | 4/2014 | Ashida et al. |
| 9,223,461 B1 * | 12/2015 | Brown .................. G06F 3/0482 |
| 2001/0019363 A1 | 9/2001 | Katta et al. |
| 2002/0103026 A1 | 8/2002 | Himoto et al. |
| 2002/0103610 A1 | 8/2002 | Bachmann et al. |
| 2002/0107071 A1 | 8/2002 | Himoto et al. |
| 2002/0165028 A1 | 11/2002 | Miyamoto et al. |
| 2003/0027517 A1 | 2/2003 | Callway et al. |
| 2003/0207704 A1 | 11/2003 | Takahashi et al. |
| 2003/0216179 A1 | 11/2003 | Suzuki et al. |
| 2004/0023719 A1 | 2/2004 | Hussaini et al. |
| 2004/0092309 A1 | 5/2004 | Suzuki |
| 2004/0229687 A1 | 11/2004 | Miyamoto et al. |
| 2004/0266529 A1 | 12/2004 | Chatani |
| 2005/0024360 A1 * | 2/2005 | Abe ...................... G06F 3/0325 345/419 |
| 2005/0176502 A1 | 8/2005 | Nishimura et al. |
| 2005/0181756 A1 | 8/2005 | Lin |
| 2005/0253806 A1 | 11/2005 | Liberty et al. |
| 2006/0012564 A1 | 1/2006 | Shiozawa et al. |
| 2006/0015808 A1 | 1/2006 | Shiozawa et al. |
| 2006/0015826 A1 | 1/2006 | Shiozawa et al. |
| 2006/0038914 A1 | 2/2006 | Hanada et al. |
| 2006/0077165 A1 | 4/2006 | Jang |
| 2006/0094502 A1 | 5/2006 | Katayama et al. |
| 2006/0128468 A1 | 6/2006 | Yoshikawa et al. |
| 2006/0174026 A1 | 8/2006 | Robinson et al. |
| 2006/0250764 A1 | 11/2006 | Howarth et al. |
| 2006/0252537 A1 | 11/2006 | Wu |
| 2006/0252541 A1 | 11/2006 | Zalewski et al. |
| 2006/0267928 A1 | 11/2006 | Kawanobe et al. |
| 2007/0021216 A1 | 1/2007 | Guruparan |
| 2007/0049374 A1 | 3/2007 | Ikeda et al. |
| 2007/0060383 A1 | 3/2007 | Dohta |
| 2007/0202956 A1 | 8/2007 | Ogasawara et al. |
| 2007/0252901 A1 | 11/2007 | Yokonuma et al. |
| 2007/0265085 A1 | 11/2007 | Miyamoto et al. |
| 2008/0015017 A1 | 1/2008 | Ashida et al. |
| 2008/0024435 A1 | 1/2008 | Dohta |
| 2008/0030458 A1 | 2/2008 | Helbing et al. |
| 2008/0039202 A1 | 2/2008 | Sawano et al. |
| 2008/0100995 A1 | 5/2008 | Ryder et al. |
| 2008/0150911 A1 | 6/2008 | Harrison |
| 2008/0220867 A1 | 9/2008 | Zalewski et al. |
| 2008/0300055 A1 | 12/2008 | Lutnick et al. |
| 2009/0027386 A1 | 1/2009 | Furuhashi et al. |
| 2009/0082107 A1 | 3/2009 | Tahara et al. |
| 2009/0143140 A1 | 6/2009 | Kitahara |
| 2009/0170579 A1 | 7/2009 | Ishii et al. |
| 2009/0183193 A1 | 7/2009 | Miller, IV |
| 2009/0219677 A1 | 9/2009 | Mori et al. |
| 2009/0225159 A1 | 9/2009 | Schneider et al. |
| 2009/0241038 A1 * | 9/2009 | Izuno .................... A63F 13/219 715/757 |
| 2009/0254953 A1 | 10/2009 | Lin |
| 2009/0256809 A1 | 10/2009 | Minor |
| 2009/0280910 A1 | 11/2009 | Gagner et al. |
| 2009/0322671 A1 * | 12/2009 | Scott .................... G06K 9/32 345/156 |
| 2009/0322679 A1 | 12/2009 | Sato et al. |
| 2010/0007926 A1 | 1/2010 | Imaizumi et al. |
| 2010/0009746 A1 | 1/2010 | Raymond et al. |
| 2010/0009760 A1 | 1/2010 | Shimamura et al. |
| 2010/0045666 A1 | 2/2010 | Kornmann et al. |
| 2010/0083341 A1 | 4/2010 | Gonzalez |
| 2010/0105480 A1 * | 4/2010 | Mikhailov et al. ............. 463/38 |
| 2010/0125816 A1 * | 5/2010 | Bezos .................... G06F 1/1626 715/863 |
| 2010/0149095 A1 | 6/2010 | Hwang |
| 2010/0156824 A1 | 6/2010 | Paleczny et al. |
| 2010/0321287 A1 * | 12/2010 | Hine ..................... A63F 13/214 345/156 |
| 2011/0021274 A1 | 1/2011 | Sato et al. |
| 2011/0190049 A1 | 8/2011 | Mae et al. |
| 2011/0190050 A1 | 8/2011 | Mae et al. |
| 2011/0190052 A1 | 8/2011 | Takeda et al. |
| 2011/0190061 A1 | 8/2011 | Takeda et al. |
| 2011/0195785 A1 | 8/2011 | Ashida et al. |
| 2011/0285704 A1 | 11/2011 | Takeda et al. |
| 2011/0287842 A1 | 11/2011 | Yamada et al. |
| 2011/0295553 A1 | 12/2011 | Sato |
| 2012/0001048 A1 | 1/2012 | Takahashi et al. |
| 2012/0015732 A1 | 1/2012 | Takeda et al. |
| 2012/0026166 A1 | 2/2012 | Takeda et al. |
| 2012/0040759 A1 | 2/2012 | Ito et al. |
| 2012/0044177 A1 | 2/2012 | Ohta et al. |
| 2012/0046106 A1 | 2/2012 | Ito et al. |
| 2012/0052952 A1 | 3/2012 | Nishida et al. |
| 2012/0052959 A1 | 3/2012 | Nishida et al. |
| 2012/0062445 A1 | 3/2012 | Haddick et al. |
| 2012/0068927 A1 | 3/2012 | Poston et al. |
| 2012/0106041 A1 | 3/2012 | Ashida et al. |
| 2012/0106042 A1 | 3/2012 | Ashida et al. |
| 2012/0108329 A1 | 3/2012 | Ashida et al. |
| 2012/0108340 A1 | 3/2012 | Ashida et al. |
| 2012/0086631 A1 | 4/2012 | Osman et al. |
| 2012/0088580 A1 | 4/2012 | Takeda et al. |
| 2012/0119992 A1 | 5/2012 | Nishida et al. |
| 2012/0258796 A1 | 10/2012 | Ohta et al. |
| 2012/0270651 A1 | 10/2012 | Takeda et al. |

(56) References Cited

U.S. PATENT DOCUMENTS

| | | | |
|---|---|---|---|
| 2013/0063350 | A1 | 3/2013 | Takeda et al. |
| 2013/0109477 | A1 | 5/2013 | Ito et al. |

FOREIGN PATENT DOCUMENTS

| | | |
|---|---|---|
| CN | 202270340 U | 6/2012 |
| CN | 202355827 | 8/2012 |
| CN | 202355828 | 8/2012 |
| CN | 202355829 | 8/2012 |
| EP | 0 710 017 | 5/1996 |
| EP | 0 835 676 | 4/1998 |
| EP | 1 469 382 | 10/2004 |
| EP | 1 723 992 | 11/2006 |
| EP | 2007/128949 | 11/2007 |
| EP | 2 158 947 | 3/2010 |
| FR | 2 932 998 | 1/2010 |
| JP | 06-285259 A | 10/1994 |
| JP | H 09-006526 A | 1/1997 |
| JP | 09-294260 | 11/1997 |
| JP | 10-341388 | 12/1998 |
| JP | 2000-222185 | 8/2000 |
| JP | 2001-034247 A | 2/2001 |
| JP | 2002-248267 | 9/2002 |
| JP | 2003-85590 | 3/2003 |
| JP | 2004-032548 | 1/2004 |
| JP | 3703473 | 2/2005 |
| JP | 2005-269399 | 9/2005 |
| JP | 3770499 | 4/2006 |
| JP | 2006-150039 | 6/2006 |
| JP | 2006-192246 | 7/2006 |
| JP | 3797608 | 7/2006 |
| JP | 2006-301654 | 11/2006 |
| JP | 2006-350986 | 12/2006 |
| JP | 2007-061271 | 3/2007 |
| JP | 2007-075353 | 3/2007 |
| JP | 2007-075751 | 3/2007 |
| JP | 2007-289413 | 11/2007 |
| JP | 2008-067853 A | 3/2008 |
| JP | 2008-264402 | 11/2008 |
| JP | 2010-017412 | 1/2009 |
| JP | 2009-031949 | 2/2009 |
| JP | 2009-142511 | 7/2009 |
| JP | 2009-178363 | 8/2009 |
| JP | 2009-247763 | 10/2009 |
| JP | 2009-536058 A | 10/2009 |
| JP | 2010-017395 A | 1/2010 |
| JP | 4601925 | 12/2010 |
| TW | M278452 | 10/2005 |
| TW | 419388 | 1/2011 |
| WO | 03/007117 | 1/2003 |
| WO | 03/083822 | 10/2003 |
| WO | 2007/128949 | 11/2007 |
| WO | WO 2007/128949 A1 | 11/2007 |
| WO | WO2007128949 * | 11/2007 |
| WO | 2007-143632 | 12/2007 |
| WO | 2008/136064 | 11/2008 |
| WO | 2009/038596 | 3/2009 |
| WO | WO 2010/088477 A1 | 8/2010 |

OTHER PUBLICATIONS

Apple Support: "iPhone Technical Specifications", Apple, Aug. 22, 2008, URL:http://support.apple.com/kp/SP495, 2 pages.
May 10, 2012 European Search Report for EP11739553.3, 8 pages.
U.S. Appl. No. 13/017,381, non-final office action dated Aug. 7, 2012.
U.S. Appl. No. 13/017,527, non-final office action dated Aug. 22, 2012.
U.S. Appl. No. 13/019,924, final office action dated Aug. 31, 2012.
U.S. Appl. No. 13/019,928, response to office action filed Jul. 26, 2012.
U.S. Appl. No. 13/145,690, awaiting USPTO action.
U.S. Appl. No. 13/153,106, awaiting USPTO action.
U.S. Appl. No. 13/198,251, non-final office action dated Sep. 25, 2012.
U.S. Appl. No. 13/206,059, awaiting USPTO action.
U.S. Appl. No. 13/206,767, awaiting USPTO action.
U.S. Appl. No. 13/206,914, awaiting USPTO action.
U.S. Appl. No. 13/207,867, awaiting USPTO action.
U.S. Appl. No. 13/208,719, allowed.
U.S. Appl. No. 13/211,679, awaiting USPTO action.
U.S. Appl. No. 13/212,648, awaiting USPTO action.
U.S. Appl. No. 13/244,685, response to office action filed Sep. 6, 2012.
U.S. Appl. No. 13/244,710, final office action dated Sep. 4, 2012.
U.S. Appl. No. 13/354,000, awaiting USPTO action.
U.S. Appl. No. 13/541,282, awaiting USPTO action.
IGN Staff, "PS3 Games on PSP?", URL: http://www.ign.com/articles/2006/10/25/ps3-games-on-psp, Publication date printed on article: Oct. 2006.
Marcusita, "What Benefits Can I Get Out of My PSP on My PS3", URL: http://web.archive.org/web/20080824222755/http://forums.afterdawn.com/thread_view.cfm/600615, Publication date printed on article: Dec. 15, 2007.
Rob Aspin et al., "Augmenting the CAVE: An initial study into close focused, inward looking, exploration in IPT systems," $11^{th}$ IEE International Symposium Distributed Simulation and Real-Time Applications, pp. 217-224 (Oct. 1, 2007).
D. Weidlich et al., "Virtual Reality Approaches for Immersive Design," CIRP Annals, Elsevier BV, NL, CH, FR, vol. 56, No. 1, pp. 139-142 (Jan. 1, 2007).
G.W. Fitzmaurice et al., "Virtual Reality for Palmtop Computers," ACM Transactions on Information Systems, ACM, New York, NY, vol. 11, No. 3, pp. 197-218 (Jul. 1, 1993).
Johan Sanneblad et al., "Ubiquitous graphics," Proceedings of the Working Conference on Advanced Visual Interfaces, AVI '06, pp. 373-377 (Oct. 1, 2006).
Office Action dated Oct. 16, 2012 in Australian Application No. 2011204815.
English-language machine translation for JP 2002-248267.
English-language machine translation for JP 2007-075751.
English-language machine translation for JP 2008-264402.
Sony HMZ-T1 with TrackIR 5 playing PC games! WoW and Skyrim Uploaded by iphwne Nov. 16, 2011 http://www.youtube.com/watch?v=5OLCFMBWT6I.
Sony's New 3D OLED Headset/VR Goggles Uploaded by TheWaffleUniverse Jan. 8, 2011 http://www.youtube.com/watch?v=UoE5ij63EDI.
TrackIR 5—review Uploaded by arnycracker8 Jan. 27, 2011 http://www.youtube.com/watch?v=EXMXvAuBzo4.
Partial English-language translation of TWM278452.
Mae et al., U.S. Appl. No. 13/017,381, filed Jan. 31, 2011—now U.S. Pat. No. 8,613,672.
Mae et al., U.S. Appl. No. 13/017,527, filed Jan. 31, 2011—now U.S. Pat. No. 8,529,352.
Takeda et al., U.S. Appl. No. 13/019,924, filed Feb. 2, 2011—non-final office action dated Oct. 8, 2013.
Takeda et al., U.S. Appl. No. 13/019,928, filed Feb. 2, 2011—now U.S. Pat. No. 8,317,615.
Takeda et al., U.S. Appl. No. 13/145,690, filed Dec. 19, 2011—allowed.
Taekda et al., U.S. Appl. No. 13/153,106, filed Jun. 3, 2011—non-final office action dated Oct. 10, 2013.
Ito et al., U.S. Appl. No. 13/198,251, filed Aug. 4, 2011—awaiting USPTO action.
Ashida et al., U.S. Appl. No. 13/206,059, filed Aug. 9, 2011—awaiting USPTO action.
Ashida et al., U.S. Appl. No. 13/206,767, filed Aug. 10, 2011—Quayle action mailed Nov. 14, 2013.
Ashida et al., U.S. Appl. No. 13/206,914, filed Aug. 10, 2011—allowed.
Ashida et al., U.S. Appl. No. 13/207,867, filed Aug. 11, 2011—non-final office action dated Oct. 7, 2013.
Ito et al., U.S. Appl. No. 13/208,719, filed Aug. 12, 2011—now U.S. Pat. No. 8,337,308.

(56) References Cited

OTHER PUBLICATIONS

Nishida et al., U.S. Appl. No. 13/211,679, filed Aug. 17, 2011—final office action dated Oct. 15, 2013.
Nishida et al., U.S. Appl. No. 13/212,648, filed Aug. 18, 2011—final office action dated Dec. 2, 2013.
Takeda et al., U.S. Appl. No. 13/244,685, filed Sep. 26, 2011—now U.S. Pat. No. 8,339,364.
Takeda et al., U.S. Appl. No. 13/244,710, filed Sep. 26, 2011—non-final office action dated Sep. 24, 2013.
Ohta et al., U.S. Appl. No. 13/354,000, filed Jan. 19, 2012—non-final office action dated Nov. 8, 2013.
Takeda et al., U.S. Appl. No. 13/541,282, filed Jul. 3, 2012—non-final office action dated Sep. 13, 2013.
Takeda et al., U.S. Appl. No. 13/672,862, filed Nov. 9, 2012—awaiting USPTO action.
Ito et al., U.S. Appl. No. 13/687,057, filed Nov. 28, 2012—allowed.
Aug. 20, 2012 Notice of Allowance from U.S. Appl. No. 13/208,719.
Jul. 24, 2012 European Search Report for EP 11177775.1, 12 pages.
Office Action issued in Japanese Patent Application No. 2011-126525 dated Mar. 25, 2015.
PersonalApplets: "Gyro Tennis App for iPhone 4 and iPod Touch $4^{th}$ gen" YouTube, Aug. 9, 2010, http://www.youtube.com/watch?v=c7PRFbqWKIs, 2 pages.
Jhrogersii, "Review: Gyro Tennis for iPhone", iSource, Sep. 17, 2010, http://isource.com/2010/09/17/review-gyro-tennis-for-iphone/, 10 pages.
Mar. 16, 2012 Office Action for U.S. Appl. No. 13/019,924, 14 pages.
EPO Search Report for Application No. 1177775.1, Feb. 1, 2012, 6 pages.
U.S. Appl. No. 13/019,924, response to office action filed Feb. 10, 2014.
U.S. Appl. No. 13/019,928, now U.S. Pat No. 8,317,615.
U.S. Appl. No. 13/145,690, now U.S. Pat. No. 8,684,842.
U.S. Appl. No. 13/153,106, final office action dated Feb. 4, 2014.
U.S. Appl. No. 13/198,251, awaiting USPTO action.
U.S. Appl. No. 13/206,059, response to office action filed May 14, 2014.
U.S. Appl. No. 13/206,767, allowed.
U.S. Appl. No. 13/206,914, now U.S. Pat. No. 8,702,514.
U.S. Appl. No. 13/207,867, allowed.
U.S. Appl. No. 13/208,719, now U.S. Pat. No. 8,337,308.
U.S. Appl. No. 13/211,679, RCE filed Apr. 28, 2014.
U.S. Appl. No. 13/212,648, RCE filed May 7, 2014.
U.S. Appl. No. 13/244,685, now U.S. Pat. No. 8,339,364.
U.S. Appl. No. 13/244,710, response to office action filed Dec. 24, 2013.
U.S. Appl. No. 13/354,000, allowed.
U.S. Appl. No. 13/541,282, allowed.
U.S. Appl. No. 13/672,862, allowed.
U.S. Appl. No. 13/687,057, now U.S. Pat. No. 8,690,675.
Apple Support, "iPhone—Technical Specifications", http://support.apple.com/kb/SP2, 2010. 3 pages.
English-language machine translation for JP 2009-178363.
English-language machine translation for JP 2009-247763.
English-language machine translation for JP 09-294260.
English-language machine translation for JP 2004-032548.
English-language machine translation for JP 4601925.
Mae et al., U.S. Appl. No. 13/017,381, filed Jan. 31, 2011.
Mae et al., U.S. Appl. No. 13/017,527, filed Jan. 31, 2011.
Takeda et al., U.S. Appl. No. 13/019,924, filed Feb. 2, 2011.
Takeda et al., U.S. Appl. No. 13/019,928, filed Feb. 2, 2011.
Takeda et al., U.S. Appl. No. 13/145,690, filed Dec. 19, 2011.
Taekda et al., U.S. Appl. No. 13/153,106, filed Jun. 3, 2011.
Ito et al., U.S. Appl. No. 13/198,251, filed Aug. 4, 2011.
Ashida et al., U.S. Appl. No. 13/206,059, filed Aug. 9, 2011.
Ashida et al., U.S. Appl. No. 13/206,767, filed Aug. 10, 2011.
Ashida et al., U.S. Appl. No. 13/206,914, filed Aug. 10, 2011.
Ashida et al., U.S. Appl. No. 13/207,867, filed Aug. 11, 2011.
Ito et al., U.S. Appl. No. 13/208,719, filed Aug. 12, 2011.
Nishida et al., U.S. Appl. No. 13/211,679, filed Aug. 17, 2011.
Nishida et al., U.S. Appl. No. 13/212,648, filed Aug. 18, 2011.
Takeda et al., U.S. Appl. No. 13/244,685, filed Sep. 26, 2011.
Takeda et al., U.S. Appl. No. 13/244,710, filed Sep. 26, 2011.
Ohta et al., U.S. Appl. No. 13/354,000, filed Jan. 19, 2012.
Takeda et al., U.S. Appl. No. 13/541,282, filed Jul. 3, 2012.
Xbox 360 Controller, Wikipedia, page as revised on Feb. 2, 2010 (6 pages).
Takeda et al., U.S. Appl. No. 13/019,924, filed Feb. 2, 2011—response to office action filed Feb. 10, 2014.
Takeda et al., U.S. Appl. No. 13/145,690, filed Dec. 19, 2011—now U.S. Pat. No. 8,684,842.
Taekda et al., U.S. Appl. No. 13/153,106, filed Jun. 3, 2011—final office action filed Feb. 4, 2014.
Ashida et al., U.S. Appl. No. 13/206,059, filed Aug. 9, 2011—response to office action filed May 14, 2014.
Ashida et al., U.S. Appl. No. 13/206,767, filed Aug. 10, 2011—allowed.
Ashida et al., U.S. Appl. No. 13/206,914, filed Aug. 10, 2011—now U.S. Pat. No. 8,702,514.
Ashida et al., U.S. Appl. No. 13/207,867, filed Aug. 11, 2011—allowed.
Nishida et al., U.S. Appl. No. 13/211,679, filed Aug. 17, 2011 RCE filed Apr. 28, 2014.
Nishida et al., U.S. Appl. No. 13/212,648, filed Aug. 18, 2011—RCE filed May 7, 2014.
Takeda et al., U.S. Appl. No. 13/244,710, filed Sep. 26, 2011—response to office action filed Dec. 24, 2013.
Ohta et al., U.S. Appl. No. 13/354,000, filed Jan. 19, 2012—allowed.
Takeda et al., U.S. Appl. No. 13/541,282, filed Jul. 3, 2012—allowed.
Takeda et al., U.S. Appl. No. 13/672,862, filed Nov. 9, 2012—allowed.
Ito et al., U.S. Appl. No. 13/687,057, filed Nov. 28, 2012 now U.S. Pat. No. 8,690,675.
Office Action in corresponding Japanese Application No. 2011-120680 dated Sep. 14, 2015.
Office Action in corresponding Japanese Application No. 2011-126525 dated Oct. 21, 2015.
Notice of Pretrial Report in corresponding Japanese Patent Application No. JP 2011-126525 dated Feb. 24, 2016.
Decision of Refusal dated Apr. 1, 2016 issued in corresponding Japanese Patent Appln. No. 2011-120680.
Pretrial Report dated Sep. 13, 2016 for Japanese Patent Appln. No. 2011-120680.
Enterbrain, Inc., "Shukan Famitsu 8/15" dated Aug. 15, 2008, vol. 23, No. 33, p. 64 with partial translation.

* cited by examiner

| | HAND-HELD DEVICE | CONTROL SURFACE |
|---|---|---|
| INPUT SURFACE HORIZONTAL |  |  |
| TILTED IN LEFT/RIGHT DIRECTION |  |  |
| TILTED IN FORWARD/ BACKWARD DIRECTION |  |  |

POSITION CALCULATION SYSTEM, POSITION CALCULATION DEVICE, STORAGE MEDIUM STORING POSITION CALCULATION PROGRAM, AND POSITION CALCULATION METHOD

CROSS REFERENCE TO RELATED APPLICATIONS

This application claims the benefit under 35 U.S.C. Section 119 of Japanese Patent Application No. 2010-185315 filed on Aug. 20, 2010, Japanese Patent Application No. 2011-120680 filed on May 30, 2011, and Japanese Patent Application No. 2011-126525 filed on Jun. 6, 2011. The entire contents of each of these applications are incorporated herein by reference.

FIELD

This application describes a position calculation system, a position calculation device, a storage medium storing a position calculation program and a position calculation method for calculating a three-dimensional position based on operations on a controller device.

BACKGROUND AND SUMMARY

There are conventional techniques with which an input is made at an arbitrary position on the screen using an input device such as a touch panel or a touch pad. For example, in a conventional game device including a touch panel, the movement of a character in a game space is controlled based on a trace drawn by inputs on the touch panel. Then, a player can perform game operations while freely specifying a position in the game space on a two-dimensional plane.

With the conventional technique, it was possible to specify a position on a two-dimensional plane by using an input device such as a touch panel, but it was difficult to specify a position in a three-dimensional space. For example, with a conventional game device including a touch panel, it is possible to specify an arbitrary position in a game space if the game space is a two-dimensional plane, but it is not possible to properly specify a position in a game space if it is a three-dimensional game space.

(1)

A first example position calculation system described herein is a position calculation system for calculating a position in a three-dimensional virtual space based on an operation on a controller device. The position calculation system calculates the position in the virtual space based on an attitude of the controller device and an input position on a predetermined input surface of the controller device.

In the embodiment to be described below, the term "position calculation system" is not limited to those implemented with a plurality of devices including a terminal device which is the controller device and a game device which is the information processing device, but may be those implemented with a single device. For example, the position calculation system may be implemented by a portable information processing device which functions as a controller device and an information processing device.

With the configuration (1) above, it is possible to specify a position in a three-dimensional space through the operation of changing the attitude of the controller device and the operation of inputting a position on the input surface of the controller device. That is, with the configuration (1) above, the user can easily specify a position in a three-dimensional space using the controller device.

(2)

In a second example configuration, the position calculation system may include a controller device and an information processing device.

The controller device includes a position detection section, a sensor section, and a data transmission section. The position detection section detects an input position on the input surface. The sensor section outputs data for calculating the attitude. The data transmission section transmits data outputted from the position detection section and the sensor section to the information processing device.

The information processing device includes an attitude calculation section and a position calculation section. The attitude calculation section calculates the attitude of the controller device based on data outputted from the sensor section. The position calculation section calculates the position in the virtual space based on the attitude and the input position.

The "controller device" as used herein is not limited to a terminal device 7 in the embodiment to be described below, but may be any device that includes a position detection section and a sensor section and that has a function of transmitting data to an information processing device.

The "information processing device" as used herein may be any device capable of performing processes of the various sections. The information processing device may be a single-purpose information processing device for games, or a general-purpose information processing device such as an ordinary personal computer.

The "position detection section" as used herein is not limited to a touch panel in the embodiment to be described below, but may be a touch pad. That is, it is not necessary for the controller device to include a display screen.

The "sensor section" as used herein is not limited to an inertia sensor such as an acceleration sensor or a gyrosensor, but is a concept that includes any sensor, e.g., a magnetic sensor to be described below, such that an attitude can be calculated based on the detection results thereof.

With the configuration (2) above, the data from the controller device is received by the information processing device, and the information processing device calculates a three-dimensional position based on the data. Accordingly, the controller device does not need to have the function of performing position calculation processes, and it is therefore possible to simplify the configuration of the controller device and also to reduce the size and the weight of the controller device.

(3)

In a third example configuration, the sensor section may include an inertia sensor.

With the configuration (3) above, it is possible to easily calculate (estimate) the attitude of the controller device using the output of the inertia sensor such as an acceleration sensor or a gyrosensor.

(4)

In a fourth example configuration, the controller device may further include a display section for displaying an image representing the virtual space.

With the configuration (4) above, since an image representing the virtual space is displayed on the controller device, the user can check the virtual space on the controller device at hand.

(5)

In a fifth example configuration, the position detection section may be a touch panel provided on a screen of the display section.

With the configuration (5) above, since the touch panel is provided on the screen of the controller device, the player can specify a three-dimensional position through the operation of touching the screen. Thus, the touch input operation for specifying a three-dimensional position is made easier.

(6)

In a sixth example configuration, the position calculation system may include a position calculation section for calculating, as the position in the virtual space, a position on a surface which is determined in accordance with the attitude of the controller device in the virtual space, based on the input position.

The "surface" as used herein may be a flat surface or a curved surface, or may be a surface whose shape changes in accordance with the attitude of the controller device. It is not necessary for the "surface" to be displayed on the display device. That is, the "surface" may be placed as an object or as a transparent object in the virtual space.

With the configuration (6) above, the user can specify a position on the surface in the virtual space by making an input on the input surface of the controller device, and this surface changes in accordance with the attitude of the controller device. Therefore, the user can easily specify a position in a three-dimensional virtual space by specifying a position on the input surface while changing the attitude of the controller device. With the configuration (6) above, it is possible to easily specify a position in a three-dimensional space based on an input on a planar input surface such as a touch panel or a touch pad.

(7)

In a seventh example configuration, the position calculation system may further include a surface setting section for setting the surface so that an attitude of the surface changes in accordance with the attitude of the controller device.

With the configuration (7) above, the user can change the attitude of the surface through the operation of changing the attitude of the controller device. Thus, it is possible to make the user feel as if the user were actually tilting the surface in the virtual space through the operation of tilting the controller device, thus providing a more intuitive and easy-to-understand operation.

(8)

In an eighth example configuration, the controller device may include a display section and a touch panel. The display section displays an image representing a virtual space including an area of the surface. The touch panel is provided on a screen of the display section. In this case, the position calculation section calculates the position on the surface which is calculated based on the input position so that the input position on the touch panel and the position on the surface coincide with each other on the screen.

With the configuration (8) above, the user can specify (touch) a position on the screen of the display section to thereby specify a position in a virtual space corresponding to that position. Thus, the user can specify a position in a three-dimensional space through a more intuitive and easy-to-understand operation.

(9)

In a ninth example configuration, the position calculation system may include a process performing section for performing a predetermined process using the position in the virtual space associated with the input position as an input.

With the configuration (9) above, the position calculation system can perform various processes using the three-dimensional position inputted by the user as an input.

(10)

In a tenth example configuration, the process performing section may identify one of a plurality of areas set in the virtual space that includes the position in the virtual space associated with the input position, and cause a predetermined sound output section to output a sound associated with the identified area.

The "predetermined sound output section" as used herein may be provided in a separate device from the devices included in the position calculation system. That is, the position calculation system may or may not include the predetermined sound output section. For example, the predetermined information processing device may include the process performing section, and the speaker of the television connected to the information processing device may be used as the "predetermined sound output section". Also, the speaker provided in the controller device may be used as the "predetermined sound output section".

With the configuration (10) above, the user can output a sound through the operation of specifying a three-dimensional position in the virtual space using the controller device. As a result, for example, it is possible to provide the user with an operation that allows the user to feel as though the user is playing a virtual musical instrument by specifying different areas arranged in the virtual space.

(11)

In an eleventh example configuration, the plurality of areas may be arranged in a generally arc shape. In this case, the position calculation system includes a surface setting section and a position calculation section. The surface setting section sets a surface in the virtual space so that the surface moves along the plurality of areas in accordance with a change in the attitude of the controller device. The position calculation section calculates a position on the surface based on the input position.

With the configuration (11) above, the user can move the surface in an arc along the plurality of areas arranged in a generally arc shape through the operation of moving the controller device in an arc (changing the attitude thereof). Then, since the movement of the controller device and the movement of the surface are both rotating movements and the movements correspond to each other, the operation of the controller device becomes more intuitive and easy-to-understand for the player.

(12)

In a twelfth example configuration, the position calculation system may include an object setting section and an image generation section. The object setting section sets the predetermined object in the virtual space. The image generation section generates an image representing the virtual space including the predetermined object as an image to be displayed on a predetermined display device. In this case, the process performing section performs the predetermined process when the position in the virtual space associated with the input position is calculated to be a position of the predetermined object.

With the configuration (12) above, the user can perform an operation of making an input on an object in the virtual space through the operation of specifying a three-dimensional position in the virtual space using the controller device. Since the object to be operated is displayed on the display device, the user can easily perform an operation on the object.

(13)

In a thirteenth example configuration, the image generation section may include a first generating section and a second generating section. The first generating section generates, as an image to be displayed on a display device of the controller device, an image representing a partial region of the object so that the region changes in accordance with the attitude of the controller device. The second generating section generates, as an image to be displayed on another display device separate from the display device of the controller device, an image representing a larger region of the object than the partial region.

With the configuration (13) above, since a relatively enlarged image is displayed on the controller device, it is easier to perform input operations. Moreover, since an image of a relatively larger region is displayed on a separate display device, the user is able to know information regarding the user surroundings beyond the displayed region of the controller device. Thus, with the configuration (13) above, it is possible to provide an input system with a good controllability.

(14)

In a fourteenth example configuration, the position calculation system may include an object placement section and an image generation section. The object placement section places, in the virtual space, an object whose attitude is controlled so as to correspond to the attitude of the controller device. The image generation section generates, as an image to be displayed on a predetermined display device, an image representing the virtual space including the object.

With the configuration (14) above, since an object whose attitude changes in accordance with the attitude of the controller device is displayed on the display device, it is possible to check the attitude of the controller device on the screen and it is possible to perform an operation more easily on the controller device.

(15)

In a fifteenth example configuration, the controller device may include a display section for displaying keys arranged in the virtual space. In this case, when the position in the virtual space associated with the input position is calculated to be a position of one of the keys, a predetermined sound output section outputs a sound associated with the key corresponding to the position.

With the configuration (15) above, a sound is outputted from the sound output section through the operation of specifying one of the keys arranged in the virtual space using the controller device. Accordingly, the user can perform an operation of playing a keyboard instrument arranged in the virtual space using the controller device.

This specification discloses an information processing device included in the position calculation system of the configurations (1) to (15) above or an information processing device (position calculation device) having the same function as the position calculation system. This specification also discloses a computer-readable storage medium storing an information processing program (position calculation program) for causing a computer to function as a means equivalent to the various sections of the information processing device. This specification further discloses a position calculation method to be carried out in the position calculation system or the information processing device.

According to systems, devices, storage mediums, and methods described herein, it is possible to specify a position in a three-dimensional space through the operation of changing the attitude of the controller device and the operation of inputting a position on the input surface of the controller device, and as a result the user can easily specify a position in a three-dimensional space using the controller device.

These and other features, aspects and advantages will become more apparent from the following detailed description when taken in conjunction with the accompanying drawings.

DETAILED DESCRIPTION OF NON-LIMITING EXAMPLE EMBODIMENTS

[1. General Configuration of Game System]

Figure 1:
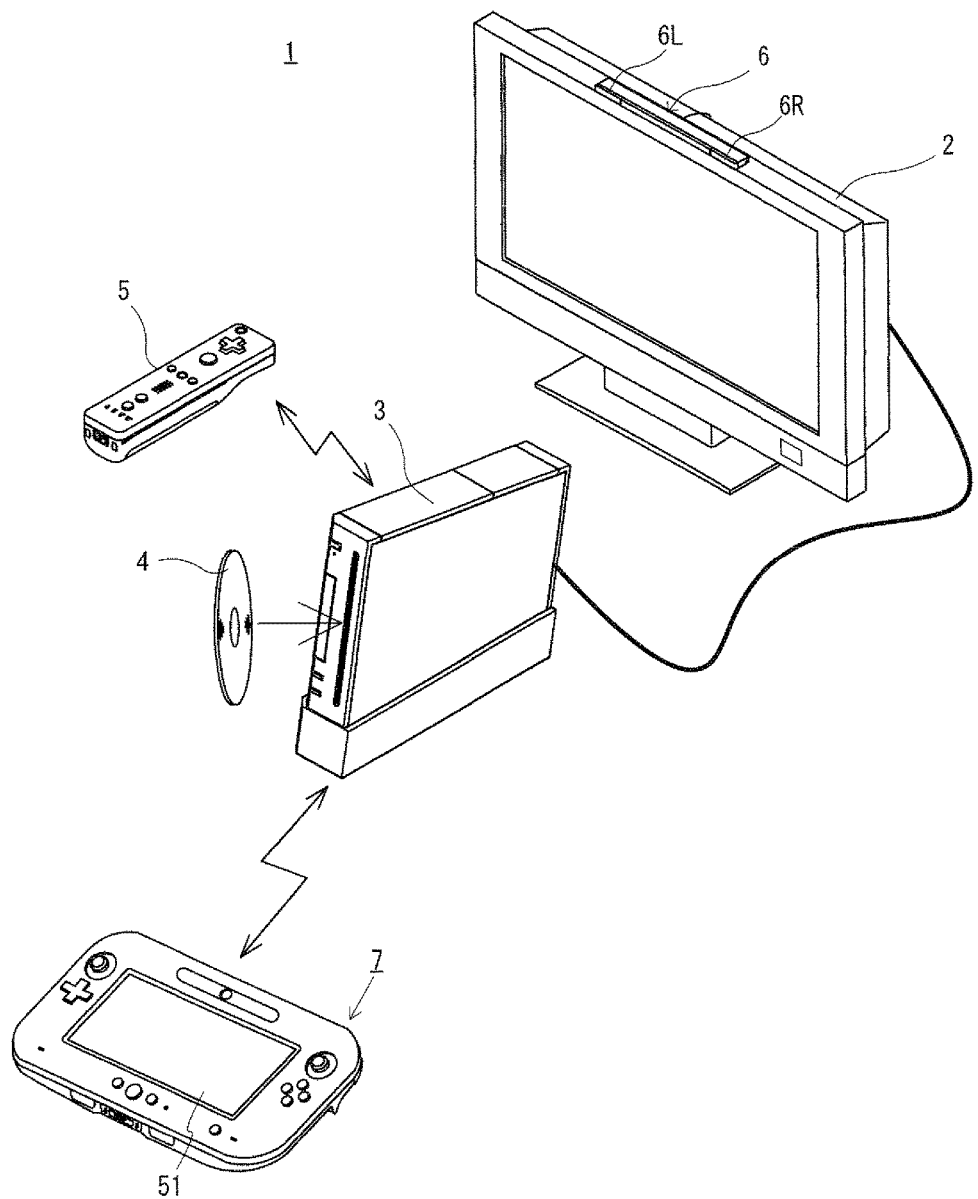
FIG. 1 is an external view of an example non-limiting game system 1.

A game system 1 will now be described with reference to the drawings. FIG. 1 is an external view of the game system 1. In FIG. 1, a game system 1 includes a non-portable display device (hereinafter referred to as a "television") 2 such as a television receiver, a home-console type game device 3, an optical disc 4, a controller 5, a marker device 6, and a terminal device 7. In the game system 1, the game device 3 performs game processes based on game operations performed using the controller 5 and the terminal device 7, and game images obtained through the game processes are displayed on the television 2 and/or the terminal device 7.

In the game device 3, the optical disc 4 typifying an information storage medium used for the game device 3 in a replaceable manner is removably inserted. An information processing program (a game program, for example) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game process.

The television 2 is connected to the game device 3 by a connecting cord. Game images obtained as a result of the game processes performed by the game device 3 are displayed on the television 2. The television 2 includes a speaker 2a (see FIG. 2), and a speaker 2a outputs game sounds obtained as a result of the game process. In alternative embodiments, the game device 3 and the non-portable display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and a marker device 6 is used by the game device 3 for calculating the position, the roll angle, etc., of the controller 5. The marker device 6 includes two markers 6R and 6L on opposite ends thereof. Specifically, a marker 6R (as well as the marker 6L) includes one or more infrared LEDs (Light Emitting Diodes), and emits an infrared light in a forward direction of the television 2. The marker device 6 is connected to the game device 3 via a wired connection (or a wireless connection), and the game device 3 is able to control the lighting of each infrared LED of the marker device 6. The marker device 6 is portable, and the user can arrange the marker device 6 at any position. While FIG. 1 shows an embodiment in which the marker device 6 is arranged on top of the television 2, the position and the direction of arranging the marker device 6 are not limited to this particular arrangement.

The controller 5 provides the game device 3 with operation data representing the content of operations performed on the controller itself. The controller 5 and the game device 3 can communicate with each other by wireless communication. In the present embodiment, the wireless communication between a controller 5 and the game device 3 uses, for example, Bluetooth (Registered Trademark) technology. In other embodiments, the controller 5 and the game device 3 may be connected by a wired connection. While only one controller is included in the game system 1 in FIG. 1, the game system 1 may include a plurality of controllers 5. That is, the game device 3 can communicate with a plurality of controllers, and a game can be played by multiple players by using a predetermined number of controllers (e.g., up to four) at the same time. The detailed configuration of the controller 5 will be described below.

The terminal device 7 is portable and sized so that it can be held in one or both of the user's hands. The user can hold and move the terminal device 7, or can use a terminal device 7 placed at an arbitrary position. The terminal device 7, whose detailed configuration will be described below, includes an LCD (Liquid Crystal Display) 51 as a display, input mechanisms (e.g., a touch panel 52), a gyrosensor 74, etc., to be described later). The terminal device 7 and the game device 3 can communicate with each other by a wireless connection (or by a wired connection). The terminal device 7 receives from the game device 3 data of images (e.g., game images) generated by the game device 3, and displays the images on the LCD 51. While an LCD is used as the display device in the embodiment, the terminal device 7 may include any other display device such as a display device utilizing EL (Electro Luminescence), for example. The terminal device 7 transmits operation data representing the content of operations performed on the terminal device itself to the game device 3.

[2. Internal Configuration of Game Device 3]

Figure 2:
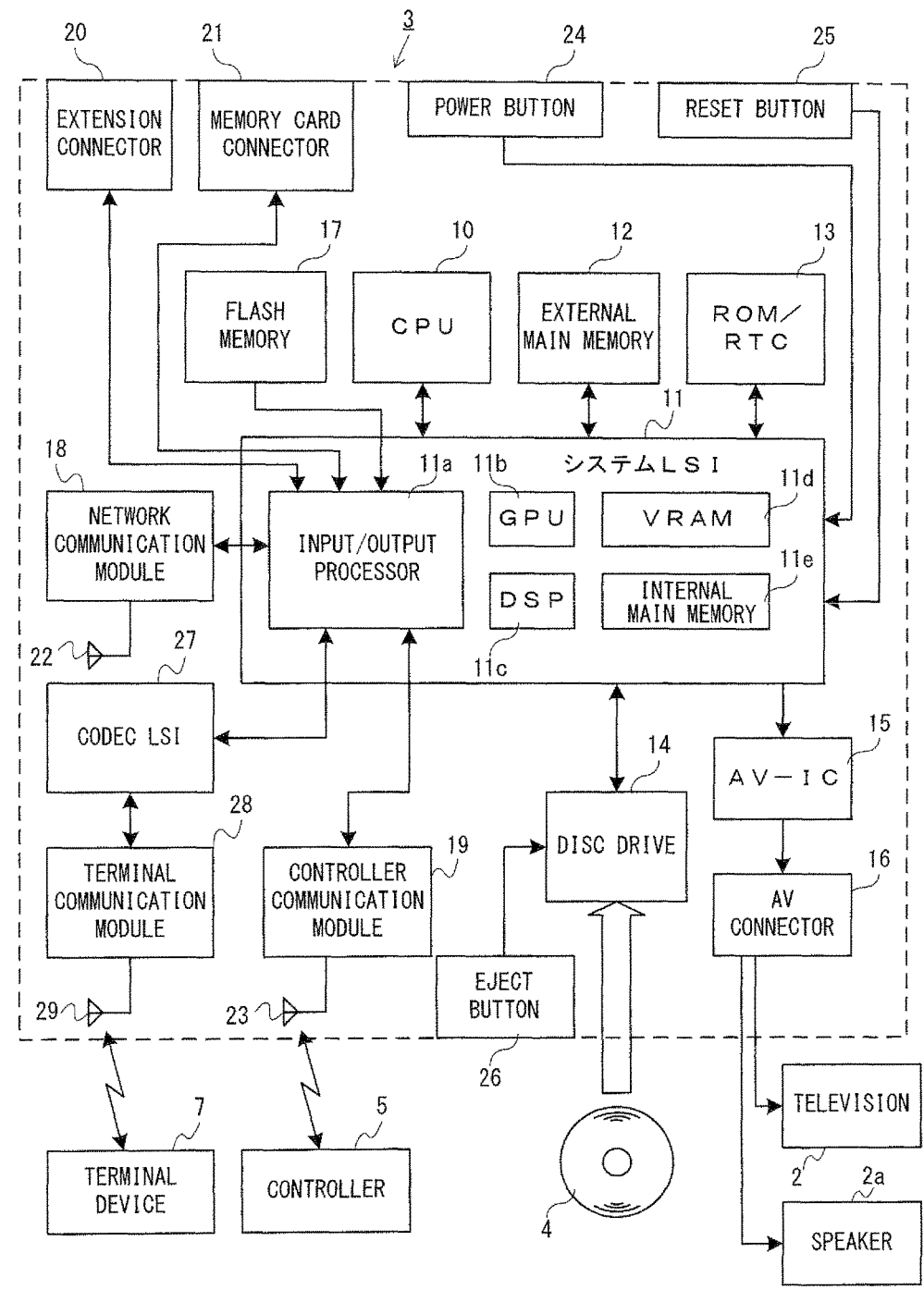
FIG. 2 is a block diagram showing an internal configuration of an example non-limiting game device 3.

An internal configuration of the game device 3 will be described with reference to FIG. 2. FIG. 2 is a block diagram illustrating an internal configuration of the game device 3. The game device 3 includes a CPU (Central Processing Unit) 10, a system LSI 11, an external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from a flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into an internal main memory 11e (to be described below) or the external main memory 12.

The system LSI 11 includes an input/output processor (I/O processor) 11a, a GPU (Graphics Processor Unit) 11b, a DSP (Digital. Signal Processor) 11c, a VRAM (Video RAM) 11d, and the internal main memory 11e. Although not shown in the figures, these components 11e to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) necessary for the GPU 11b to execute the graphics commands. When images are generated, the GPU 11b generates image data using data stored in the VRAM 11d. In the present embodiment, the game device 3 generates both images (game images) displayed on the television 2 and images (game images) displayed on the terminal device 7. Hereinafter, the images displayed on the television 2 may be referred to as the "television images", and the images displayed on the terminal device 7 may be referred to as the "terminal images".

The DSP 11c, functioning as an audio processor, generates sound data using sound data and sound waveform (e.g., tone quality) data stored in one or both of the internal main memory 11e and the external main memory 12. In the present embodiment, as with the game images, sounds (game sounds) to be outputted from the speaker of the television 2 and sounds (game sounds) to be outputted from the speaker of the terminal device 7 are both generated. Hereinafter, the sounds outputted from the television 2 may be referred to as "television sounds", and the sounds outputted from the terminal device 7 may be referred to as "terminal sounds".

As described above, of the images and sounds generated in the game device 3, data of the images and sounds outputted from the television 2 is read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a. While the connection scheme between the game device 3 and the television 2 may be any scheme, the game device 3 may transmit control commands for controlling the television 2 to the television 2 via a wired connection or a wireless connection. For example, an HDMI (High-Definition Multimedia Interface) cable in conformity with the HDMI standard may be used. In the HDMI standard, it is possible to control the connected device by a function called CEC (Consumer Electronics Control). Thus, in a case in which the game device 3 can control the television 2, as when an HDMI cable is used, the game device 3 can turn ON the power of the television 2 or switch the input of the television 2 from one to another at any point in time.

Of the images and sounds generated in the game device 3, data of the images and sounds outputted from the terminal device 7 are transmitted to the terminal device 7 by an input/output processor 11a, etc. The data transmission to the terminal device 7 by the input/output processor 11a, or the like, will be described below.

The input/output processor 11a exchanges data with components connected thereto, and downloads data from an external device(s). The input/output processor 11a is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to a network such as the Internet to communicate with external information processing devices (e.g., other game devices, various servers, computers, etc.). That is, the input/output processor 11e can be connected to a network such as the Internet via the network communication module 18 and the antenna 22 and can communicate with other information processing devices) connected to the network. The input/output processor 11a regularly accesses the flash memory 17, and detects the presence or absence of any data which needs to be transmitted to the network, and when detected, transmits the data to the network via the network communication module 18 and the antenna 22. Further, the input/output processor 11a receives data transmitted from an external information processing device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and an external information processing device. The flash memory 17 may also store a game program(s).

The game device 3 can receive operation data from the controller 5. That is, the input/output processor 11a receives operation data transmitted from the controller 5 via the antenna and the controller communication module 19, and stores (temporarily) it in a buffer area of the internal main memory 11e or the external main memory 12.

The game device 3 can exchange data such as images and sounds with the terminal device 7. When transmitting game images (terminal images) to the terminal device 7, the input/output processor 11a outputs data of game images generated by the GPU 11b to the codec LSI 27. The codec LSI 27 performs a predetermined compression process on the image data from the input/output processor 11a. The terminal communication module 28 wirelessly communicates with the terminal device 7. Therefore, image data compressed by the codec LSI 27 is transmitted by the terminal communication module 28 to the terminal device 7 via the antenna 29. In the present embodiment, the image data transmitted from the game device 3 to the terminal device 7 is image data used in a game, and the playability of a game can be adversely influenced if there is a delay in the images displayed in the game. Therefore, delay may be eliminated as much as possible for the transmission of image data from the game device 3 to the terminal device 7. Therefore, in the present embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

The game device 3 transmits sound data to the terminal device 7, in addition to image data. That is, the input/output processor 11a outputs sound data generated by the DSP 11c to the terminal communication module 28 via the codec LSI 27. The codec LSI 27 performs a compression process on sound data, as with image data. While the compression scheme for sound data may be any scheme, it may be a scheme with a high compression ratio and little sound deterioration. In other embodiments, the sound data may be transmitted uncompressed. The terminal communication module 28 transmits the compressed image data and sound data to the terminal device 7 via the antenna 29.

Moreover, the game device 3 transmits various control data to the terminal device 7 as necessary, in addition to the image data and the sound data. Control data is data representing control instructions for components of the terminal device 7, and represents, for example, an instruction for controlling the lighting of a marker section (a marker section 55 shown in FIG. 11), an instruction for controlling the image-capturing operation of a camera (a camera 56 shown in FIG. 11), etc. The input/output processor 11a transmits control data to the terminal device 7 in response to an instruction of the CPU 10. While the codec LSI 27 does not perform a data compression process in the present embodiment for the control data, it may perform a compression process in other embodiments. The above-described data transmitted from the game device 3 to the terminal device 7 may be encrypted as necessary or may not be encrypted.

The game device 3 can receive various data from the terminal device 7. In the present embodiment, the terminal device 7 transmits operation data, image data and sound data, the details of which will be described below. Data transmitted from the terminal device 7 are received by the terminal communication module 28 via the antenna 29. The image data and the sound data from the terminal device 7 are subjected to a compression process similar to that on the image data and the sound data from the game device 3 to the terminal device 7. Therefore, these image data and sound data are sent from the terminal communication module 28 to the codec LSI 27, and subjected to an expansion process by the codec LSI 27 to be outputted to the input/output processor 11a. On the other hand, the operation data from the terminal device 7 may not be subjected to a compression process since the amount of data is small as compared with images and sounds. It may be encrypted as necessary, or it may not be encrypted. After being received by the terminal communication module 28, the operation data is outputted to the input/output processor 11a via the codec LSI 27. The input/output processor 11a stores (temporarily) data received from the terminal device 7 in a buffer area of the internal main memory 11e or the external main memory 12.

The game device 3 can be connected to another device or an external storage medium. That is, the input/output processor 11e is connected to the extension connector 20 and the memory card connector 21. The extension connector 20 is a connector for an interface, such as a USB or SCSI interface. The extension connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the extension connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied to the components of the game device 3 from an external power supply through an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other embodiments, some of the components of the game device 3 may be provided as extension devices separate from the game device 3. In this case, an extension device may be connected to the game device 3 via the extension connector 20, for example. Specifically, an extension device may include components of the codec LSI 27, the terminal communication module 28 and the antenna 29, for example, and can be attached/detached to/from the extension connector 20. Thus, by connecting the extension device to a game device which does not include the above components, the game device can communicate with the terminal device 7.

[3. Configuration of Controller 5]

Figure 3:
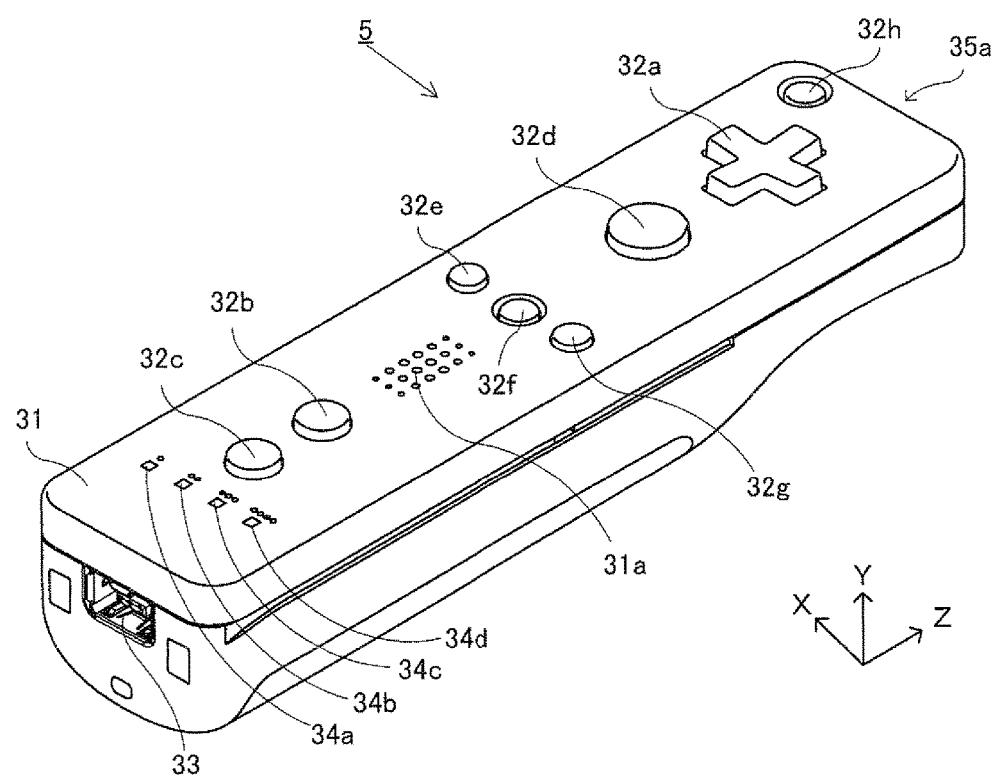
FIG. 3 is a perspective view showing an external configuration of an example non-limiting controller 5.
Figure 4:
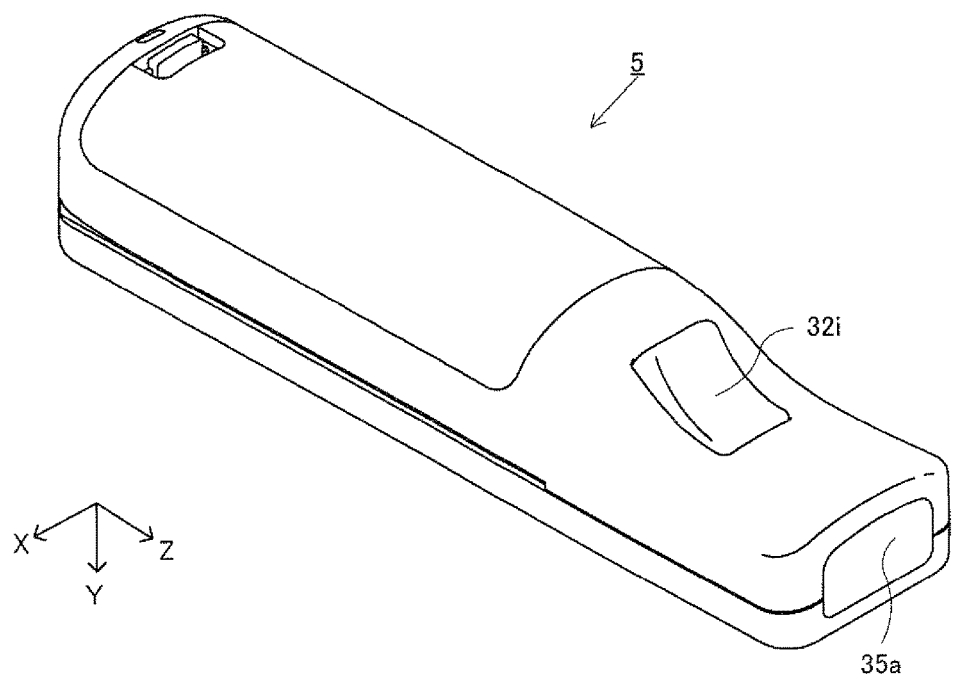
FIG. 4 is a perspective view showing an external configuration of the example non-limiting controller 5.

Next, with reference to FIGS. 3 to 7, the controller 5 will be described. FIG. 3 is one perspective view illustrating an external configuration of the controller 5. FIG. 4 is another perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIGS. 3 and 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or a child. A user can perform game operations by pressing buttons provided on the controller 5, and by moving the controller 5 itself to change the position and the orientation (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present specification, the top surface of the housing 31 on which the buttons 32a to 32h are provided may be referred to as a "button surface". As shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game device 3. Further, the power button 32h is used to remotely turn ON/OFF the game device 3. The home button 32f and the power button 32h each have the top surface thereof recessed below the top surface of the housing 31. Therefore, the likelihood of the home button 32f and the power button 32h being inadvertently pressed by the user is reduced.

On the rear surface of the housing 31, the connector 33 is provided. The connector 33 is used for connecting another device (e.g., another sensor unit or another controller) to the controller 5. Both sides of the connector 33 on the rear surface of the housing 31 have a engagement hole 33a (see FIG. 6) for preventing easy inadvertent disengagement of a device connected to the controller 5 as described above.

In the rear-side portion of the top surface of the housing 31, a plurality (four in FIG. 3) of LEDs 34a to 34d are provided. The controller 5 is assigned a controller type (number) so as to be distinguishable from other controllers. The LEDs 34a to 34d are each used for informing the user of the controller type which is currently set for the controller 5, and for informing the user of the battery level of the controller 5, for example. Specifically, when game operations are performed using the controller 5, one of the plurality of LEDs 34a to 34d corresponding to the controller type is lit up.

The controller 5 has an image capturing/processing section 35 (FIG. 6), and a light incident surface 35a of an image capturing/processing section 35 is provided on the front surface of the housing 31, as shown in FIG. 4. The light incident surface 35a is made of a material transmitting therethrough at least infrared light from the markers 6R and 6L.

On the top surface of the housing 31, sound holes 31a for externally outputting a sound from a speaker 49 (see FIG. 5) provided in the controller 5 are provided between the first button 32b and the home button 32f.

Figure 5:
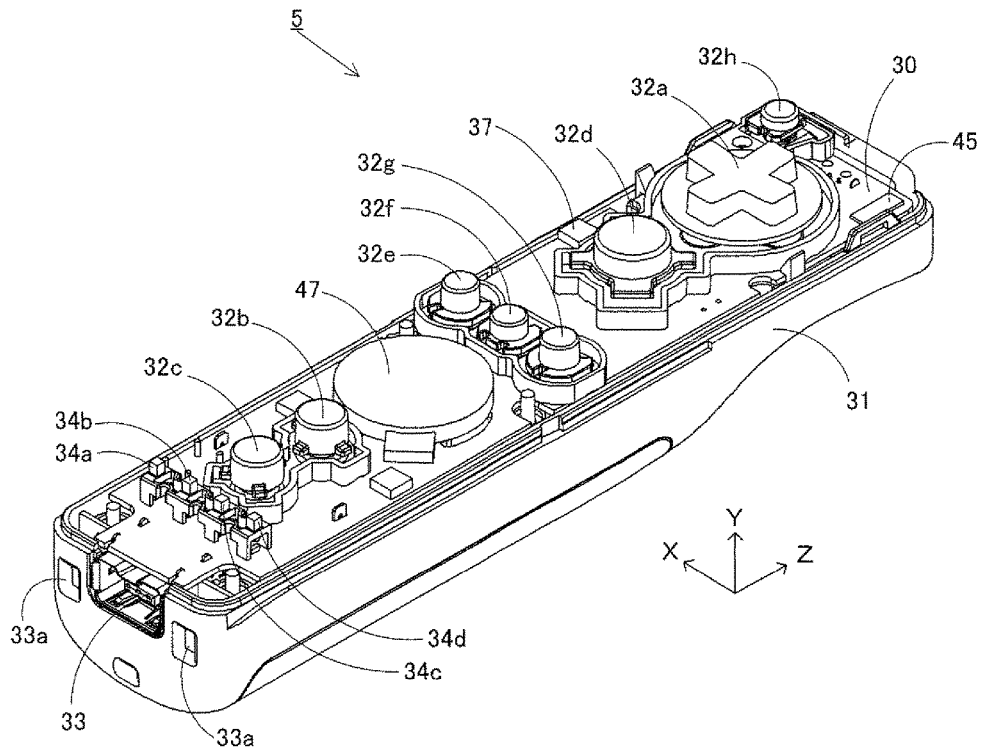
FIG. 5 is a diagram showing an internal configuration of the example non-limiting controller 5.
Figure 6:
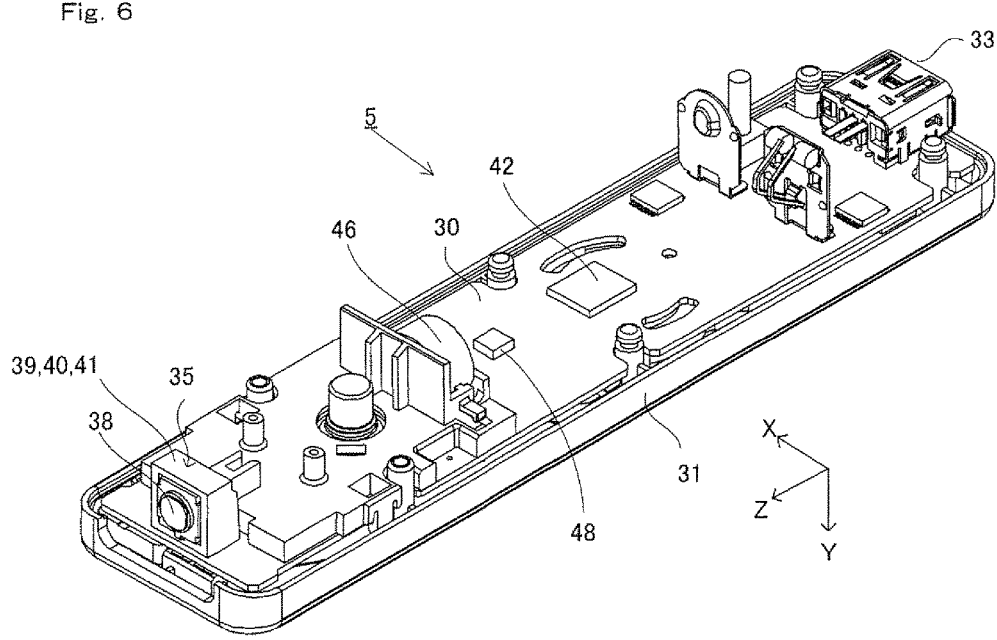
FIG. 6 is a diagram showing an internal configuration of the example non-limiting controller 5.

Next, with reference to FIGS. 5 and 6, an internal structure of the controller 5 will be described. FIGS. 5 and 6 are diagrams illustrating the internal structure of the controller 5. FIG. 5 is a perspective view illustrating a state in which an upper casing (a part of the housing 31) of the controller 5 is removed. FIG. 6 is a perspective view illustrating a state in which a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided at a position offset from the center of the controller 5 with respect to the X-axis direction. Thus, calculation of the movement of the controller 5 being rotated about the Z-axis is facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

As shown in FIG. 6, at a front edge of a bottom main surface of the substrate 30, the image capturing/processing section 35 is provided. The image capturing/processing section 35 includes an infrared filter 38, a lens 39, an image capturing element 40 and an image processing circuit 41 located in this order from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present embodiment, the vibrator 46 is disposed slightly toward the front of the housing 31. That is, the vibrator 46 is positioned offset from the center toward the end of the controller 5 so that the vibration of the vibrator 46 greatly vibrates the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

The shape of the controller 5, the shape of each operation button, the number and the positions of acceleration sensors and vibrators, and so on, shown in FIGS. 3 to 6 are merely illustrative, and the systems, methods, and techniques described herein may be implemented with controllers having other shapes, numbers, and positions. Further, although in the present embodiment the image-capturing direction of the image-capturing section is the Z-axis positive direction, the image-capturing direction may be any direction. That is, the position of the image capturing/processing section 35 (the light incident surface 35a of the image capturing/processing section 35) in the controller 5 may not be on the front surface of the housing 31, but may be on any other surface on which light can be received from the outside of the housing 31.

Figure 7:
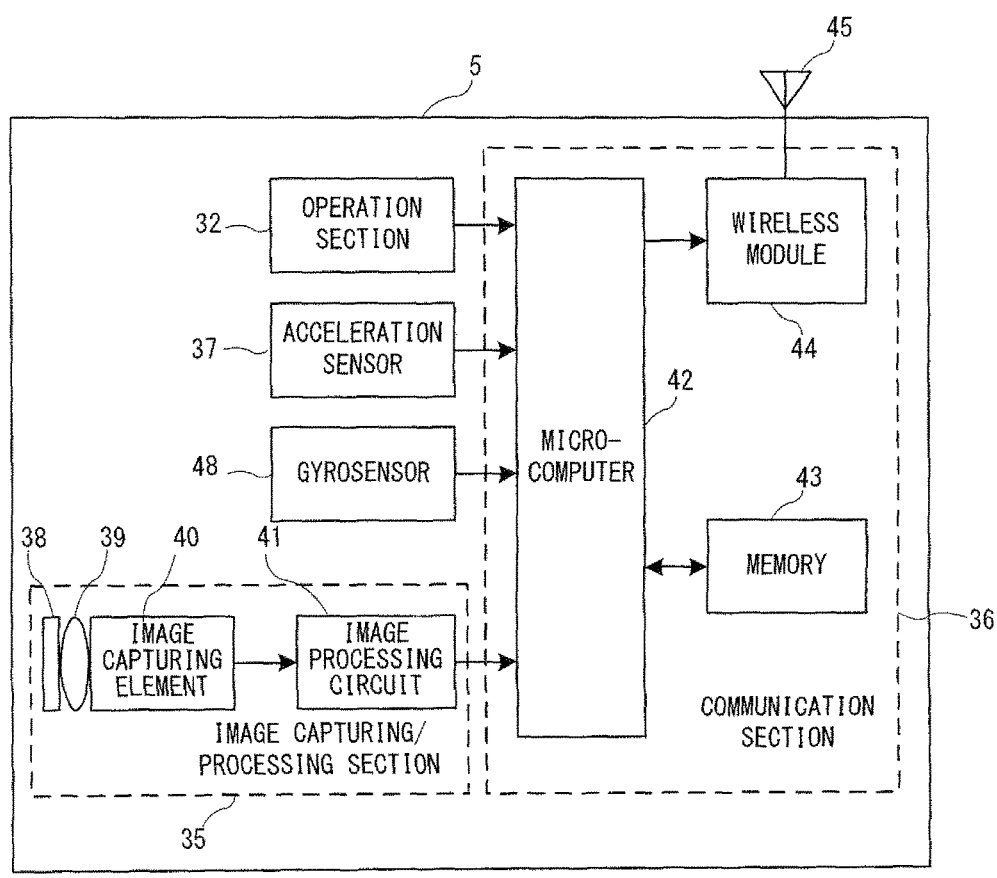
FIG. 7 is a block diagram showing a configuration of the example non-limiting controller 5.

FIG. 7 is a block diagram illustrating a configuration of the controller 5. The controller 5 includes an operation section (the operation buttons 32a to 32i), the image capturing/processing section 35, a communication section 36, the acceleration sensor 37, and a gyrosensor 48. The controller 5 transmits to the game device 3, as operation data, data representing the content of operations performed on the controller itself. Hereinafter, the operation data transmitted by the controller 5 may be referred to as the "controller operation data", and the operation data transmitted by the terminal device 7 may be referred to as the "terminal operation data".

The operation section 32 includes the operation buttons 32a to 32i described above, and outputs, to the microcomputer 42 of the communication section 36, operation button data indicating the input status of the operation buttons 32a to 32i (e.g., whether or not the operation buttons 32a to 32i are pressed).

The image capturing/processing section 35 is a system for analyzing image data captured by the image-capturing element and calculating the centroid, the size, etc., of an area (s) having a high brightness in the image data. The image capturing/processing section 35 has a maximum sampling period of, for example, about 200 frames/sec., and therefore can trace and analyze even relatively fast motion of the controller 5.

The image capturing/processing section 35 includes the infrared filter 38, the lens 39, the image capturing element 40 and the image processing circuit 41. The infrared filter 38 transmits therethrough only infrared light included in the light incident on the front surface of the controller 5. The lens 39 collects the infrared light transmitted through the infrared filter 38 so that it is incident on the image capturing element 40. The image capturing element 40 is a solid-state image-capturing device such as, for example, a CMOS sensor or a CCD sensor, which receives the infrared light collected by the lens 39, and outputs an image signal. The marker section 55 of the terminal device 7 and the marker device 6 of which images are captured are formed by markers outputting infrared light. Therefore, the provision of the infrared filter 38 enables the image capturing element 40 to receive only the infrared light transmitted through the infrared filter 38 and generate image data, so that an image of the image-capturing object (e.g., the markers of a marker section 55 and/or the marker device 6) can be captured more accurately. Hereinafter, the image taken by the image capturing element 40 is referred to as a captured image. The image data generated by the image capturing element 40 is processed by the image processing circuit 41. The image processing circuit 41 calculates the positions of the image-capturing objects within the captured image. The image processing circuit 41 outputs coordinates of the calculated positions, to the microcomputer 42 of the communication section 36. The data representing the coordinates is transmitted as operation data to the game device 3 by the microcomputer 42. Hereinafter, the coordinates are referred to as "marker coordinates". The marker coordinates change depending on the roll orientation (roll angle about the z axis) and/or the position of the controller 5 itself, and therefore the game device 3 can calculate, for example, the roll angle and the position of the controller 5 using the marker coordinates.

In other embodiments, the controller 5 may not include the image processing circuit 41, and the captured image itself may be transmitted from the controller 5 to the game device 3. In this case, the game device 3 may have a circuit or a program, having the same function as the image processing circuit 41, for calculating the marker coordinates.

The acceleration sensor 37 detects accelerations (including gravitational acceleration) of the controller 5, that is, force (including gravity) applied to the controller 5. The acceleration sensor 37 detects a value of a portion of acceleration (linear acceleration) that is applied to the detection section of the acceleration sensor 37 in the straight line direction along the sensing axis direction, among all the acceleration applied to the detection section of the acceleration sensor 37. For example, a multi-axis acceleration sensor having two or more axes detects acceleration components along the axes, as the acceleration applied to the detection section of the acceleration sensor. While the acceleration sensor 37 is assumed to be an electrostatic capacitance type MEMS (Micro Electro Mechanical System) acceleration sensor, other types of acceleration sensors may be used.

In the present embodiment, the acceleration sensor 37 detects linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the orientation and the movement of the controller 5 itself, and therefore the game device 3 is capable of calculating the orientation and the movement of the controller 5 using the obtained acceleration data. In the present embodiment, the game device 3 calculates the attitude, the roll angle, etc., of the controller 5 based on the obtained acceleration data.

One skilled in the art will readily understand from the description herein that additional information relating to the controller 5 can be estimated or calculated (determined) through a process by a computer, such as a processor (for example, the CPU 10) of the game device 3 or a processor (for example, the microcomputer 42) of the controller 5, based on an acceleration signal outputted from the acceleration sensor 37 (this applies also to an acceleration sensor 73 to be described later). For example, in the case in which the computer performs a process on the premise that the controller 5 including the acceleration sensor 37 is in static state (that is, in the case in which the process is performed on the premise that the acceleration to be detected by the acceleration sensor includes only the gravitational acceleration), when the controller 5 is actually in static state, it is possible to determine whether or not, or how much the controller 5 is tilting relative to the direction of gravity, based on the detected acceleration. Specifically, when the state in which the detection axis of the acceleration sensor 37 faces vertically downward is used as a reference, whether or not the controller 5 is tilting relative to the reference can be determined based on whether or not 1G (gravitational acceleration) is present, and the degree of tilt of the controller 5 relative to the reference can be determined based on the magnitude thereof. Further, with the multi-axis acceleration sensor 37, it is possible to more specifically determine the degree of tilt of the controller 5 relative to the direction of gravity by performing a process on the acceleration signals of different axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is premised that the controller 5 is in dynamic state (in which the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is premised that the controller 5 is in dynamic state, it is possible to determine the tilt of the controller 5 relative to the direction of gravity by removing the acceleration component based on the movement of the acceleration sensor from the detected acceleration through a predetermined process. In other embodiments, the acceleration sensor 37 may include an embedded processor or other type of dedicated processor for performing a predetermined process on an acceleration signal detected by the built-in acceleration detector before the acceleration signal is outputted to the microcomputer 42. For example, when the acceleration sensor 37 is used to detect static acceleration (for example, gravitational acceleration), the embedded or dedicated processor may convert the acceleration signal to a tilt angle (s) (or another parameter).

The gyrosensor 48 detects angular velocities about three axes (the X, Y and Z axes in the embodiment). In the present specification, with respect to the image-capturing direction (the Z-axis positive direction) of the controller 5, the rotation direction about the X axis is referred to as the pitch direction, the rotation direction about the Y axis as the yaw direction, and the rotation direction about the Z axis as the roll direction. The number and combination of gyrosensors to be used are not limited to any particular number and combination as long as a gyrosensor 48 can detect angular velocities about three axes. For example, the gyrosensor 48 may be a 3-axis gyrosensor, or angular velocities about three axes may be detected by combining together a 2-axis gyrosensor and a 1-axis gyrosensor. Data representing the angular velocity detected by the gyrosensor 48 is outputted to the communication section 36. The gyrosensor 48 may be a gyrosensor that detects an angular velocity or velocities about one axis or two axes.

The communication section 36 includes the microcomputer 42, a memory 43, the wireless module 44 and the antenna 45. The microcomputer 42 controls the wireless module 44 for wirelessly transmitting, to the game device 3, data acquired by the microcomputer 42 while using the memory 43 as a storage area in the process.

Data outputted from the operation section 32, the image capturing/processing section 35, the acceleration sensor 37 and the gyrosensor 48 to the microcomputer 42 are temporarily stored in the memory 43. The data are transmitted as the operation data (controller operation data) to the game device 3. At the time of the transmission to the controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. Based on the obtained operation data, the CPU 10 of the game device 3 performs the game process. Note that while the wireless transmission from the communication section 36 to the controller communication module 19 is sequentially performed with a predetermined cycle, since the game process is generally performed with a cycle of $\frac{1}{60}$ sec (as one frame period), the transmission may be performed with a cycle less than or equal to this period. The communication section 36 of the controller 5 outputs, to the controller communication module 19 of the game device 3, the operation data at a rate of once per $\frac{1}{200}$ sec, for example.

As described above, as operation data representing operations performed on the controller itself, the controller 5 can transmit marker coordinate data, acceleration data, angular velocity data, and operation button data. The game device 3 performs the game processes using the operation data as game inputs. Therefore, by using the controller 5, the user can perform game operations of moving the controller 5 itself, in addition to the conventional typical game operation of pressing the operation buttons. For example, it enables an operation of tilting the controller 5 to an intended attitude, an operation of specifying an intended position on the screen with the controller 5, an operation of moving the controller 5 itself, etc.

While the controller 5 does not include the display for displaying the game image in the embodiment, it may include a display for displaying, for example, an image representing the battery level, etc.

[4. Configuration of Terminal Device 7]

Figure 8:
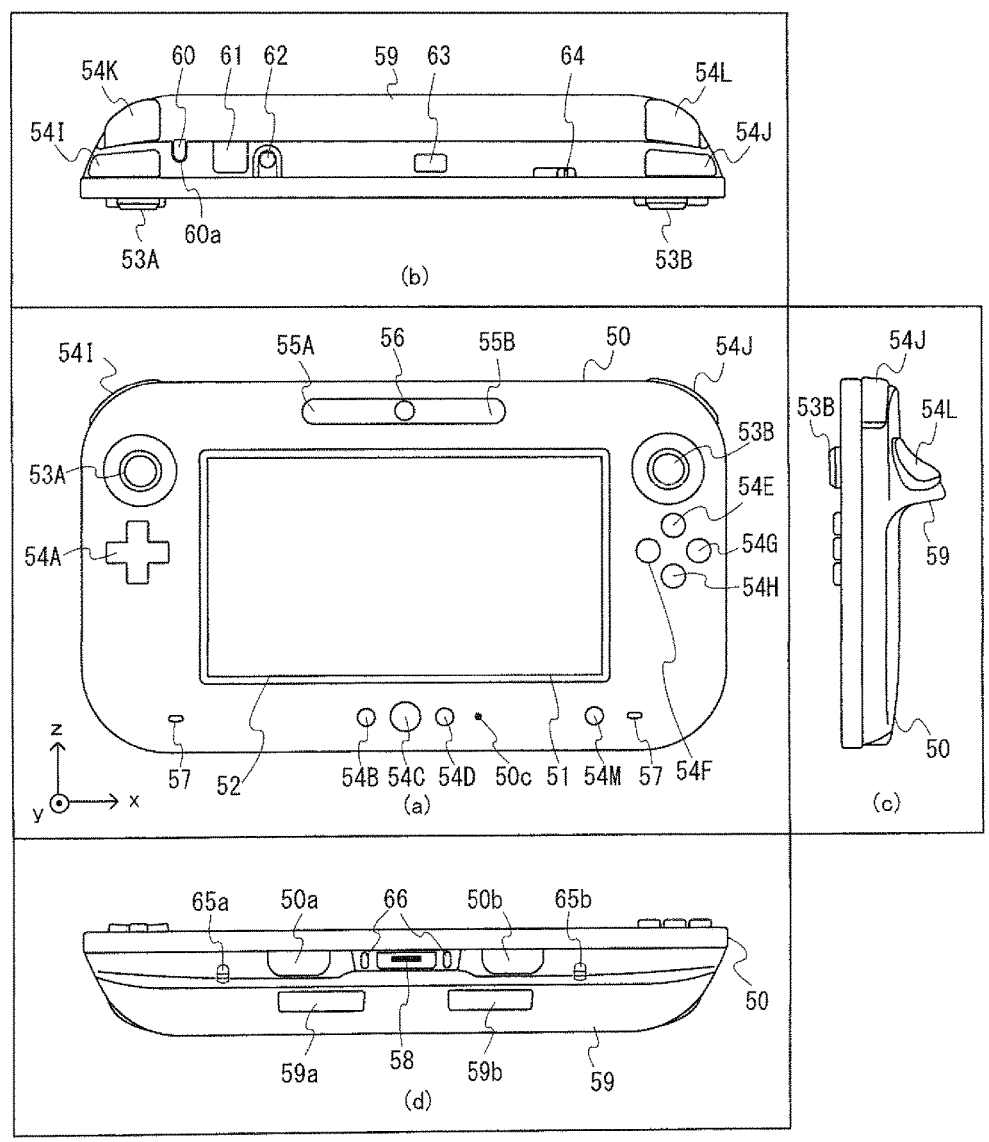
FIG. 8 is a diagram showing an external configuration of an example non-limiting terminal device 7.
Figure 9:
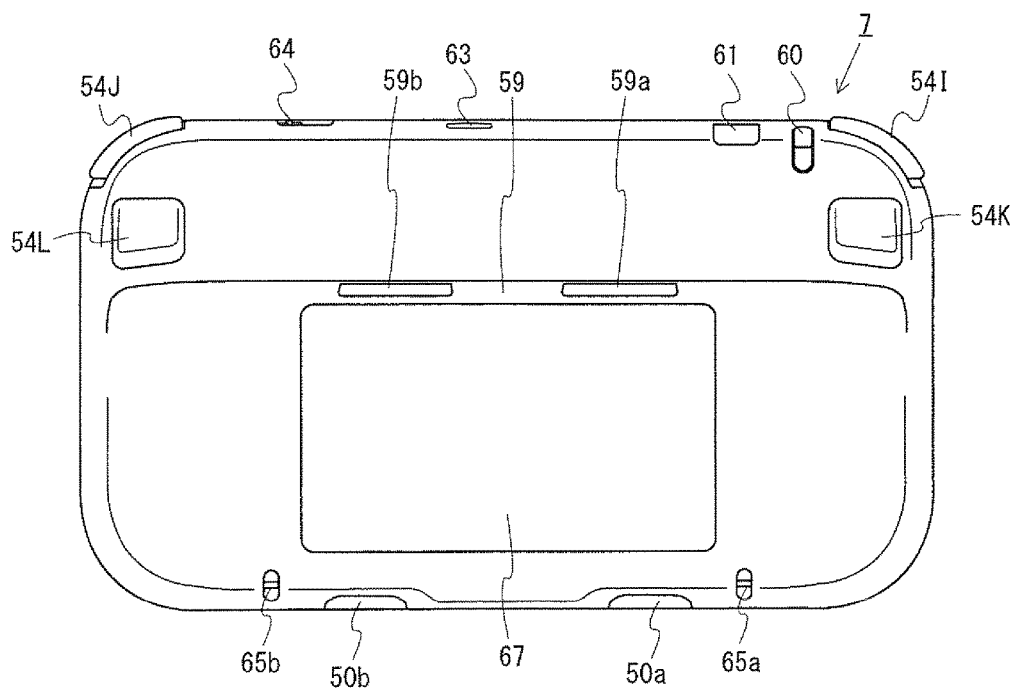
FIG. 9 is a diagram showing an external configuration of the example non-limiting terminal device 7.
Figure 10:
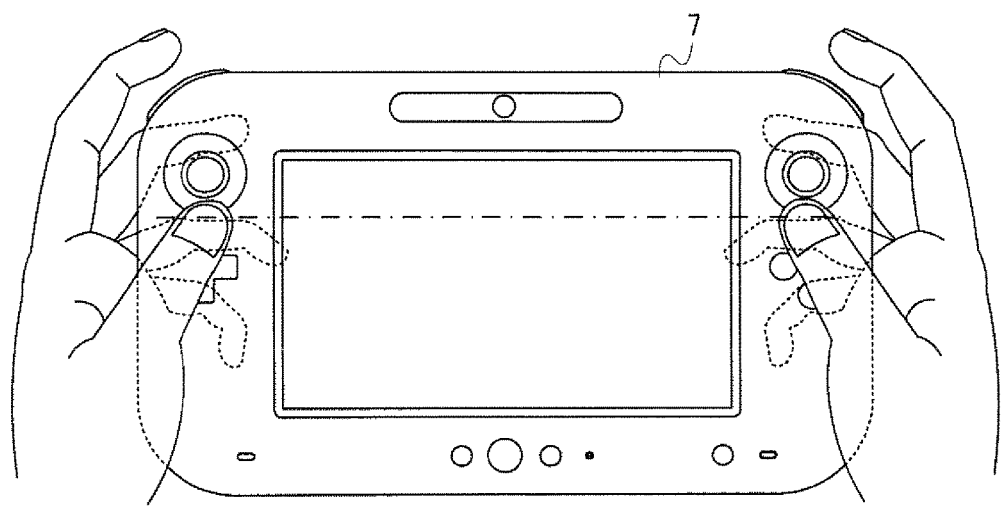
FIG. 10 is a diagram showing the example non-limiting terminal device 7 being held by the user in a landscape position.

Next, a configuration of a terminal device 7 will be described with reference to FIGS. 8 to 11. FIG. 8 is a plan view showing an external configuration of the terminal device 7. FIG. 8(*a*) is a front view of the terminal device 7, FIG. 8(*b*) is a top view thereof, FIG. 8(*c*) is a right side view thereof, and FIG. 8(*d*) is a bottom view thereof. FIG. 9 is a back view of the terminal device 7. FIG. 10 is a diagram showing a user holding the terminal device 7 in a landscape position.

As shown in FIG. 8, the terminal device 7 includes a housing 50 generally in a horizontally-elongated rectangular plate shape. That is, it can also be said that the terminal device 7 is a tablet-type information processing device. The housing 50 may have a curved surface or may have some protrusions, etc., as long as it is generally in a plate shape. The housing 50 is sized so that it can be held by the user. Thus, the user can hold and move the terminal device 7, and can change the position in which the terminal device 7 is placed. The longitudinal (z-axis direction) length of the terminal device 7 may be 100 to 150 [mm], and is 133.5 [mm] in the present embodiment. The widthwise (x-axis direction) length of the terminal device 7 may be 200 to 250 [mm], and is 228.26 [mm] in the present embodiment. The thickness (the length in the y-axis direction) of the terminal device 7 may be about 15 to about 30 [mm] in a plate-shaped portion and about 30 to about 50 [mm] including the thickest part, and is 23.6 (40.26 in the thickest part) [mm] in the present embodiment. The weight of the terminal device 7 is about 400 to about 600 [g], and is 530 [g] in the present embodiment. Although the details will be described later, the terminal device 7 is configured so that it is easily held and operated by the user even though it is such a relatively large terminal device (controller device) as described above.

The terminal device 7 includes an LCD 51 on the front surface (front side) of the housing 50. The size of the screen of the LCD 51 may be 5 inches or larger, and is herein 6.2 inches. The terminal device 7 of the present embodiment has such a configuration that it is easily held and operated, and it is therefore easy to operate even if a large LCD is provided. In other embodiments, the terminal device 7 may be of a relatively small size with the provision of a smaller LCD 51. The LCD 51 is provided near the center of the surface of the housing 50. Therefore, the user can hold and move the terminal device 7 while looking at the screen of the LCD 51 by holding opposing end portions of the housing 50 with respect to the LCD 51, as shown in FIG. 10. While FIG. 10 shows an example in which the user holds the terminal device 7 in a landscape position (in a horizontally-oriented direction) by holding left and right opposing end portions of the housing 50 with respect to the LCD 51, the user can hold the terminal device 7 in a portrait position (in a vertically-oriented direction).

As shown in FIG. 8(a), the terminal device 7 includes a touch panel 52 on the screen of the LCD 51 as an operation mechanism In the present embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In the present embodiment, a touch panel having the same resolution (detection precision) as the resolution of the LCD 51 is used as the touch panel 52. However the resolution of the touch panel 52 does not always need to coincide with the resolution of the LCD 51. While a touch pen 60 is usually used for making inputs on the touch panel 52, an input may be made on the touch panel 52 with a finger of the user, instead of using the touch pen 60. The housing 50 is provided with a hole 60a for accommodating the touch pen 60 used for performing operations on the touch panel 52 (see FIG. 8(b)). While the hole 60a is provided on the upper surface of the housing 50 so that the touch pen 60 does not fall, it may be provided on the side surface or the bottom surface. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 8, the terminal device 7 includes two analog sticks 53A and 53B and a plurality of buttons (keys) 54A to 54M, as operation mechanisms (operation sections). The analog sticks 53A and 535 are each a direction-specifying device. The analog sticks 53A and 535 are each configured so that the movable member (stick portion) operated with a finger of the user can be slid in any direction (at any angle in the up, down, left, right and diagonal directions) with respect to the surface of the housing 50. That is, it is a direction input device which is also called a slide pad. The movable member of each of the analog sticks 53A and 535 may be of such a type that it is tilted in any direction with respect to the surface of the housing 50. Since the present embodiment use analog sticks of such a type that the movable members slide, the user can operate the analog sticks 53A and 535 without significantly moving the thumbs, and therefore operations can be made while the housing 50 is held more firmly. When analog sticks of such a type that the movable members tilt are used as the analog sticks 53A and 53B, the degree of input (the degree of tilt) is better perceived by the user, thus allowing the user to more easily perform precise operations.

The left analog stick 53A is provided on the left side of the screen of the LCD 51, and the right analog stick 539 is provided on the right side of the screen of the LCD 51. Therefore, the user can make a direction-specifying input by using an analog stick with either the left or the right hand. As shown in FIG. 10, the analog sticks 53A and 539 are provided at such positions that the user can operate them while holding the left and right portions of the terminal device 7 (the left and right opposing end portions with respect to the LCD 51), and therefore the user can easily operate the analog sticks 53A and 539 even when holding and moving the terminal device 7.

The buttons 54A to 54L are operation mechanisms (operation sections) for making predetermined inputs, and are keys that can be pressed. As will be discussed below, the buttons 54A to 54L are provided at such positions that the user can operate them while holding the left and right portions of the terminal device 7 (see FIG. 10). Therefore, the user can easily operate these operation mechanisms even when holding and moving the terminal device 7.

As shown in FIG. 8(a), the cross button (direction-input button) 54A and the buttons 54B to 54H and 54M, of the operation buttons 54A to 54L, are provided on the front surface of the housing 50. That is, these buttons 54A to 54H and 54M are provided at positions at which they can be operated by the thumbs of the user (see FIG. 10).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify at least up, down, left and right directions.

The buttons 54B to 54D are provided on the lower side of the LCD 51. These three buttons 54B to 54D are provided at positions at which they can be operated with either the left or the right hand. The terminal device 7 includes the power button 54M for turning ON/OFF the power of the terminal device 7. The power of the game device 3 can be remotely turned ON/OFF by operating the power button 54M. The power button 54M is provided on the lower side of the LCD 51 as are the buttons 54B to 54D. The power button 54M is provided on the right side of the buttons 54B to 54D. Thus, the power button 54M is provided at a position at which it can be operated (easily operated) with the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

In the present embodiment, the analog sticks 53A and 535 are provided above the cross button 54A and the buttons 54E to 54H. Here, the analog sticks 53A and 53B protrude beyond the cross button 54A and the buttons 54E to 54H in the thickness direction (the y-axis direction). Therefore, if the positions of the analog stick 53A and the cross button 54A are reversed, the thumb of the user may inadvertently touch the analog stick 53A when the user is operating the cross button 54A with the thumb. A similar problem occurs also when the positions of the analog stick 53B and the buttons 54E to 54H are reversed. In contrast, in the present embodiment, since the analog sticks 53A and 53B are provided above the cross button 54A and the buttons 54E to 54H, the possibility that a finger may inadvertently touch the cross button 54A and the buttons 54E to 54H when the user is operating the analog sticks 53A and 53B is smaller as compared with the above cases. Thus, in the present embodiment, the possibility of erroneous operations can be reduced, and it is possible to improve the controllability of the terminal device 7. Note however that in other embodiments, the positions of the analog stick 53A and the cross button 54A may be reversed and the positions of the analog stick 53B and the buttons 54E to 54H may be reversed as necessary.

Here, in the present embodiment, some operation sections (the analog sticks 53A and 53B, the cross button 54A, and the three buttons 54E to 54G) are provided on the left and right opposing sides of the display section (the LCD 51) and above the center of the housing 50 in the up/down direction (y-axis direction). When operating these operation sections, the user primarily holds a portion of the terminal device 7 that is above the center thereof in the up/down direction. If the user holds the lower portion of the housing 50 (particularly if the terminal device 7 has a relatively large size as in the present embodiment), the terminal device 7 to be held becomes unstable, making it more difficult for the user to hold the terminal device 7. In contrast, in the present embodiment, when operating the operation section, the user primarily holds a portion of the terminal device 7 that is above the center thereof in the up/down direction, and the housing 50 can be supported from the sides by the palms. Therefore, the user can stably hold the housing 50 and it is made easier to hold the terminal device 7, thus making it easier to operate the operation section. In other embodiments, operation sections are provided, at least one on the left and one on the right of the display section, above the center of the housing 50. For example, only the analog sticks 53A and 53B may be provided above the center of the housing 50. For example, in a case in which the cross button 54A is provided above the left analog stick 53A and the four buttons 54E to 54H are provided above the right analog stick 53B, the cross button 54A and the four buttons 54E to 54H may be provided above the center of the housing 50.

In the present embodiment, a projecting portion (an eaves portion 59) is provided on the back side of the housing 50 (the side opposite to the front surface where the LCD 51 is provided) (see FIGS. 8(c) and 9). As shown in FIG. 8(c), the eaves portion 59 is a mountain-shaped member which is projecting from the back surface of the generally plate-shaped housing 50. The projecting portion has such a height (thickness) that it can rest on fingers of the user holding the back surface of the housing 50. The height of the projecting portion may be 10 to 25 [mm], and is 16.66 [mm] in the present embodiment. The bottom surface of the projecting portion may have an inclination of 45° or more (or 60° or more) with respect to the back surface of the housing 50 so that the projecting portion easily rests on fingers of the user. As shown in FIG. 8(c), the bottom surface of the projecting portion may have a larger inclination angle than the upper surface. As shown in FIG. 10, the user can hold the terminal device 7 stably without getting tired even if the terminal device 7 has a relatively large size by holding the terminal device 7 while resting fingers on the eaves portion 59 (placing the eaves portion 59 on the fingers). That is, the eaves portion 59 can be referred to as a supporting member by means of which the housing 50 is supported by fingers, and can be referred to also as a finger-resting portion.

The eaves portion 59 is provided above the center of the housing 50 with respect to the up/down direction. The eaves portion 59 is provided on the reverse side so as to generally correspond to the operation sections (the analog sticks 53A and 53B) which are provided on the front surface of the housing 50. That is, the projecting portion is provided so as to extend across an area on the reverse side including positions corresponding to the operation sections which are provided respectively on the left side and on the right side of the display section. Therefore, when operating the operation section, the user can hold the terminal device 7 so as to support the eaves portion 59 with the middle fingers or the ring fingers (see FIG. 10). Then, it is easier to hold the terminal device 7, and it is easier to operate the operation sections. In the present embodiment, since the projecting portion has an eaves-like shape extending in the left/right direction, the user can hold the terminal device 7 with the middle fingers or the ring fingers placed along the bottom surface of the projecting portion, making it easier to hold the terminal device 7. The eaves portion 59 is not limited to the shape extending in the horizontal direction as shown in FIG. 9, as long as it is formed so that it (i.e., a portion thereof that is projecting) extends in the left/right direction. In other embodiments, the eaves portion 59 may extend in a direction that is slightly inclined from the horizontal direction. For example, the eaves portion 59 may be provided so as to be inclined upwardly (or downwardly) from the left and right opposing end portions toward the center.

The present embodiment employs the eaves portion 59 having a shape of an eaves as the projecting portion formed on the back surface of the housing for the purpose of providing engagement holes to be described below in the eaves portion 59, but the projecting portion may have any other suitable shape. For example, in other embodiments, two projecting portions may be provided in the left and right opposing portions (with no projecting portion in the center of the left/right direction) on the back side of the housing 50 (see FIG. 29). In other embodiments, the cross-sectional shape (the shape along the cross section vertical to the x-axis direction) of the projecting portion may have an arched shape (which opens downward) so that the terminal device 7 can be more firmly supported by the fingers of the user (so that the projecting portion more firmly rests on the fingers).

The width of the projecting portion (the eaves portion 59) in the up/down direction may be of any value. For example, the projecting portion may be formed so as to extend to the top side of the housing 50. That is, the upper surface of the projecting portion may be formed at the same position as the side surface on the upper side of the housing 50. Then, the housing 50 has a 2-tiered structure with the thin lower side and the thick upper side. As described above, the housing 50 may include a down-facing surface (the bottom surface of the projecting portion) formed in the left and right opposing portions of the back surface. Then, the user can easily hold the controller device with fingers abutting against this surface. While the "down-facing surface" may be provided at any position on the back surface of the housing 50, it may be located above the center of the housing 50.

As shown in FIGS. 8(a), 8(b) and 8(c), a first L button 54I and a first R button 54J are provided respectively in the right and left opposing portions on the upper surface of the housing 50. In the present embodiment, the first L button 54I and the first R button 54J are provided on diagonally upper portions (the left upper portion and the right upper portion) of the housing 50. Specifically, the first L button 54I is provided at the left end of the upper side surface of the plate-like housing 50 so that it is exposed on the upper left side surface (in other words, it is exposed on both the upper and left side surfaces). The first R button 54J is provided at the right end of the upper side surface of the housing 50, and is exposed on the upper right side surface (in other words, it is exposed on both the upper and right side surfaces). Thus, the first L button 54I is provided at such a position that it can be operated with the left index finger of the user, and the first R button 54J is provided at such a position that it can be operated with the right index finger of the user (see FIG. 10). In other embodiments, the operation sections provided respectively in the left and right portions of the upper surface of the housing 50 do not have to be provided at the left end and the right end, and may be provided at positions other than the end portions. The operation sections may be provided respectively on the left and right side surfaces of the housing 50.

As shown in FIGS. 8(*c*) and 9, a second L button 54K and a second R button 54L are provided on the projecting portion (the eaves portion 59). The second L button 54K is provided near the left end of the eaves portion 59. The second R button 54L is provided near the right end of the eaves portion 59. Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided on the reverse side so as to (generally) correspond to the left analog stick 53A provided on the front surface, and the second R button 54L is provided on the reverse side so as to (generally) correspond to the right analog stick 53B provided on the front surface. Thus, the second L button 54K is provided at a position at which it can be operated with the left middle finger or left index finger of the user, and the second R button 54L is provided at a position at which it can be operated with the right middle finger or right index finger of the user (see FIG. 10). The second L button 54K and the second R button 54L are provided on the upper surface of the eaves portion 59 as shown in FIG. 8(*c*). Therefore, the second L button 54K and the second R button 54L have upwardly-facing (diagonally-upwardly-facing) button surfaces. It is believed that the middle fingers or the index fingers will generally move in the up/down direction when the user holds the terminal device 7, and it will be easier for the user to press the second L button 54K and the second R button 54L if the button surfaces are facing upward.

As described above, in the present embodiment, operation sections (the analog sticks 53A and 53B) are provided respectively on the left side and the right side of the display section (the LCD 51) above the center of the housing 50, and other operation sections (the second L button 54K and the second R button 54L) are provided on the back side of the housing 50 so as to generally correspond respectively to the operation sections. Thus, since the operation sections and the other operation sections are provided on the front side and on the back side of the housing 50 so as to generally correspond to each other, the user can hold the housing 50 so as to sandwich the housing 50 from the front side and from the back side when operating these operation sections. When operating these operation sections, the user holds a portion of the housing 50 that is above the center thereof in the up/down direction, and therefore the terminal device 7 can be held in the upper portion thereof and the terminal device 7 can be supported by the palms (see FIG. 10). Thus, the user can stably hold the housing 50 in a state in which the user can operate at least four operation sections, and it is therefore possible to provide a controller device (the terminal device 7) which can be easily held by the user and which has a good controllability.

As described above, in the present embodiment, the user can easily hold the terminal device 7 by holding the terminal device 7 with fingers abutting against the bottom surface of the projecting portion (the eaves portion 59). Since the second L button 54K and the second R button 54L are provided on the upper surface of the projecting portion, the user can easily operate these buttons in such a state as described above. The user can easily hold the terminal device 7 in the following manner, for example.

That is, as shown in FIG. 10, the user can hold the terminal device 7 with the ring fingers abutting against the bottom surface of the eaves portion 59 (the one-dot-chain line shown in FIG. 10) (so as to support the eaves portion 59 with the ring fingers). Then, the user can operate the four buttons (the first L button 54I, the first R button 54J, the second L button 54K and the second R button 54L) with the index fingers and the middle fingers. For example, in a case in which required game operations are relatively complicated and many buttons are to be used, it is possible to easily operate many buttons by holding the terminal device 7 as shown in FIG. 10. Since the analog sticks 53A and 53B are provided above the cross button 54A and the buttons 54E to 54E, the user can advantageously operate the analog sticks 53A and 53B with the thumbs when relatively complicated operations are required. In FIG. 10, the user holds the terminal device 7 with the thumbs abutting against the front surface of the housing 50, the index fingers against the upper surface of the housing 50, the middle fingers against the upper surface of the eaves portion 59 on the back surface of the housing 50, the ring fingers against the bottom surface of the eaves portion 59, and the little fingers against the back surface of the housing 50. Thus, the user can firmly hold the terminal device 7 as if to wrap around the housing 50 from four directions.

The user can also hold the terminal device 7 with the middle fingers abutting against the bottom surface of the eaves portion 59. Then, the user can easily operate two buttons (the second L button 54K and the second R button 54L) with the index fingers. For example, in a case in which required game operations are relatively simple and only a few buttons are to be used, the terminal device 7 may be held with the middle fingers abutting against the bottom surface of the eaves portion 59. Then, since the user can hold the lower side of the housing 50 with two fingers (the ring finger and the little finger), it is possible to firmly hold the terminal device 7.

In the present embodiment, the eaves portion 59 is provided so that the bottom surface thereof is located between the analog sticks 53A and 53S and the cross button 54A and the four buttons 54E to 54H (so that it is located on the lower side of the analog sticks 53A and 53B and above the cross button 54A and the four buttons 54E to 54H). Therefore, in a case in which the terminal device 7 is held with the ring fingers abutting against the eaves portion 59 (FIG. 10), the analog sticks 53A and 53B can be easily operated with the thumbs, and in a case in which the terminal device 7 is held with the middle fingers abutting against the eaves portion 59, the cross button 54A and the four buttons 54E to 54H can be easily operated with the thumbs. That is, in either of the two cases, the user can make a direction input operation while firmly holding the terminal device 7.

As described above, the user can also hold the terminal device 7 in a portrait position. That is, the user can hold the terminal device 7 in a portrait position by holding the top side or the bottom side of the terminal device 7 with one hand. Thus, since the user can hold the terminal device 7 with one hand, it is possible to for example perform an operation in which the terminal device 7 is held with one hand while an input is made to the touch panel 52 with the other hand.

In a case in which the top side of the terminal device 7 is held, the user can firmly hold the terminal device 7 by having fingers other than the thumbs abutting against the bottom surface of the eaves portion 59. Particularly, in the present embodiment, since the eaves portion 59 extends in the left/right direction, the user can abut fingers other than the thumbs against the eaves portion 59 and firmly hold the terminal device 7, irrespective of the position along the top side of the terminal device 7 at which the user holds the terminal device 7. That is, in a case in which the terminal device 7 is used in a portrait position, the eaves portion 59 can be used as a grip. On the other hand, in a case in which the bottom side of the terminal device 7 is held by one hand, the user can operate the buttons 54B to 54D with the hand. Therefore, it is possible for example to operate the buttons 54B to 54D with the hand with which the terminal device 7 is held while making inputs to the touch panel 52 with the other hand, thereby allowing for more operations.

With the terminal device 7 of the present embodiment, since the projecting portion (the eaves portion 59) is provided on the back surface, if the terminal device 7 is put down with the screen of the LCD 51 (the front surface of the housing 50) facing up, the screen is slightly inclined. Therefore, the screen is more easily seen with the terminal device 7 put down. Input operations to the touch panel 52 are more easily performed with the terminal device 7 put down. In other embodiments, an additional projecting portion having generally the same height as the eaves portion 59 may be formed on the back surface of the housing 50. Then, with the screen of the LCD 51 facing up, the terminal device 7 can be put down so that the screen is horizontal with the projecting portions in contact with the floor surface. The additional projecting portion may be a removable (or foldable) member. Then, the terminal device can be put down with the screen either slightly inclined or with the screen horizontal. That is, in a case in which the terminal device 7 is put down and used, the eaves portion 59 can be used as a leg portion.

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc. The terminal device 7 may include a button for turning ON/OFF the power of the LCD 51, and a button for performing a connection setting (pairing) with the game device 3.

As shown in FIG. 8(*a*), the terminal device 7 includes the marker section 55 including a marker 55A and a marker 55B on the front surface of the housing 50. The marker section 55 is provided on the upper side of the LCD 51. The marker 55A and the marker 55B are each formed by one or more infrared LEDs, as are the markers 6R and 6L of the marker device 6. The infrared LEDs of the markers 55A and 55B are provided inside a window portion that is transmissive to infrared light. The marker section 55 is used for the game device 3 to calculate the movement, etc., of the controller 5, as is the marker device 6 described above. The game device 3 can control the lighting of the infrared LEDs of the marker section 55.

The terminal device 7 includes a camera 56 as an image-capturing mechanism. The camera 56 includes an image-capturing element (e.g., a CCD image sensor, a CMOS image sensor, or the like) having a predetermined resolution, and a lens. As shown in FIG. 8, the camera 56 is provided on the front surface of the housing 50 in the present embodiment. Therefore, the camera 56 can capture an image of the face of the user holding the terminal device 7, and can capture an image of the user playing a game while looking at the LCD 51, for example. In the present embodiment, the camera 56 is provided between the two markers 55A and 55B.

The terminal device 7 includes a microphone 79 as a sound input mechanism. A microphone hole 50*c* is provided on the front surface of the housing 50. The microphone 79 is provided inside the housing 50 behind the microphone hole 50*c*. The microphone 79 detects sounds around the terminal device 7 such as the voice of the user.

The terminal device 7 includes a speaker 77 as a sound output mechanism. As shown in FIG. 8(*d*), speaker holes 57 are provided in a lower portion of the front surface of the housing 50. The output sounds from the speaker 77 are outputted from the speaker holes 57. In the present embodiment, the terminal device 7 includes two speakers, and the speaker holes 57 are provided at the respective positions of each of the left speaker and the right speaker. The terminal device 7 includes a knob 64 for adjusting the sound volume of the speaker 77. The terminal device 7 includes a sound output terminal 62 for receiving a sound output section such as an earphone connected thereto. Although the sound output terminal 62 and the knob 64 are provided on the upper side surface of the housing 50 considering the fact that the additional device is connected to the lower side surface of the housing, they may alternatively be provided on the left or right side surface or on the lower side surface.

The housing 50 includes a window 63 through which an infrared signal from an infrared communication module 82 is emitted to the outside of the terminal device 7. The window 63 is herein provided on the upper side surface of the housing 50 so that the infrared signal is emitted in a forward direction of the user when the user holds the opposing sides of the LCD 51. In other embodiments, the window 63 may be provided at any position such as, for example, on the back surface of the housing 50.

The terminal device 7 includes an extension connector 58 via which another device can be connected to the terminal device 7. The extension connector 58 is a communication terminal for exchanging data (information) with another device connected to the terminal device 7. In the present embodiment, the extension connector 58 is provided on the lower side surface of the housing 50 as shown in FIG. 8(*d*). The additional device connected to the extension connector 58 may be any device, and may be, for example, a game-specific controller (gun-shaped controller, etc.) or an input device such as a keyboard. The extension connector 58 may be omitted if there is no need to connect an additional device to terminal device 7. The extension connector 58 may include a terminal for supplying power to the additional device or a terminal for charging.

In addition to the extension connector 58, the terminal device 7 includes a charging terminal 66 for obtaining power from an additional device. When the charging terminal 66 is connected to a charging stand (not shown), power is supplied from the charging stand to the terminal device 7. In the present embodiment, the charging terminal 66 is provided on the lower side surface of the housing 50. Therefore, when the terminal device 7 and an additional device are connected to each other, it is possible to supply power from one to the other, in addition to exchanging information therebetween, via the extension connector 58. Thus, with the provision of the charging terminal 66 around (on the left and right opposing sides of) the extension connector 58, it is possible to supply power, as well as exchange information, when the terminal device 7 and an additional device are connected to each other. The terminal device 7 includes a charging connector, and the housing 50 includes a cover portion 61 for protecting the charging connector. The charging connector can be connected to a charger 86 to be described below, and power is supplied from the charger 86 to the terminal device 7 when the charging connector is connected to the charger. Although the charging connector (the cover portion 61) is provided on the upper side surface of the housing 50 in view of the fact that an additional device is connected to the lower side surface of the housing in the present embodiment, it may be provided on the left and right side surfaces or the lower side surface.

As shown in FIGS. 8(*d*) and 9, engagement holes 59*a* and 59*b* with which tab portions of an additional device can engage are provided on the bottom surface of the projecting portion (the eaves portion 59). The engagement holes 59*a* and 59*b* are used when connecting an additional device to the terminal device 7. That is, the additional device includes tab portions which can engage with the engagement holes 59*a* and 59*b*, and when connecting the additional device to the terminal device 7, the tab portions are engaged with the engagement holes 59*a* and 59*b*, thereby securing the terminal device 7 and the additional device with each other. Threaded holes may be further provided inside the engagement holes 59*a* and 59*b* so that the additional device can be securely fixed by screws. The projecting portion provided on the back surface of the terminal device 7 is herein the eaves portion 59 having an eaves-like shape. That is, the eaves portion 59 is provided so as to extend in the left/right direction. As shown in FIG. 9, the engagement holes 59*a* and 59*b* are provided near the center (with respect to the left/right direction) of the bottom surface of the eaves portion 59. While the number of the engagement holes 59*a* and 59*b* provided on the bottom surface of the eaves portion 59 is not limited to any particular number, if there is one engagement hole, it may be provided at the center of the eaves portion 59, and if there are a plurality of engagement holes, they may be provided in left-right symmetry. Then, the additional device can be stably connected while evenly maintaining the left-right balance. In a case in which the engagement holes are provided near the center, the size of the additional device can be reduced as compared with a case in which they are provided at the left and right opposing ends. As described above, the eaves portion 59 can be used as a member for engaging the additional device.

In the present embodiment, engagement holes 50*a* and 50*b* are provided on the bottom surface of the housing 50 as shown in FIG. 8(*d*). Therefore, in a case in which the additional device is connected to the terminal device 7, four tab portions are respectively engaged with four engagement holes, thereby securing the terminal device 7 and the additional device with each other. Thus, the additional device can be more securely connected to the terminal device 7. Threaded holes may be provided also inside the engagement holes 50*a* and 50*b* so that the additional device can be screwed thereto. While screwing may be done at any position, the support portion of the additional device, which lies against the reverse surface of the housing 50, and the eaves portion 59 may be screwed together, for example. In other embodiments, the engagement holes provided in the housing may be in any arrangement.

The terminal device 7 includes a battery cover 67 which can be attached to and removed from the housing 50. A battery (a battery 85 shown in FIG. 11) is placed inside the battery cover 67. In the present embodiment, the battery cover 67 is provided on the back side of the housing 50, below the projecting portion (the eaves portion 59).

The housing 50 of the terminal device 7 includes holes 65*a* and 65*b* through which a strap cord can be tied to the terminal device 7. As shown in FIG. 8(*d*), the holes 65*a* and 65*b* are provided on the bottom surface of the housing 50 in the present embodiment. Two holes 65*a* and 65*b* are provided in the present embodiment, one in the left portion and another in the right portion of the housing 50. Specifically, the hole 65*a* is provided on the left side of the center of the bottom surface of the housing 50, and the hole 65*b* is provided on the right side of the center of the bottom surface of the housing 50. The user can tie a strap to one of the holes 65*a* and 65*b*, and fasten the strap to the wrist of the user. Then, even if the user drops the terminal device 7 or if the terminal device 7 comes off the hand, the terminal device 7 is prevented from falling or hitting other objects. In the present embodiment, since the holes are provided both in the left and right portions, the user can conveniently fasten a strap to either hand.

With the terminal device 7 shown in FIGS. 8 to 11, the shape of each operation button, the shape of the housing 50, the number and the positions of the components, etc., are merely illustrative, and the systems, methods, and techniques described herein may be implemented with other shapes, numbers, and positions.

Figure 11:
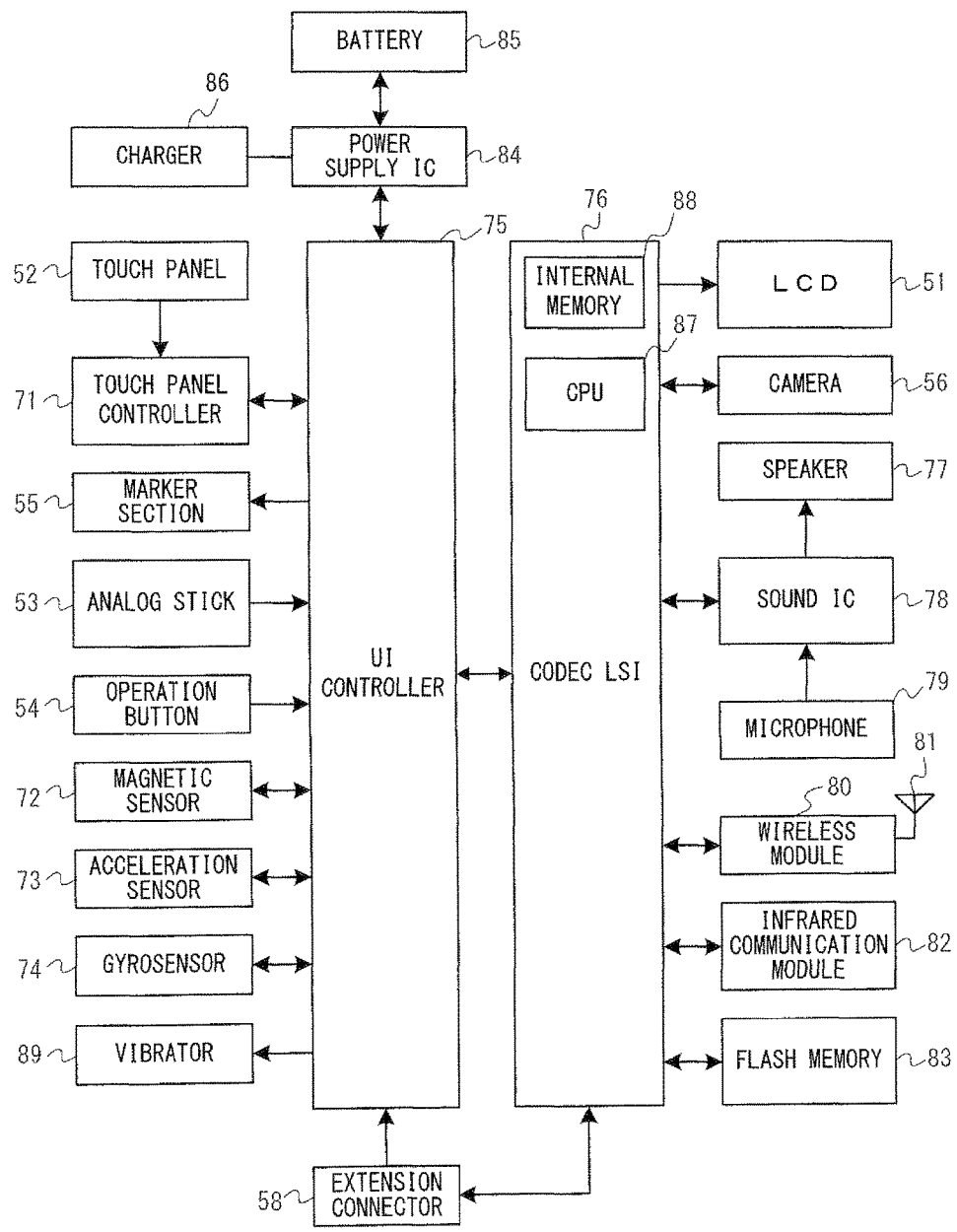
FIG. 11 is a block diagram showing an internal configuration of the example non-limiting terminal device 7.

Next, an internal configuration of the terminal device 7 will be described with reference to FIG. 11. FIG. 11 is a block diagram showing an internal configuration of the terminal device 7. As shown in FIG. 11, in addition to the configuration shown in FIG. 8, the terminal device 7 includes a touch panel controller 71, a magnetic sensor 72, the acceleration sensor 73, the gyrosensor 74, a user interface controller (UI controller) 75, a codec LSI 76, the speaker 77, a sound IC 78, the microphone 79, a wireless module 80, an antenna 81, an infrared communication module 82, a flash memory 83, a power supply IC 84, a battery 85, and a vibrator 89. These electronic components are mounted on an electronic circuit board and accommodated in the housing 50.

The UI controller 75 is a circuit for controlling the input/output of data to/from various types of input/output sections. The UI controller 75 is connected to the touch panel controller 71, an analog stick 53 (the analog sticks 53A and 53B), an operation button 54 (the operation buttons 54A to 54L), the marker section 55, the magnetic sensor 72, the acceleration sensor 73, the gyrosensor 74, and the vibrator 89. The UI controller 75 is connected to the codec LSI 76 and the extension connector 58. The power supply IC 84 is connected to the UI controller 75, and power is supplied to various sections via the UI controller 75. The built-in battery 85 is connected to a power supply IC 84 to supply power. The charger 86 or a cable with which power can be obtained from an external power source can be connected to the power supply IC 84 via a charging connector, and the terminal device 7 can receive power supply from or be charged by an external power source using the charger 86 or the cable. The terminal device 7 may be charged by attaching the terminal device 7 to a cradle (not shown) having a charging function. That is, although not shown in the drawings, a cradle with which power can be obtained from an external power supply can be connected to the power supply IC 84 via the charging terminal 66, and the terminal device 7 can receive power supply from or be charged by an external power supply using the cradle.

The touch panel controller 71 is a circuit connected to the touch panel 52 for controlling the touch panel 52. The touch panel controller 71 generates input position data of a predetermined format based on signals from the touch panel 52, and outputs it to the UI controller 75. The input position data represents, for example, the coordinates of a position on the input surface of the touch panel 52 at which an input is made. The touch panel controller 71 reads a signal from the touch panel 52 and generates input position data at a rate of once per a predetermined amount of time. Various control instructions for the touch panel 52 are outputted from the UI controller 75 to the touch panel controller 71.

The analog stick 53 outputs, to the UI controller 75, stick data representing the direction and the amount of slide (or tilt) of the stick portion operated with a finger of the user. The operation button 54 outputs, to the UI controller 75, operation button data representing the input status of each of the operation buttons 54A to 54L (e.g., whether it is pressed).

The magnetic sensor 72 detects the azimuthal direction by sensing the size and direction of the magnetic field. Azimuthal direction data representing the detected azimuthal direction is outputted to the UI controller 75. Control instructions for the magnetic sensor 72 are outputted from the UI controller 75 to the magnetic sensor 72. While there are sensors using an MI (magnetic impedance) element, a fluxgate sensor, a Hall element, a GMR (giant magneto-resistive) element, a TMR (tunnel magneto-resistance) element, an AMR (anisotropic magneto-resistive) element, etc., the magnetic sensor 72 may be any sensor as long as it is possible to detect the azimuthal direction. Strictly speaking, in a place where there is a magnetic field other than the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 73 is provided inside the housing 50 for detecting the magnitude of the linear acceleration along each of the directions of the three axes (the x, y and z axes shown in FIG. 8(*a*)). Specifically, the acceleration sensor 73 detects the magnitude of the linear acceleration along each of the axes, where the x axis lies in the longitudinal direction of the housing 50, the y axis lies in the direction vertical to the surface of the housing 50, and the z axis lies in the width direction of the housing 50. Acceleration data representing the detected acceleration is outputted to the UI controller 75. Control instructions for the acceleration sensor 73 are outputted from the UI controller 75 to the acceleration sensor 73. While the acceleration sensor 73 is assumed to be a capacitive-type MEMS-type acceleration sensor, for example, in the present embodiment, other types of acceleration sensors may be employed in other embodiments. The acceleration sensor 73 may be an acceleration sensor for 1-axis or 2-axis detection.

The gyrosensor 74 is provided inside the housing 50 for detecting angular velocities about the three axes, i.e., the x-axis, the y-axis and the z-axis. Angular velocity data representing the detected angular velocities is outputted to the UI controller 75. Control instructions for a gyrosensor 74 are outputted from the UI controller 75 to the gyrosensor 74. The number and combination of gyrosensors used for detecting angular velocities about three axes may be any number and combination, and the gyrosensor 74 may be formed by a 2-axis gyrosensor and a 1-axis gyrosensor, as is the gyrosensor 48. The gyrosensor 74 may be a gyrosensor for 1-axis or 2-axis detection.

The vibrator 89 is, for example, a vibration motor or a solenoid, and is connected to the UI controller 75. The terminal device 7 is vibrated by actuation of the vibrator 89 based on a command from the UI controller 75. Therefore, the vibration is conveyed to the player's hand holding the terminal device 7, and thus a so-called vibration-feedback game is realized.

The UI controller 75 outputs, to the codec LSI 76, operation data including input position data, stick data, operation button data, azimuthal direction data, acceleration data, and angular velocity data received from various components described above. If another device is connected to the terminal device 7 via the extension connector 58, data representing an operation performed on the other device may be further included in the operation data.

The codec LSI 76 is a circuit for performing a compression process on data to be transmitted to the game device 3, and an expansion process on data transmitted from the game device 3. The LCD 51, the camera 56, the sound IC 78, the wireless module 80, the flash memory 83, and the infrared communication module 82 are connected to the codec LSI 76. The codec LSI 76 includes a CPU 87 and an internal memory 88. While the terminal device 7 does not itself perform game processes, the terminal device 7 needs to execute a minimal program for the management thereof and for the communication. When the terminal device 7 is started up, a program stored in the flash memory 83 is read out to the internal memory 88 and executed by the CPU 87 upon power-up. Some area of the internal memory 88 is used as the VRAM for the LCD 51.

The camera 56 captures an image in response to an instruction from the game device 3, and outputs the captured image data to the codec LSI 76. Control instructions for the camera 56, such as an image-capturing instruction, are outputted from the codec LSI 76 to the camera 56. Camera 56 can also record video. That is, the camera 56 can repeatedly capture images and repeatedly output the image data to the codec LSI 76.

The sound IC 78 is a circuit connected to the speaker 77 and the microphone 79 for controlling input/output of sound data to/from the speaker 77 and the microphone 79. That is, when sound data is received from the codec LSI 76, the sound IC 78 outputs sound signals obtained by performing D/A conversion on the sound data to the speaker 77 so that sound is outputted from the speaker 77. The microphone 79 detects sounds propagated to the terminal device 7 (the sound of the user, etc.), and outputs sound signals representing such sounds to the sound IC 78. The sound IC 78 performs A/D conversion on the sound signals from the microphone 79 to output sound data of a predetermined format to the codec LSI 76.

The infrared communication module 82 emits an infrared signal and establishes infrared communication with another device. Herein, for example, the infrared communication module 82 has a function of establishing infrared communication in conformity with the IrDA standard and a function of outputting an infrared signal (control signal) for controlling the television 2.

The codec LSI 76 transmits, as terminal operation data, image data from the camera 56, sound data from the microphone 79 and operation data from the UI controller 75 to the game device 3 via the wireless module 80. In the present embodiment, the codec LSI 76 performs a compression process similar to that of the codec LSI 27 on the image data and the sound data. The terminal operation data and the compressed image data and sound data are outputted, as transmit data, to the wireless module 80. The antenna 81 is connected to the wireless module 80, and the wireless module 80 transmits the transmit data to the game device 3 via the antenna 81. The wireless module 80 has a similar function to that of the terminal communication module 28 of the game device 3. That is, the wireless module 80 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game device 3 includes operation data (the terminal operation data), image data, and sound data. In a case in which another device is connected to the terminal device 7 via the extension connector 58, data received from the other device may be further included in the transmit data. The codec LSI 76 may transmit, to the game device 3, data received via infrared communication established by the infrared communication module 82 while it is included in the transmit data as necessary.

As described above, compressed image data and sound data are transmitted from the game device 3 to the terminal device 7. These data are received by the antenna 81 (receiving portion) and sent to the codec LSI 76 via the wireless module 80. The codec LSI 76 expands the received image data and sound data. The expanded image data is outputted to the LCD 51, and images are displayed on the LCD 51. That is, the codec LSI 76 (the CPU 87) displays the received image data on the display section. The expanded sound data is outputted to the sound IC 78, and the sound IC 78 outputs sounds from the speaker 77.

In a case in which control data is included in data received from the game device 3, the codec LSI 76 and the UI controller 75 give control instructions to various sections in accordance with the control data. As described above, the control data is data representing control instructions for the components of the terminal device 7 (the camera 56, the touch panel controller 71, the marker section 55, sensors 62 to 64, and the infrared communication module 82 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game device 3. For the marker section 55, which is an infrared LED, the control can be done simply by turning ON/OFF the power supply thereto.

The game device 3 can control the operation of the television 2 by controlling the output of the infrared communication module 82. That is, the game device 3 outputs, to the terminal device 7, an instruction (the control data) for causing the infrared communication module 82 to output an infrared signal corresponding to a control command for controlling the television 2. In response to this instruction, the codec LSI 76 causes the infrared communication module 82 to output an infrared signal corresponding to the control command. Herein, the television 2 includes an infrared receiving portion capable of receiving infrared signals. As the infrared signal outputted from the infrared communication module 82 is received by the infrared receiving portion, the television 2 performs an operation in accordance with the infrared signal. The instruction from the game device 3 may represent a pattern of an infrared signal, or may be an instruction representing such a pattern in a case in which the terminal device 7 stores patterns of infrared signals.

While the terminal device 7 includes operation mechanisms such as the touch panel 52, an analog stick 53 and the operation button 54, as described above, in other embodiments, other operation mechanisms may be included instead of, or in addition to, these operation mechanisms.

While the terminal device 7 includes the magnetic sensor 72, the acceleration sensor 73 and the gyrosensor 74 as sensors for calculating movement of the terminal device 7 (including the position and the attitude thereof, or changes in the position and the attitude thereof), it may only include one or two of these sensors in other embodiments. In ether embodiments, other sensors may be included instead of, or in addition to, these sensors.

While the terminal device 7 includes the camera 56 and the microphone 79, it may not include the camera 56 and the microphone 79 or it may include only one of them in other embodiments.

While the terminal device 7 includes the marker section 55 as a configuration for calculating the positional relationship between the terminal device 7 and the controller 5 (the position and/or attitude, etc., of the terminal device 7 as seen from the controller 5), it may not include the marker section 55 in other embodiments. In other embodiments, the terminal device 7 may include other mechanisms as a configuration for calculating the positional relationship. For example, in other embodiments, the controller 5 may include a marker section, and the terminal device 7 may include an image-capturing element. Moreover, in such a case, the marker device 6 may include an image-capturing element, instead of an infrared LED.

[5. Method for Calculating Position in Three-Dimensional Space]

Next, a method for calculating a position in a three-dimensional virtual space to be carried out in the present embodiment will be described. In the present embodiment, a game system 1 calculates a position in a three-dimensional virtual space based on an operation on the terminal device 7 which is a controller device. The game system 1 may not include the controller 5. The game system 1 calculates a position in the virtual space based on the attitude of the terminal device 7 and an input position on a predetermined input surface (the touch panel 52) provided on the terminal device 7. Then, a user (player) can easily specify a position in a three-dimensional space through the operation of changing the attitude of the terminal device 7 and an input operation on the input surface of the terminal device 7. The position calculation method will now be outlined.

Figure 12:
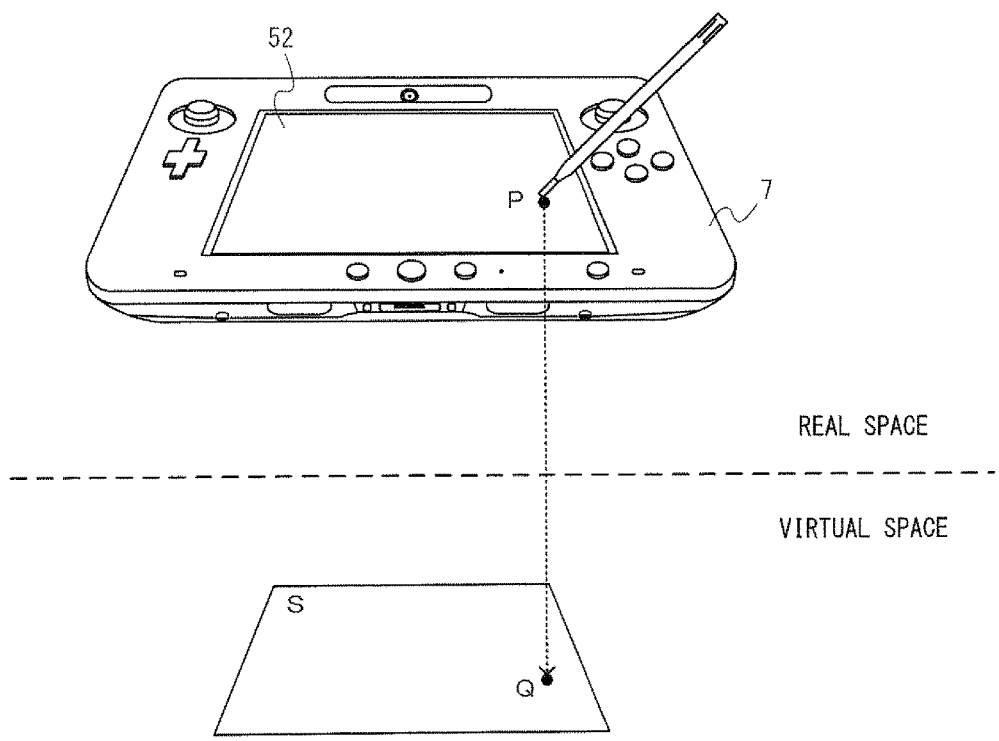
FIG. 12 is a diagram illustrating an example non-limiting position calculation method of the present embodiment.
Figure 13:
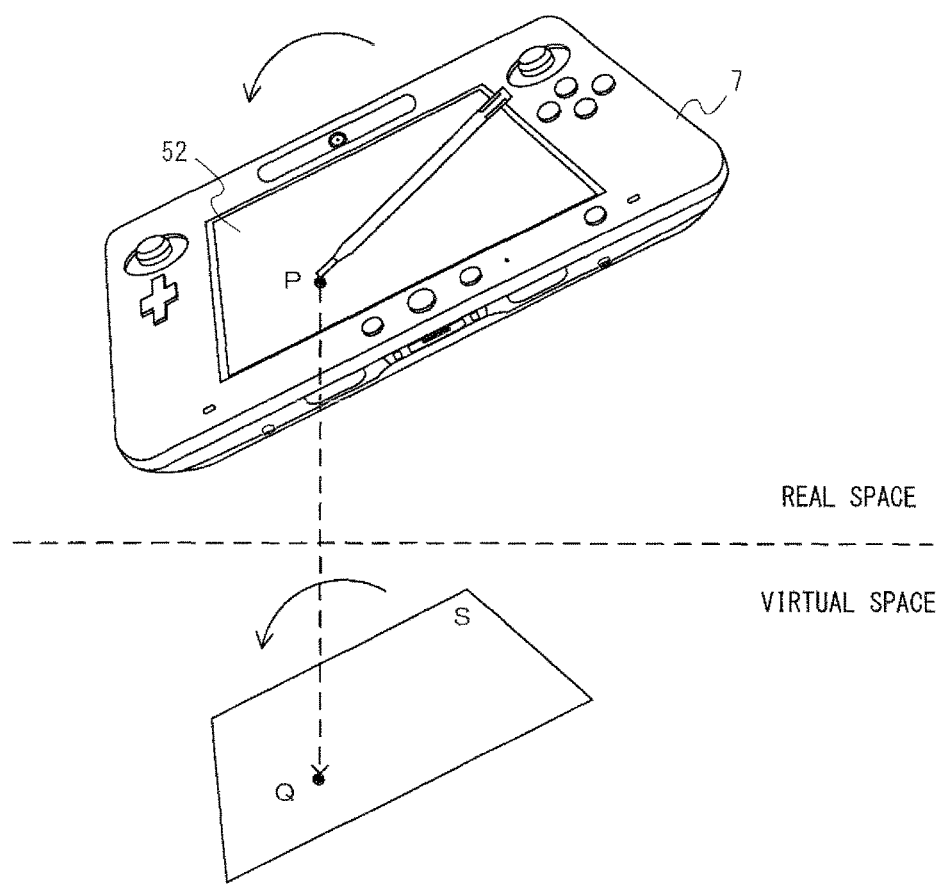
FIG. 13 is a diagram showing the attitude of the example non-limiting terminal device 7 having been changed from that shown in FIG. 12.

FIG. 12 is a diagram illustrating the position calculation method of the present embodiment. FIG. 13 is a diagram showing the attitude of the terminal device 7 having been changed from that shown in FIG. 12. As shown in FIGS. 12 and 13, in the present embodiment, the portable terminal device 7 is used as the controller device. The game system 1 is capable of calculating (estimating) the attitude of the terminal device 7, the details of which will be described later. The terminal device 7 includes the touch panel 52 as an input device capable of inputting a position on a predetermined input surface. Therefore, the user can perform an operation of changing the attitude of the terminal device 7 and perform an input operation on the input surface of the terminal device 7.

In FIGS. 12 and 13, the surface S is placed in the virtual space. The surface S (the position and/or the attitude of the surface S) is determined in accordance with the attitude of the terminal device 7 as shown in FIGS. 12 and 13. That is, the position and/or the attitude of the surface S change through the operation of changing the attitude of the terminal device 7. While any method may be used as a method for determining the surface S based on the attitude of the terminal device 7, the surface S is set so that (at least) the attitude of the surface S changes in accordance with the attitude of the terminal device 7 in the present embodiment.

As shown in FIGS. 12 and 13, when an input (touch input) is made on the input surface of the touch panel 52, the position Q on the surface S is calculated based on the input position P. The position Q will be referred to hereinafter as the "specified position". While the method for calculating the specified position Q based on the input position P may be any method, the specified position Q may be calculated as a position on the surface S corresponding to the input position P by making the input surface and the surface S correspond to each other, for example.

As described above, the game system 1 calculates, as a position in the virtual space, a position on the surface S determined in accordance with the attitude of the terminal device 7 in the virtual space based on the input position. In the state shown in FIG. 12, the user can specify, through a touch input, an area on the surface S in a three-dimensional virtual space. In the state shown in FIG. 13, on the other hand, the attitude of the surface S is different from that of FIG. 12, and the user can specify, through a touch input, an area different from the area of the surface S shown in FIG. 12. Thus, in the present embodiment, the user can change the attitude of the surface S through the operation of changing the attitude of the terminal device 7, and specify a position in a three-dimensional space by specifying a position on the surface S through a touch input. In the present embodiment, the attitude of the surface S changes in accordance with the attitude of the terminal device 7, and the position on the surface S changes in accordance with the input position on the input surface. Thus, the user can specify the attitude and the input position of the surface S through an intuitive operation, and can easily specify a three-dimensional space.

Moreover, in the present embodiment, the specified position is calculated so that the input position on the touch panel 52 and the specified position Q on the surface S which is calculated based on the input position coincide with each other on the screen of the display section (the LCD 51) of the terminal device 7, the details of which will be described later (steps S16, S25, S26, S64 and S86 to be described below). That is, the user can specify (touch) a position on the screen of the display section to thereby specify a position in a virtual space corresponding to that position. Thus, the user can specify a position in a three-dimensional space through a more intuitive and easy-to-understand operation.

In the present embodiment, the game system 1 (the game device 3) performs a predetermined process (game process) while using, as an input, the specified position calculated as described above. The predetermined process may be any process, and the specified position may be used in any way as a game input, for example. First to fourth game examples will now be described as examples of the game process using the specified position.

[6. First Game Example]

The first game example to be performed by the game system 1 of the present embodiment will now be described with reference to FIGS. 14 to 19. In the first game example, the player (user) makes inputs on keys of a keyboard musical instrument arranged in a three-dimensional virtual space (game space) using the terminal device 7. That is, when the player specifies a position of a key in the virtual space using the terminal device 7, a sound associated with the specified key is outputted. In this game example, the terminal device 7 is used as the controller device. Therefore, the controller 5 may not be used, and the game system 1 may not include the controller 5.

Figure 14:
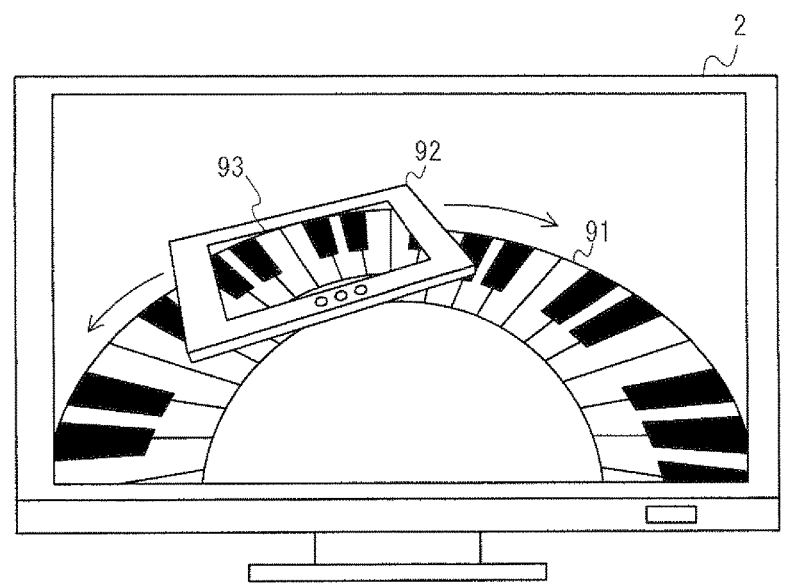
FIG. 14 is a diagram showing a television 2 and an example non-limiting terminal device 7 when game operations are performed in a first game example.
Figure 14:
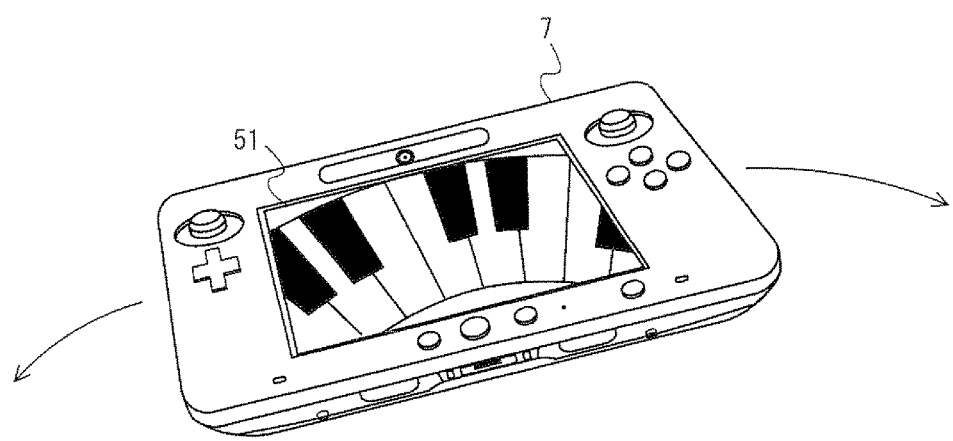

FIG. 14 is a diagram showing the television 2 and the terminal device 7 when game operations are performed in the first game example. As shown in FIG. 14, an image of the virtual space including the keyboard object 91 and a terminal object 92 is displayed on the television 2. A portion of the keyboard object 91 is displayed on the terminal device 7 (the LCD 51). In this game example, the keys of the keyboard object 91 are arranged in an arc shape. An image of the arc-shaped keyboard object 91 as seen from the inside of the arc (on the side where the center of the arc is present) is displayed on the television 2. Then, the user can perform operations while feeling as if the user were standing at the center of the arc-shaped keyboard object 91. Sounds of different pitches are associated with different keys, and when a key is specified, a sound associated with the specified key is outputted.

The terminal object 92 is controlled in accordance with the attitude of the terminal device 7. In this game example, the terminal object 92 is controlled so that the attitude of the terminal device 7 and the attitude of the terminal object 92 coincide with each other with respect to rotation about an axis (the y axis shown in FIG. 8) perpendicular to the screen of the terminal device 7 (the terminal object 92). The terminal object 92 is controlled so as to move along an arc above the arc-shaped keyboard object 91 in accordance with the attitude of the terminal device 7 (see the arrow shown in FIG. 14). Therefore, the player can move the terminal object 92 left and right along an arc through the operation of tilting the terminal device 7 left and right (see the arrow shown in FIG. 14). While an image similar to the terminal image is also drawn on the screen 93 of the terminal object 92 which is displayed on the television 2 in this game example (see FIG. 14), no image may be displayed on the screen 93.

As described above, in this game example, the keys of the keyboard object 91 are arranged in an arc shape, and the terminal object 92 is moved along an arc-shaped path in accordance with the movement of the terminal device 7 in an arc. Thus, the movement of the terminal device 7 and the movement of the terminal object 92 can be made to correspond to each other. With the arc-shaped arrangement of the keys and the arc-shaped movement path of the terminal object 92, the player can grasp (estimate) the method of operating the terminal device 7 without special instructions. Thus, in this game example, the operation of the terminal device 7 can be made more intuitive and easy-to-understand for the player.

Figure 15:
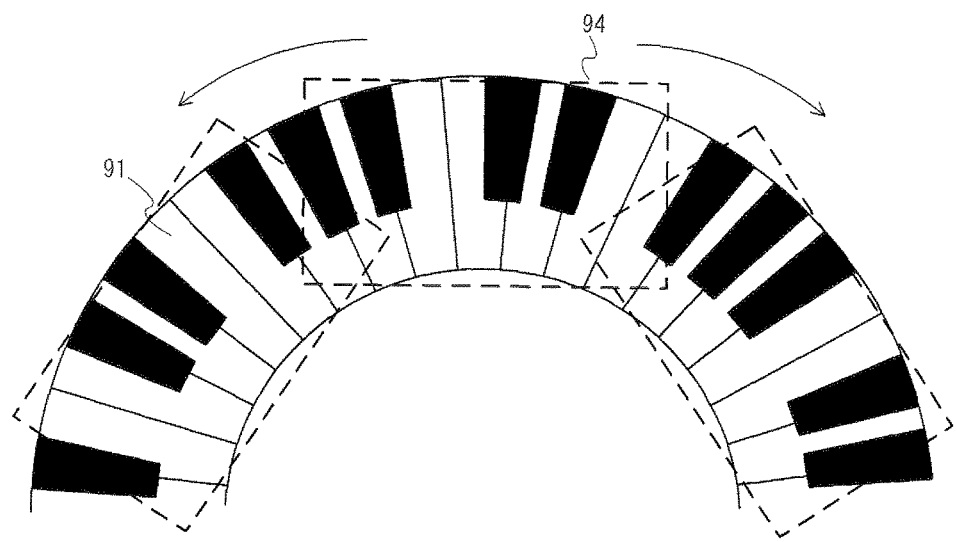
FIG. 15 is a diagram showing an example non-limiting keyboard object 91 as seen from above in the virtual space.

FIG. 15 is a diagram showing the keyboard object 91 as seen from above in the virtual space. As shown in FIG. 15, in this game example, a surface 94 is set on the surface of the keyboard object 91. While the surface 94 is shown by a dotted line in FIG. 15, the surface 94 is actually not displayed on display devices (the television 2 and the terminal device 7) in this game example. That is, the surface 94 does not always need to be displayed, does not need to be arranged as an object in the virtual space, and may be treated as a transparent object.

The surface 94 is set based on the position and the orientation of the terminal object 92. That is, the position of the surface 94 is set at a position below (directly under) the terminal object 92, and the attitude of the surface 94 is set to an attitude that coincides with the attitude of the terminal object 92 with respect to the attitude in the rotation direction about an axis perpendicular to the surface 94. Therefore, as the terminal object 92 moves along an arc-shaped trace above the keyboard object 91, the surface 94 moves along an arc on the keyboard object 91 so that a portion of the keyboard object 91 is included therein (see the arrow shown in FIG. 15).

Thus, in this game example, the position and the attitude of the terminal object 92 are determined in accordance with the attitude of the terminal device 7, and the position and the attitude of the surface 94 is determined in accordance with the position and the attitude of the terminal object 92. That is, the position and the attitude of the surface 94 are determined in accordance with the attitude of the terminal device 7. Therefore, the surface 94 moves left and right along an arc on the keyboard object 91 (see the arrow shown in FIG. 15) through the operation of tilting the terminal device 7 left and right.

Figure 16:
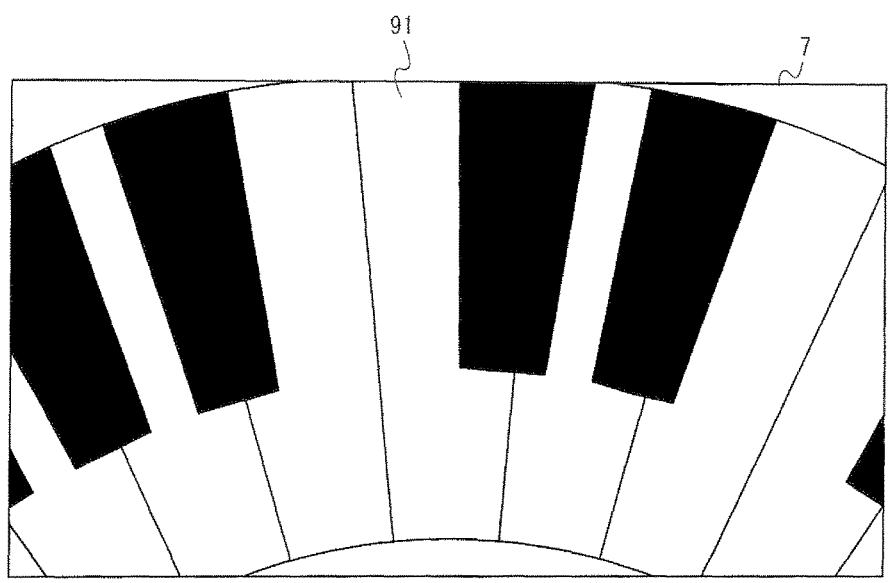
FIG. 16 is a diagram showing an example of an image displayed on the terminal device 7.

FIG. 16 is a diagram showing an example of an image displayed on the terminal device 7. As shown in FIG. 16, an image representing a portion of the keyboard object 91 is displayed on the terminal device 7. Specifically, an area of the keyboard object 91 within the surface 94 is displayed on the terminal device 7. Therefore, the area of the keyboard object 91 displayed on the terminal device 7 changes in accordance with the attitude of the terminal device 7. Specifically, the displayed area of the keyboard object 91 scrolls left and right along an arc through the operation of tilting the terminal device 7 left and right. In this game example, the arc-shaped keyboard object 91 is displayed on the television 2, and a portion of the keyboard object 91 displayed on the terminal device 7 scrolls along an arc through the operation of moving the terminal device 7 along an arc-shaped trace. Therefore, the user can perform an operation of specifying a position on the keyboard object 91 using the terminal device while feeling as if the arc-shaped keyboard object 91 actually existed.

In this game example, one octave's worth of keys are displayed at once on the terminal device 7 so that the user can identify which sounds are associated with the keys by looking at the arrangement of the white keys and the black keys. Since the terminal device 7 has a relatively large screen, each key is displayed with such a width that the user can press it easily with a finger even if one octave's worth of keys are displayed.

The player can output a sound by making a touch input on the keyboard object 91 displayed on the terminal device 7. That is, when a touch input is made on the touch panel 52 of the terminal device 7, the game device 3 identifies the key located at the specified position corresponding to the input position (the key displayed at the input position on the screen of the LCD 51), and outputs a sound associated with the identified key. The speaker for outputting the sound may be the speaker 2a of the television 2, the speaker 77 of the terminal device 7, or both of the speakers 2a and 77.

As described above, in this game example, the terminal object 92 and the surface 94 move in accordance with the change in the attitude of the terminal device 7, and the area of the keyboard object 91 displayed on the terminal device 7 changes. As a result, the set of keys that can be specified by the player using the terminal device 7 changes. Thus, the player can easily specify the position of the keyboard object 91 in the three-dimensional virtual space through the operation of changing the attitude of the terminal device 7 and a touch input operation. In this game example, the player can specify keys across the keyboard object 91 without displaying the entire keyboard object 91 on the terminal device 7. Thus, since the keyboard object 91 can be displayed on a large scale on the terminal device 7, touch inputs are easy to make and the operation is made easier.

(Game Processes in First Game Example)

Figure 17:
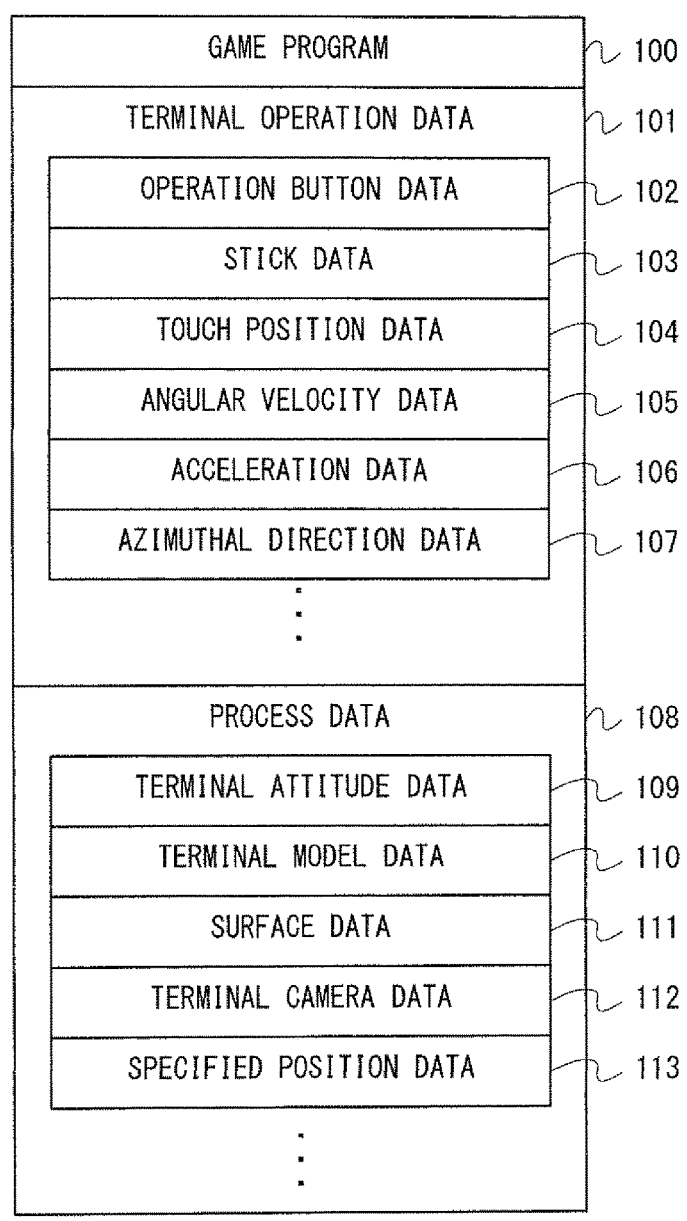
FIG. 17 is a diagram showing various example non-limiting data used in the game processes.

Next, the details of game processes performed by the game system 1 in the first game example will be described. First, various data used in the game processes will be described. FIG. 17 is a diagram showing various data used in the game processes. FIG. 17 is a diagram showing primary data to be stored in the main memory the external main memory 12 or the internal main memory 11e) of the game device 3. As shown in FIG. 17, the main memory of the game device 3 stores a game program 100, terminal operation data 101 and process data 108. In addition to those shown in FIG. 17, the main memory also stores other data necessary for the game, such as image data of various objects appearing in the game, and sound data used in the game, etc.

At an appropriate point in time after the power of the game device 3 is turned ON, a part or whole of the game program 100 is loaded from the optical disc 4 and stored in the main memory. The game program 100 may be obtained from the flash memory 17 or an external device of the game device 3 (e.g., via the Internet), instead of from the optical disc 4. A part of the game program 100 (e.g., a program for calculating the attitude of the controller 5 and/or the terminal device 7) may be pre-stored in the game device 3.

The terminal operation data 101 is data representing an operation performed by the player on the terminal device 7. The terminal operation data 101 is transmitted from the terminal device 7 and obtained by the game device 3 to be stored in the main memory.

The terminal operation data 101 includes operation button data 102, stick data 103, input position data 104, angular velocity data 105, acceleration data 106, and azimuthal direction data 107. Other than the various data shown in FIG. 17, the terminal operation data 101 may include data of an image captured by the camera 56 and sound data detected by the microphone 79. The main memory may store a predetermined number of latest (most recently obtained) sets of terminal operation data.

The operation button data 102 is data representing the input status of the operation buttons 54A to 54L provided on the terminal device 7. Specifically, the operation button data 102 represents whether each of the operation buttons 54A to 54L is pressed.

The stick data 103 is data representing the direction and the amount of slide (or tilt) of the stick portion of the analog stick 53 (the analog sticks 53A and 53B). The direction and the amount may be represented as two-dimensional coordinates or a two-dimensional vector, for example.

The input position data 104 is data representing the position (input position) on the input surface of the touch panel 52 at which an input is made. In the present embodiment, the input position data 104 represents coordinate values in a two-dimensional coordinate system for representing a position on the input surface. In a case in which the touch panel 52 is of a multi-touch type, the input position data 104 may represent a plurality of input positions.

The angular velocity data 105 is data representing the angular velocity detected by the gyrosensor 74. While the angular velocity data 105 represents angular velocity about each of the three axes of x, y and z shown in FIG. 8 in the present embodiment, it may represent angular velocity about any one or more axes in other embodiments.

The acceleration data 106 is data representing the acceleration (acceleration vector) detected by the acceleration sensor 73. While the acceleration data 106 represents three-dimensional acceleration of which each component is the acceleration for one of the three axes of x, y and z shown in FIG. 8 in the present embodiment, it may represent acceleration for any one or more directions in other embodiments.

The azimuthal direction data 107 is data representing the azimuthal direction detected by the magnetic sensor 72. In the present embodiment, the azimuthal direction data 107 represents the direction of a predetermined azimuthal direction (e.g., north) with respect to the terminal device 7. However, in a place where there is a magnetic field other than the geomagnetic field, the azimuthal direction data 107 does not strictly represent the absolute azimuthal direction (e.g., north). Nevertheless, it represents a relative direction of the terminal device 7 with respect to the direction of the magnetic field in that place, and it is therefore possible to calculate the attitude of, or the change in the attitude of, the terminal device 7 based on the azimuthal direction data 107 even in such cases.

The terminal operation data 101 may be data representing operations performed on the terminal device 7, and may be data including only one of the data 92 to 97 described above. In a casein which the terminal device 7 includes other input sections (e.g., a touch pad, an image-capturing section of the controller 5, etc.), the terminal operation data 101 may include data representing operations performed on the other input sections. In a case in which the movement of the terminal device 7 itself is used as a game operation as in the present embodiment, the terminal operation data 101 may include data whose value changes in accordance with the movement of the terminal device 7 itself, as is the acceleration data 106, the angular velocity data 105 or the azimuthal direction data 107.

In the present embodiment, camera image data and/or microphone sound data may be transmitted from the terminal device 7 to the game device 3, in addition to the terminal operation data 101. The camera image data is data representing images (camera images) captured by the camera 56 of the terminal device 7. The microphone sound data is data representing sounds (microphone sounds) detected by the microphone 79 of the terminal device 7. The camera image data and the microphone sound data may be compressed by the codec LSI 76, transmitted to the game device 3, expanded by the codec LSI 27 in the game device 3, and stored in the main memory.

The main memory may store controller operation data which represents an operation performed by a player on the controller 5, though it is not shown because the controller 5 is not used as the controller device in the present embodiment.

The process data 108 is data used in the game processes (FIG. 18) to be described later. The process data 108 includes terminal attitude data 109, terminal object data 110, surface data 111, terminal camera data 112, and specified position data 113. In addition to those shown in FIG. 17, the process data 108 also includes various data used in the game processes, such as data representing various parameters set for various objects appearing in the game.

The terminal attitude data 109 is data representing the attitude of the terminal device 7. The attitude of the terminal device 7 may be represented for example by a rotation matrix which represents the rotation from a predetermined reference attitude to the current attitude of the terminal device 7, or may be represented by a cubic vector or three angles. While an attitude in a three-dimensional space is used as the attitude of the terminal device 7 in the present embodiment, an attitude in a two-dimensional plane may be used in other embodiments. In the present embodiment, the terminal attitude data 109 is calculated based on the angular velocity data 105 and the acceleration data 106 included in the terminal operation data 101. The method for calculating the terminal attitude data 109 will be described below in step S11.

The terminal object data 110 is data representing the position and the attitude of the terminal object 92 placed in the virtual space. The position of the terminal object 92 is represented by three-dimensional coordinate values representing a position in a coordinate system (virtual space coordinate system) for representing a position in the virtual space. In this game example, the attitude of the terminal object 92 changes only for the rotation direction about an axis perpendicular to the screen 93 of the terminal object 92, and does not change for other rotation directions. Therefore, the attitude of the terminal object 92 is represented by a single vector (e.g., a vector which is parallel to the screen of the terminal object 92 and which extends in a predetermined direction with respect to the terminal object 92). The attitude of the terminal object 92 may be represented by a rotation matrix or a vector in the coordinate system.

The surface data 111 is data representing the position and the attitude of the surface 94 set in the virtual space. The position of the surface 94 is represented by three-dimensional coordinate values representing a position in the virtual space coordinate system. In this game example, the attitude of the surface 94 changes only for the rotation direction about an axis perpendicular to the surface 94, and does not change for other rotation directions. Therefore, the attitude of the surface 94 may be represented by a single vector (e.g., a vector which is parallel to the screen of the terminal object 92 and which extends in a predetermined direction with respect to the terminal object 92), as is the attitude of the terminal object 92. The attitude of the surface 94 may be represented by a rotation matrix or a vector in the coordinate system.

The terminal camera data 112 is data representing the position and the attitude of a virtual camera (terminal virtual camera) which is used for generating the terminal image. In the present embodiment, the position and the attitude of the terminal virtual camera are calculated based on the surface data 111.

The specified position data 113 is data representing the specified position. The specified position is represented by three-dimensional coordinate values which represent a position in the virtual space coordinate system. The specified position is calculated based on the input position data 104 and the surface data 111, the details of which will be described later.

Figure 18:
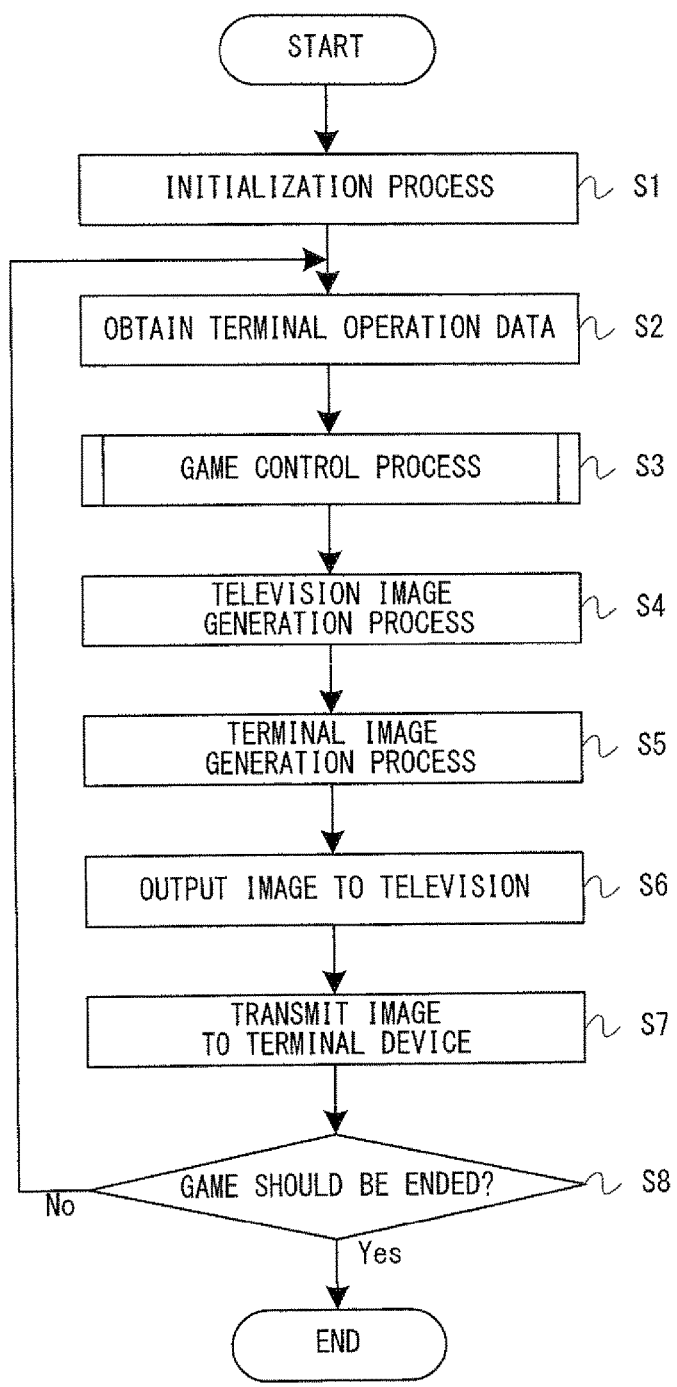
FIG. 18 is a main flow chart showing a flow of example non-limiting game processes performed by the game device 3.

Next, the details of the game processes performed by the game device 3 will be described with reference to FIGS. 18 and 19. FIG. 18 is a main flow chart showing the flow of the game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The flow chart shown in FIG. 18 is a flow chart showing the process to be performed after processes described above are completed. The game device 3 may be configured to execute the game program immediately after power-up, or it may be configured so that a built-in program is executed after power-up for displaying a predetermined menu screen first, and then the game program is executed when the start of the game is instructed by a player through the operation of making a selection on the menu screen, for example.

The processes of the steps of the flow chart (including the first to fourth game examples) to be discussed later are merely illustrative, and the order of steps to be performed may be switched around as long as similar results are obtained. The values of the variables, and the threshold values used in determination steps are also merely illustrative, and other values may be used as necessary. While the present embodiment is described assuming that the processes of the steps of the flow chart are performed by the CPU 10, processes of some of the steps of the flow chart may be performed by a processor or a dedicated circuit other than the CPU 10.

First, in step S1, the CPU 10 performs an initialization process. The initialization process is a process of constructing a virtual game space, placing objects appearing in the virtual space at their initial positions, and setting initial values of various parameters used in the game processes. In the first game example, three objects of the terminal object 92, the surface 94 and the terminal virtual camera are placed in the virtual space at predetermined positions and with predetermined attitudes. That is, data representing the initial positions and the initial attitudes of the three objects are stored in the main memory as the terminal object data 110, the surface data 111 and the terminal camera data 112, respectively. A virtual camera (television virtual camera) used for generating television images is set with a predetermined position and a predetermined attitude. The television virtual camera is set with a predetermined position and a predetermined attitude such that the keyboard object 91 and the terminal object 92 are included in the range of viewing field. The process of step S2 is performed, following step S1. Thereafter, the process loop including a series of processes of steps S2 to S8 is repeatedly performed at a rate of once per a predetermined amount of time (a one frame period, e.g., 1/60 sec).

In step S2, the CPU 10 obtains terminal operation data transmitted from the terminal device 7. Since the terminal device 7 repeatedly transmits the terminal operation data to the game device 3, the game device 3 successively receives the terminal operation data. In the game device 3, the terminal communication module 28 successively receives the terminal operation data, and the input/output processor 11a successively stores the terminal operation data in the main memory. The CPU 10 reads out the terminal operation data 101 from the main memory as necessary with appropriate timing. The process of step S3 is performed, following step S2.

In step S3, the CPU 10 performs the game control process. The game control process is a process for allowing the game to progress by, for example, controlling the action of various objects or calculating various game parameters in accordance with operations by the player. The details of the game control process will now be described with reference to FIG. 19.

Figure 19:
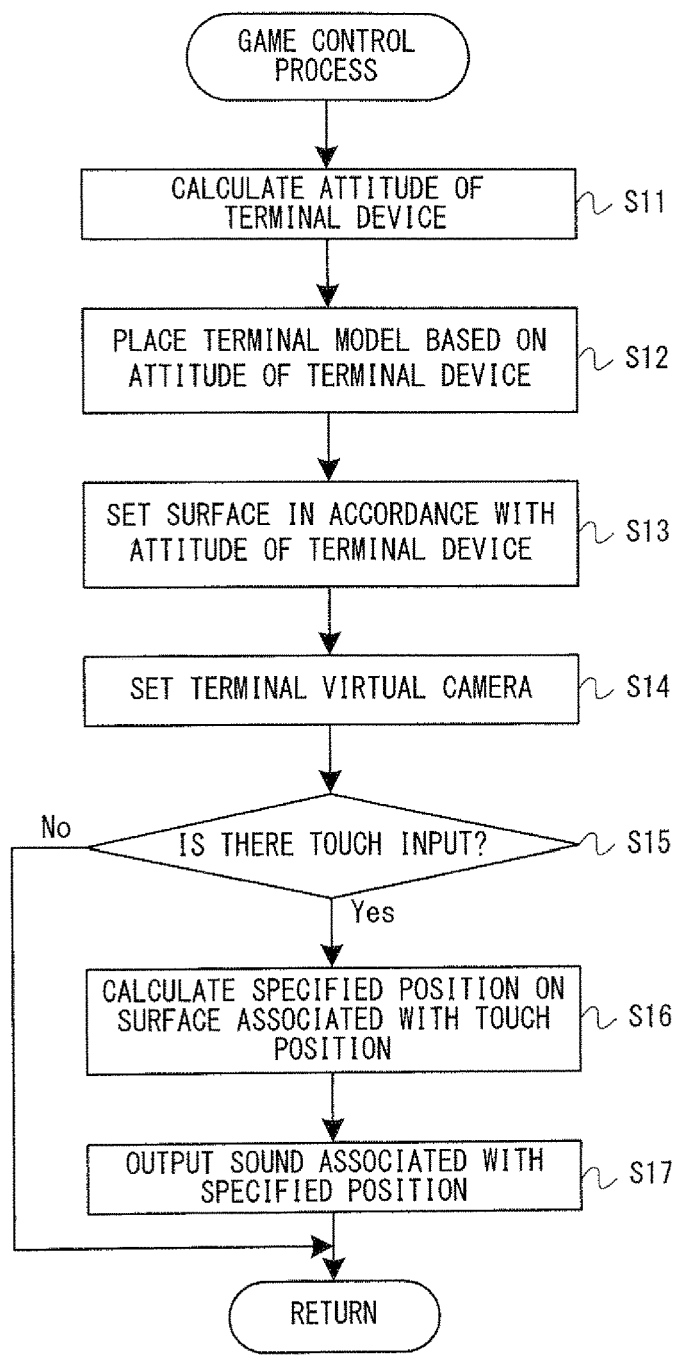
FIG. 19 is a flow chart showing a detailed flow of an example non-limiting game control process (step S3) shown in FIG. 18.

FIG. 19 is a flow chart showing a detailed flow of the game control process (step S3) shown in FIG. 18. In the game control process, first, in step S11, the CPU 10 calculates the attitude of the terminal device 7. The attitude of the terminal device 7 is calculated based on the physical quantities for calculating the attitude which are represented by the terminal operation data. In the present embodiment, the angular velocity represented by the angular velocity data 105 and the acceleration represented by the acceleration data 106 are used as the physical quantities for calculating the attitude. The details of the attitude calculation process will now be described.

In the attitude calculation process, first, the CPU 10 calculates the attitude of the terminal device 7 based on the angular velocity data 105. While the method for calculating the attitude based on the angular velocity may be any method, the attitude is calculated using the previous attitude (the attitude calculated in step S11 in a previous iteration) and the current angular velocity (the angular velocity obtained in step S2 in a current iteration of the process loop). Specifically, the CPU 10 calculates the attitude by rotating the previous attitude by a unit time's worth of the current angular velocity. The previous attitude is represented by the terminal attitude data 109 stored in the main memory, and the current angular velocity is represented by the angular velocity data 105 stored in the main memory. Therefore, the CPU 10 reads out the terminal attitude data 109 and the angular velocity data 105 from the main memory to calculate the attitude of the terminal device 7. The data representing the attitude calculated as described above is stored in the main memory.

Where the attitude is calculated from the angular velocity, an initial attitude may be set. That is, where the attitude of the terminal device 7 is calculated from the angular velocity, the CPU 10 initially calculates the initial attitude of the terminal device 7. The initial attitude of the terminal device 7 may be calculated based on the acceleration data 106, or the player may be prompted to perform a predetermined operation with the terminal device 7 in a particular attitude so that the particular attitude at the point in time when the predetermined operation is performed is used as the initial attitude. While the initial attitude may be calculated in a case in which the attitude of the terminal device is calculated as an absolute attitude with respect to a predetermined direction in the space, the initial attitude may not be calculated in a case in which the attitude of the terminal device 7 is calculated as a relative attitude with respect to the attitude of the terminal device 7 at the start of the game, for example.

Next, after calculating the attitude based on the angular velocity, the CPU 10 corrects the calculated attitude based on the acceleration of the terminal device 7. In a state in which the terminal device 7 is substantially stationary, the acceleration acting upon the terminal device 7 means the gravitational acceleration. That is, in this state, the acceleration vector represented by the acceleration data 106 represents the direction of gravity in the terminal device 7. Therefore, the CPU 10 performs a correction such that the downward direction (direction of gravity) of the attitude calculated based on the angular velocity is brought closer to the direction of gravity represented by the acceleration vector. That is, the attitude is rotated so that the downward direction is brought closer to the direction of gravity represented by the acceleration vector at a predetermined rate. Therefore, the attitude based on the angular velocity can be corrected so as to be an attitude taking into consideration the direction of gravity based on the acceleration. The predetermined rate may be a predetermined fixed value or may be set in accordance with the detected acceleration, etc. For example, the CPU 10 may increase the rate at which the downward direction of the attitude is brought closer to the direction of gravity represented by the acceleration vector when the magnitude of the detected acceleration is close to the magnitude of the gravitational acceleration, and decrease the rate when the magnitude of the detected acceleration is remote from the magnitude of the gravitational acceleration.

Specifically, the CPU 10 reads out data representing the attitude calculated based on the angular velocity and the acceleration data 106 from the main memory, and performs the correction described above. Then, data representing the corrected attitude is stored in the main memory as the terminal attitude data 109. The process of step S12 is performed, following step S11 described above.

In the present embodiment, the CPU 10 calculates the attitude of the terminal device 7 based on the detection results of the inertia sensor (the acceleration sensor 73 and the gyrosensor 74). In other embodiments, the method for calculating the attitude of the terminal device 7 may be any method (this similarly applies also to other game examples to be described below). For example, in other embodiments, if the terminal device 7 includes other sensor sections (e.g., the magnetic sensor 72 and the camera 56), the attitude of the terminal device 7 may be calculated using the detection results of the other sensor sections. That is, the CPU 10 can know a predetermined azimuthal direction with respect to the terminal device 7 (that is, the attitude of the terminal device 7 with respect to the predetermined azimuthal direction) from the azimuthal direction data 107 detected by the magnetic sensor 72. Therefore, in other embodiments, the CPU 10 may calculate the attitude of the terminal device 7 by further using the azimuthal direction data 107, in addition to the angular velocity data 105 and the acceleration data 106. If the attitude of the terminal device 7 is calculated using the azimuthal direction data 107, it is possible to calculate the absolute attitude with respect to a predetermined direction in the real space, and it is therefore possible to more accurately calculate the attitude of the terminal device 7. For the azimuthal direction data 107, in a place where there is a magnetic field other than the geomagnetic field, the azimuthal direction data does not strictly represent the absolute azimuthal direction (e.g., north). Nevertheless, it represents a relative direction of the terminal device 7 with respect to the direction of the magnetic field in that place, and it is therefore possible to calculate the attitude of the terminal device 7 even in such cases. In other embodiments, the attitude may be calculated based on one or two of the three data. In a case in which the game system 1 includes a camera for capturing an image of the terminal device 7, for example, the game device 3 may obtain an image-capturing result of capturing an image of the terminal device 7 with the camera, and calculate the attitude of the terminal device 7 using the image-capturing result.

In step S12, the CPU 10 places the terminal object 92 in the virtual space based on the attitude of the terminal device 7. The terminal object 92 may be controlled in any way as long as it is controlled based on the attitude of the terminal device 7. In this game example, the position and the attitude of the terminal object 92 are controlled so as to correspond to the attitude of the terminal device 7.

In this game example, the attitude of the terminal object with respect to the rotation direction about the axis perpendicular to the screen changes in accordance with the attitude of the terminal device 7, and the attitude does not change (is fixed) for other rotation directions. That is, the attitude of the terminal object 92 does not change from the attitude perpendicular to that axis. If the terminal device 7 is in a predetermined reference attitude with respect to the rotation direction about the axis perpendicular to the screen, the terminal object 92 is in such an attitude that it faces in the forward direction (the depth direction) of the virtual space displayed on the television 2. When the terminal device 7 rotates from the predetermined reference attitude with respect to the rotation direction about the axis perpendicular to the screen, the attitude of the terminal object 92 changes by an amount in accordance with the amount of rotation in a direction in accordance with the rotation direction. That is, the attitude of the terminal object 92 changes so as to correspond to the attitude of the terminal device 7. While the reference attitude may be set in any way, it may be for example the attitude of the terminal device 7 at the start of the game or may be a predetermined attitude.

In this game example, the attitude of the terminal object 92 is determined based on the attitude of the terminal device 7 with respect to the rotation direction about the axis perpendicular to the screen. Therefore, the CPU 10 can calculate the attitude of the terminal object 92 based on a vector which faces in the forward direction of the terminal device 7 (the upward direction on the screen of the terminal device 7 which is parallel to the screen: the z-axis direction shown in FIG. 8), for example. That is, the attitude of the terminal object 92 may be calculated so that the forward direction of the terminal object 92 is a direction in accordance with the direction of the vector. In a case in which the forward direction of the terminal device 7 faces in the vertical direction, the CPU 10 may calculate the attitude of the terminal object 92 based on a vector which faces in the depth direction of the terminal device 7 (the near-to-far direction perpendicular to the screen of the terminal device 7: the negative y-axis direction shown in FIG. 8), instead of the vector above. Then, even if the player uses the terminal device 7 while holding it so that the screen of the terminal device 7 is standing (in a vertical position), the terminal object 92 can be controlled in accordance with the operation of changing the attitude of the terminal device 7.

The position of the terminal object 92 is determined so as to be a position in accordance with the attitude of the terminal device 7 which is calculated as described above. Specifically, when the attitude of the terminal device 7 is equal to the reference attitude, the terminal object 92 is placed above the center of the arc of the keyboard object 91. When the terminal device 7 rotates clockwise (as seen from above the screen) from the predetermined reference attitude with respect to the rotation direction about the axis perpendicular to the screen, the terminal object 92 moves right along the arc of the keyboard object 91 by an amount in accordance with the amount of rotation. When the terminal device 7 rotates counterclockwise (as seen from above the screen) from the predetermined reference attitude, the terminal object 92 moves left along the arc of the keyboard object 91 by an amount in accordance with the amount of rotation.

As a specific process of step S12, the CPU 10 reads out the terminal attitude data 109 from the main memory, and calculates the position and the attitude of the terminal object 92 based on the attitude of the terminal device 7. Then, data representing the position and the attitude which have been calculated is stored in the main memory as the terminal object data 110. The process of step S13 is performed, following step S12.

As described above, in this game example, the game device 3 places the object (the terminal object 92) in the virtual space (step S12) whose attitude (herein the attitude and the position) is controlled so as to correspond to the attitude of the terminal device 7. Then, the game device 3 produces an image representing the virtual space including the object as an image to be displayed on a predetermined display device (the television 2) (step S4 to be described below). Thus, the player can check the attitude of the terminal device 7 on the screen, and can therefore easily check the attitude of the surface 94 which changes so as to correspond to the attitude.

In step S13, the CPU 10 sets the surface 94 in accordance with the attitude of the terminal device 7. The surface 94 may be set in any way as long as it is set so as to change in accordance with the attitude of the terminal device 7. In this game example, the surface 94 is set based on the position and the attitude of the terminal object 92 which change in accordance with the attitude of the terminal device 7. Specifically, the position of the surface 94 is set at a position below (directly under) the terminal object 92 in an area above the keyboard object 91. As described above, since the terminal object 92 moves along an arc above the keyboard object 91 in accordance with the change of the attitude of the terminal device 7, the surface 94 is set so that it moves along the area of the keys of the keyboard object 91 in accordance with the change in the attitude of the terminal device 7. The attitude of the surface 94 is parallel to the keyboard object 91 and is set so as to coincide with the attitude of the terminal object 92 with respect to the attitude for the rotation direction about an axis perpendicular to the surface 94. That is, in this game example, the attitude of the surface 94 is set so as to correspond to the attitude of the terminal device 7 in accordance with the attitude of the terminal device 7.

As a specific process of step S13, the CPU 10 reads out the terminal object data 110 from the main memory, and calculates the position and the attitude of the surface 94 based on the position and the attitude of the terminal object 92. Then, data representing the position and the attitude which have been calculated is stored in the main memory as the surface data 111. The process of step S14 is performed, following step S13.

In step S14, the CPU 10 sets a terminal virtual camera. The terminal virtual camera may be set based on the position and the attitude of the surface 94, and is set in this game example at a position such that the area of the surface 94 is included in the range of viewing field. That is, the terminal virtual camera is set so that the perimeter of the range of viewing field and the perimeter of the surface 94 coincide with each other. Specifically, the CPU 10 reads out the surface data 111 from the main memory, and calculates the position and the attitude of the terminal virtual camera based on the position and the attitude of the surface 94. Then, data representing the position and the attitude which have been calculated is stored in the main memory as the terminal camera data 112. The process of step S15 is performed, following step S14.

In step S15, the CPU 10 determines whether there has been an input on the touch panel 52 (a touch input). Specifically, the CPU 10 reads out and references the latest input position data 104 stored in the main memory, and determines whether the input position data 104 represents the coordinate values of the input position or it indicates that there has been no input. If the determination result of step S15 is affirmative, the process of step S16 is performed. If the determination result of step S15 is negative, the CPU 10 ends the game control process.

In step S16, the CPU 10 calculates the specified position on the surface 94. The specified position is calculated as a position on the surface 94 corresponding to the input position. The specific method for calculating the specified position may be any method. In this game example, the specified position is calculated so that the positional relationship of the input position with respect to the four sides of the input surface of the touch panel 52 is the same as the positional relationship of the specified position with respect to the four sides of the surface 94. In this game example, the CPU 10 calculates the specified position so that the input position on the touch panel 52 and the specified position calculated based on the input position coincide with each other on the screen of the LCD 51. Then, since the position on the screen touched by the player is the specified position, the player can specify a position in the virtual space more easily. In this game example, the shape (aspect ratio) of the input surface of the touch panel 52 and the shape (aspect ratio) of the surface 94 are made equal to each other, and the input surface of the touch panel 52 and the surface 94 are made to coincide with each other on the screen of the LCD 51. Then, by calculating the specified position as described above, the input position and the control position can be made to coincide with each other on the screen of the LCD 51.

As a specific process of step S16, the CPU 10 first reads out the latest input position data 104 stored in the main memory, and converts the coordinates of the input position into two-dimensional coordinates of a two-dimensional coordinate system representing a position on the surface 94. Then, the CPU 10 converts the two-dimensional coordinates obtained through the conversion into three-dimensional coordinates of the virtual space coordinate system representing a position in a three-dimensional virtual space. The three-dimensional coordinates can be calculated by using the two-dimensional coordinates and the position and the attitude of the surface 94 (a formula of a plane representing the surface 94). Therefore, the CPU 10 reads out the surface data 111 from the main memory, and calculates the three-dimensional coordinates based on the two-dimensional coordinates and the surface data 111. Then, data representing the calculated three-dimensional coordinates is stored in the main memory as the specified position data 113. The process of step S17 is performed, following step S16 described above.

In step S17, the CPU 10 performs a predetermined process using the specified position as an input. In the first game example, the predetermined process is a process of outputting a sound associated with a key located at the specified position. Specifically, the CPU 10 reads out the specified position data 113 from the main memory, and identifies one of the keys of the keyboard object 91 that is specified by the specified position (that includes the specified position). Then, the CPU 10 identifies a sound associated with the identified key. The main memory stores association data which indicates the association between each key and a sound to be outputted when that key is identified, and the CPU 10 identifies a sound by referencing the association data. Then, the CPU 10 causes the DSP 11*c* to generate the identified sound. Thus, in this game example, the CPU 10 identifies one of a plurality of areas (areas of the keys) set in the virtual space that includes the specified position, and causes a sound associated with the identified area to be outputted. The CPU 10 ends the game control process after step S17.

With the game control process described above, the terminal virtual camera also moves (step S14) as the surface 94 moves (step S13) in the virtual space in accordance with the change in the attitude of the terminal device 7. As a result, the area of the keyboard object 91 to be displayed on the terminal device 7 changes (steps S5 and S7 to be described below). That is, the set of keys that can be specified by the player using the touch panel 52 changes.

Thus, the player can easily specify an intended position of the keyboard object 91 in the virtual space through the operation of changing the attitude of the terminal device 7 and a touch input operation.

In this game example, a plurality of areas (the areas of the keys) set in the virtual space are arranged in an arc shape (along an arc), and the CPU 10 sets the surface 94 so that it moves along the plurality of areas in accordance with the change in the attitude of the terminal device 7 (step S13). Then, the CPU 10 calculates the specified position on the surface 94 based on the input position (step S16). Therefore, in this game example, the player can move the surface 94 in an arc along the plurality of areas arranged in a generally arc shape through the operation of rotating (changing the attitude of) the terminal device V. Then, since the movement of the terminal device 7 and the movement of the surface 94 are both rotating movements and the movements correspond to each other, the operation of the terminal device 7 becomes more intuitive and easy-to-understand for the player. Moreover, since the player can grasp (guess) the method of operating the terminal device 7 based on the arc-shaped arrangement of the keys, the operation of the terminal device 7 is more intuitive and easy-to-understand for the player also for this reason. In other embodiments, the keys may be arranged along a straight line, and the surface 94 may be set so as to move along the straight line in accordance with the change in the attitude of the terminal device 7.

In this game example, since the game system 1 calculates the movement of the terminal device 7 using the acceleration sensor 73 and the gyrosensor 74, translating movements of the terminal device 7 may not be calculated precisely. In order to precisely calculate the movement of the terminal device 7, the terminal device 7 may be moved in an arc (change the attitude thereof) so that the movement in an arc is detected. In this game example, the player can guess the operation of moving the terminal device 7 in an arc based on the arc-shaped arrangement of the keys as described above, and therefore the game device 3 can precisely calculate the movement of the terminal device 7.

Referring back to FIG. 18, the process of step S4 is performed, following the game control process of step S3. In step S4, a television image is generated. That is, the CPU 10 and the GPU 11*b* read out data representing the results of the game control process of step S3 (e.g., data of the surface 94 and the object in the game space) from the main memory, and read out data necessary for generating a game image from the VRAM 11*d* to generate a television image. In this game example, the television virtual camera is set so that the entire keyboard object 91 and the terminal object 92 are included in the range of viewing field. Thus, a television image is generated representing an area of the virtual space including the keyboard object 91 and the terminal object 92 (see FIG. 14). The generated television image is stored in the VRAM 11*d*. The process of step S5 is performed, following step S4.

While the television virtual camera is fixed in this game example, the television virtual camera may be controlled so that it can be moved in other embodiments. While the image-capturing range of the television virtual camera may be set to be an area of the keyboard object 91 that is larger than the image-capturing range of the terminal virtual camera, it does not need to include the entire keyboard object 91. For example, in other embodiments, the CPU 10 may set the television virtual camera so that a portion of the keyboard object 91 and the terminal object 92 are included in the range of viewing field, and may move the television virtual camera in accordance with the movement of the terminal object 92.

In step S5, the terminal image is generated based on the game control process. That is, the CPU 10 and the GPU 11*b* read out data representing the results of the game control process of step S3 from the main memory and read out data necessary for generating a game image from the VRAM 11*d* to generate a game image. In the present embodiment, an image representing the area where the surface 94 is set in the virtual space is generated as the terminal image. Specifically, the terminal image is generated so that the input surface of the touch panel 52 and the surface 94 coincide with each other on the screen of the LCD 51. Thus, an image representing the keyboard object 91 in the area of the surface 94 is displayed on the terminal device 7 (see FIG. 16). The generated terminal image is stored in the VRAM 11*d*. The process of step S6 is performed, following step S5.

As described above, in this game example, the game device 3 sets a predetermined object (the keyboard object 91) in the virtual space, and generates an image representing the virtual space including the object, as an image to be displayed on the display devices (the television 2 and the LCD 51 of the terminal device 7). The game device 3 performs a predetermined process when the specified position is calculated to be the position of the predetermined object (step S15 described above). Therefore, in this game example, the player can perform an operation of making an input on the object in the virtual space through the operation of specifying a three-dimensional position in a virtual space using the terminal device 7.

Moreover, in this game example, the game device 3 generates, as an image to be displayed on the terminal device 7, an image representing a partial region of the object (the keyboard object 91) so that the region changes in accordance with the attitude of the terminal device 7 (step S4). The game device 3 also generates, as an image to be displayed on the television 2, an image representing a region of the object that is larger than the partial region (step S5). Since a relatively enlarged image is displayed on the terminal device 7, it is easier to perform touch input operations. Moreover, since an image of a relatively larger region is displayed on the television 2, the player is able to know information regarding the player's surroundings beyond the displayed region of the terminal device 7. By looking at an image of the television 2, the player can grasp the positional relationship of the displayed region on the terminal device 7 with respect to the whole of the object, for example.

In step S6, the CPU 10 outputs a game image to the television 2. Specifically, the CPU 10 sends the data of the television image stored in the VRAM 11*d* to the AV-IC 15. In response to this, the AV-IC 15 outputs the data of the television image to the television 2 via the AV connector 16. Thus, the television image is displayed on the television 2. In a case in which a sound generated in step S17 is outputted to the television 2, the CPU 10 sends the data of the sound generated in step S17 to the AV-IC 15. In response to this, the AV-IC 15 outputs the data of the sound to the television 2 via the AV connector 16. Thus, the television game sound is outputted from the speaker 2*a*. The process of step S7 is performed, following step S6.

In step S7, the CPU 10 outputs (transmits) the game image to the terminal device 7. Specifically, the image data of the terminal image stored in the VRAM 11*d* is sent to the codec LSI 27 by the CPU 10, and a predetermined compression process is performed by the codec LSI 27. The compressed image data is transmitted by the terminal communication module 28 to the terminal device 7 via the antenna 29. The terminal device 7 receives, by the wireless module 80, the data of the image transmitted from the game device 3, and a predetermined expansion process is performed by the codec LSI 76 on the received image data. The expanded image data is outputted to the LCD 51. Thus, the terminal image is displayed on the LCD 51. When the sound generated in step S17 is outputted to the terminal device 7, the generated sound data is sent to the codec LSI 27 by the CPU 10 and is subjected to a predetermined compression process by the codec LSI 27. The compressed sound data is transmitted by the terminal communication module 28 to the terminal device 7 via the antenna 29. The terminal device 7 receives, by the wireless module 80, the data of the sound transmitted from the game device 3, and the data is subjected to a predetermined expansion process by the codec LSI 76. The expanded sound data is outputted to the sound IC 78. Thus, the terminal game sound is outputted from the speaker 77. The process of step S8 is performed, following step S7.

In step S8, the CPU 10 determines whether the game should be ended. The determination of step S8 is made based on, for example, whether the player has given an instruction to quit the game, etc. If the determination result of step S8 is negative, the process of step S2 is performed again. If the determination result of step S8 is affirmative, the CPU 10 ends the game process shown in FIG. 16. When ending the game process, a process of saving the game data in a memory card, etc., may be performed. The series of processes through steps S2 to S8 is repeatedly performed until it is determined in step S8 that the game should be ended.

As described above, in this game example, keys placed in the virtual space are displayed on the display section (LCD) of the terminal device 7. Then, when the position in the virtual space associated with the input position (specified position) is calculated to be a position of a key, the game system 1 outputs a sound associated with the key corresponding to the position. Thus, the player can perform an operation of playing a keyboard instrument using the terminal device 7. With the game process described above, a position on the surface 94 in the virtual space is specified through an input on the touch panel 52 of the terminal device 7 (step S16), and the attitude of the surface 94 changes in accordance with the attitude of the terminal device 7 (step S13). Then, the player can easily specify the position of one of the keys in a three-dimensional virtual space by specifying the position using the touch panel 52 while changing the attitude of the surface 94.

[7. Second Game Example]

The second game example to be performed by the game system 1 of the present embodiment will now be described with reference to FIGS. 20 to 36. In the second game example, the player can draw dots and lines in a three-dimensional virtual space (game space) using the terminal device 7. The game image representing the virtual space is displayed on two display devices of the television 2 and the terminal device 7. In this game example, the terminal device 7 is used not only as the display device but also as the controller device. Therefore, the controller 5 may not be used, and the game system 1 may not include the controller 5.

Figure 20:
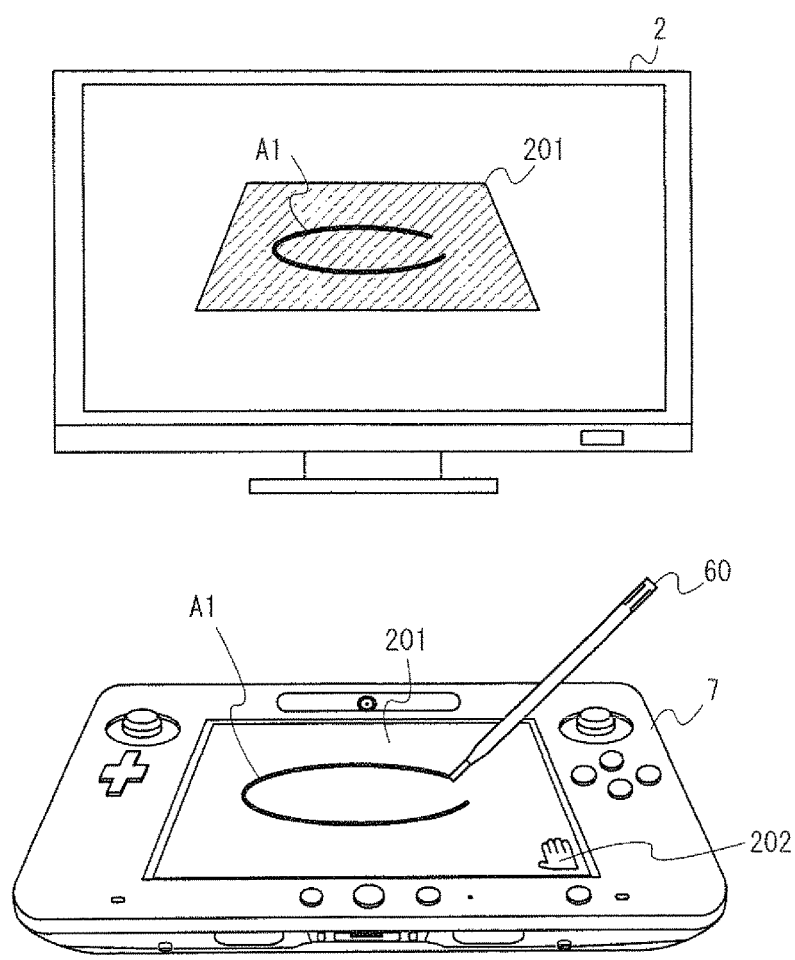
FIG. 20 is a diagram showing the television 2 and the example non-limiting terminal device 7 when game operations are performed in this game example.

FIG. 20 is a diagram showing the television 2 and the terminal device 7 when game operations are performed in this game example. As shown in FIG. 20, a three-dimensional virtual space in which a predetermined surface 201 is provided is displayed on the television 2, and the surface 201 is displayed also on the terminal device 7. In the terminal device 7, the surface 201 is displayed so that the surface 201 and the display screen coincide with each other. That is, the surface 201 corresponds to the input surface of the touch panel 52 of the terminal device 7. The surface 201 is a rectangular plane having the same aspect ratio as that of input surface of the touch panel 52 (the screen of the LCD 51). The attitude of the surface 201 corresponds to the attitude of the terminal device 7, and the attitude of the surface 201 in the virtual space changes by changing the attitude of the terminal device 7, the details of which will be described later. In FIG. 20, since the terminal device 7 is in such an attitude that the touch panel 52 is horizontal, the surface 201 is also horizontal in the virtual space. An icon 202 is displayed on the terminal device 7. The icon 202 is used for moving (rotating) the path generated in the virtual space, the details of which will be described later.

The player can draw dots and lines with the touch pen 60, a finger, etc., on the touch panel 52 of the terminal device 7. When a dot or a line is drawn, the dot or line drawn (the line A1 in FIG. 20) is generated and displayed on the surface 201 in the virtual space as shown in FIG. 20. Specifically, when an input (touch input) is made on the touch panel 52, the position on the surface 201 (specified position) corresponding to the position at which an input has been made (input position) is calculated. In this game example, an object representing a dot or line is placed at the specified position, thereby displaying the input dot or line. As described above, the player can draw dots and lines in a three-dimensional virtual space through input operations on the touch panel 52.

Figure 21:
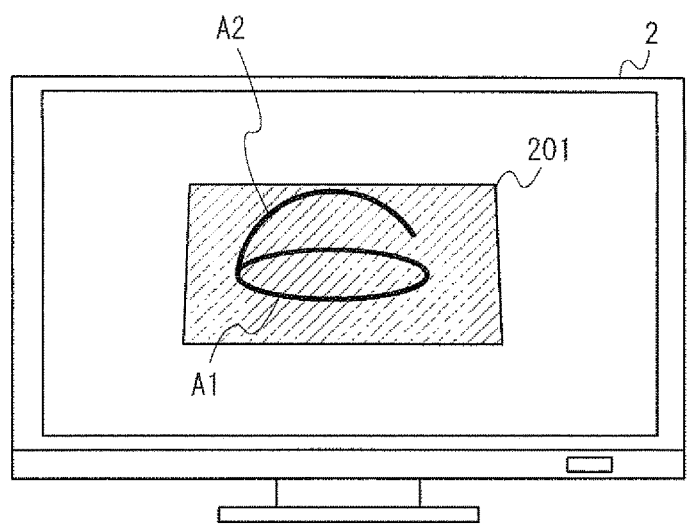
FIG. 21 is a diagram showing the television 2 and the example non-limiting terminal device 7 when the terminal device 7 is tilted from the position shown in FIG. 20.
Figure 21:
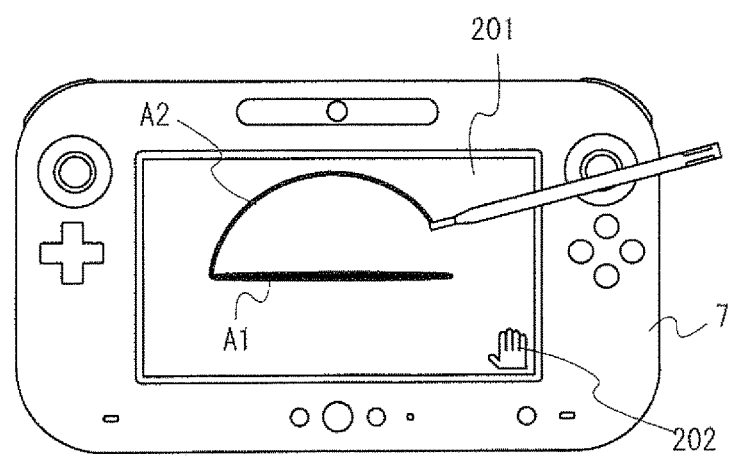

FIG. 21 is a diagram showing the television 2 and the terminal device 7 when the terminal device 7 is tilted from the position shown in FIG. 20. While the input surface of the touch panel 52 is horizontal in the position shown in FIG. 20, the attitude of the terminal device 7 has changed from that in the position shown in FIG. 21 so that the input surface is vertical. When the attitude of the terminal device 7 is changed so that the input surface of the touch panel 52 is vertical, the surface 201 in the virtual space also changes so as to be vertical as shown in FIG. 21. In this game example, the surface 201 rotates about the center of the surface 201 as the center of rotation in accordance with the attitude of the terminal device 7. When the attitude of the surface 201 changes, the viewpoint and the line-of-sight direction of the image displayed on the terminal device 7 change so that the surface 201 and the display screen coincide with each other.

Also in the position shown in FIG. 21, as in the position shown in FIG. 20, the player can draw dots and lines in the three-dimensional virtual space through input operations on the touch panel 52. That is, when the player draws a line on the touch panel 52 in the position shown in FIG. 21, a line is generated and displayed on the surface 201 which has turned parallel to the vertical direction in the virtual space. In the position shown in FIG. 21, since the attitude of the surface 201 is different from that in the position shown in FIG. 20, the position and the direction of the line generated through a touch input are different from those of FIG. 20. That is, while the line A1 generated in the position shown in FIG. 20 is generated in a horizontal surface, the line A2 generated in the position shown in FIG. 21 is generated in a vertical surface. Therefore, the drawing formed by the line A1 and the line A2 is not two-dimensional but is three-dimensional.

As described above, in this game example, a drawing (dots and lines) is generated on the surface 201 in the virtual space in accordance with inputs made on the touch panel 52 of the terminal device 7, while the attitude of the surface 201 changes in accordance with the attitude of the terminal device 7. Thus, the drawing generated on the surface 201 can be made three-dimensional by changing the attitude of the surface 201. That is, the player can three-dimensionally freely draw a drawing in a three-dimensional virtual space through input operations on the touch panel 52.

Figure 22:
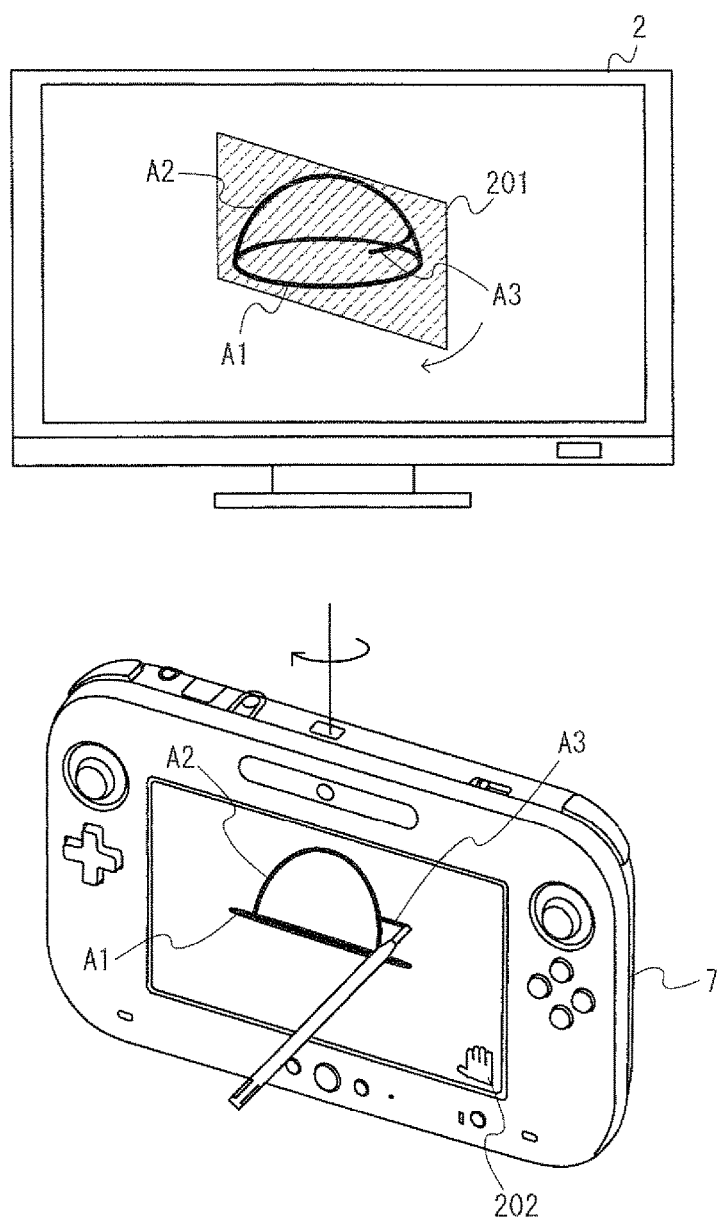
FIG. 22 is a diagram showing the television 2 and the example non-limiting terminal device 7 when the terminal device 7 is tilted from the position shown in FIG. 21.

In this game example, the player can also draw a line in the virtual space through the operation of changing the attitude of the terminal device 7. FIG. 22 is a diagram showing the television 2 and the terminal device 7 when the terminal device 7 is tilted from the position shown in FIG. 21. While the normal direction to the input surface of the touch panel 52 faces toward the television 2 in the position shown in FIG. 21, the normal direction is slightly sideways from the direction toward the television 2 in the position shown in FIG. 22. It is assumed herein that while the attitude of the terminal device 7 is changed from that in the position shown in FIG. 21 to that in the position shown in FIG. 22, the player continuously touches a certain position on the touch panel 52 (except for the position of the icon 202). Also when moving from the position shown in FIG. 21 to the position shown in FIG. 22, the attitude of the surface 201 changes in accordance with the attitude of the terminal device 7 as described above as shown in FIG. 22. In this case, even if the player continuously touches the same position, the specified position in the virtual space changes as the attitude of the surface 201 changes. Therefore, as shown in FIG. 22, the line A3 is generated and displayed representing a path along which the specified position has moved. Thus, in this game example, it is possible to draw a line in the virtual space through the operation of changing the attitude of the terminal device 7, in addition to the operation of drawing a line on the touch panel 52. It is also possible to draw a line in a direction that is not parallel to the surface 201 through the operation of changing the attitude of the terminal device 7.

Figure 23:
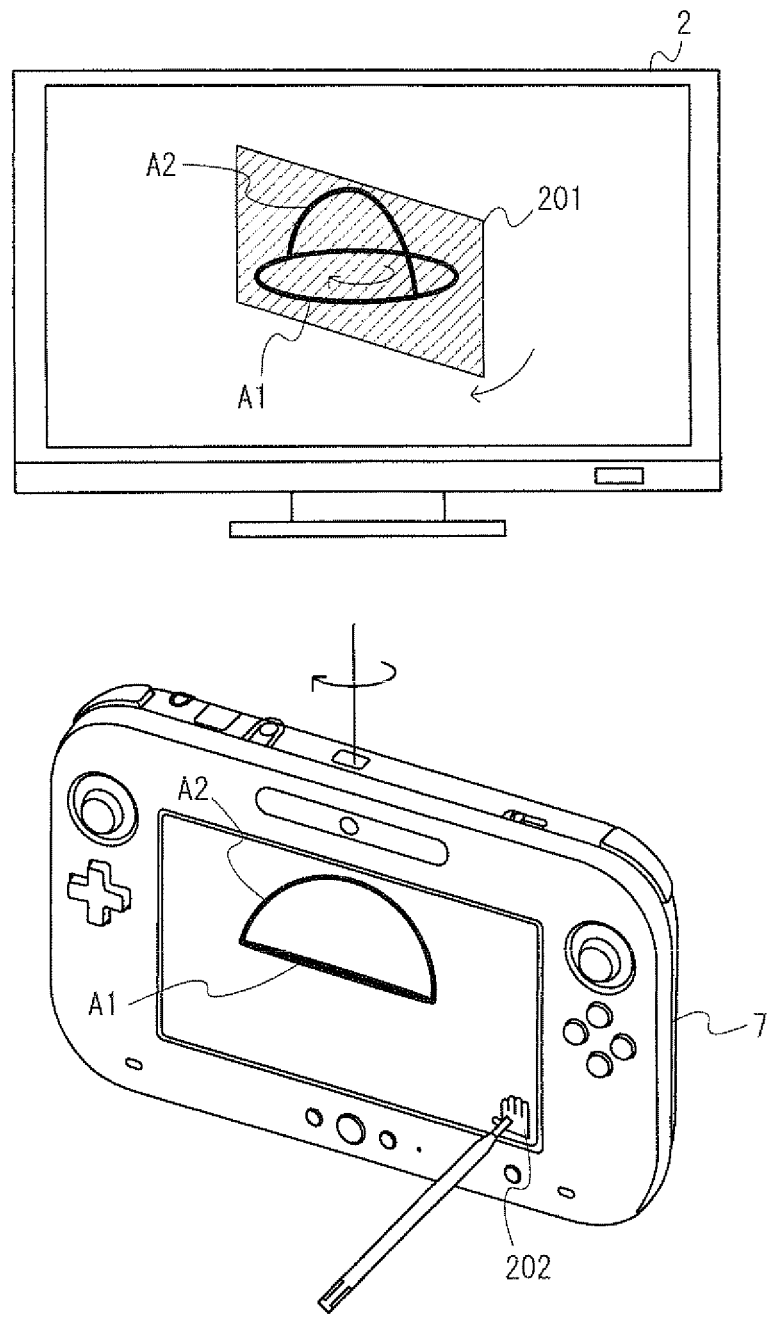
FIG. 23 is a diagram showing the television 2 and the example non-limiting terminal device 7 when a drawing is rotated from the position shown in FIG. 21.

In this game example, the player can change the direction (attitude) of the drawing generated in the virtual space. FIG. 23 is a diagram showing the television 2 and the terminal device 7 when a drawing is rotated from the position shown in FIG. 21. While the normal direction to the input surface of the touch panel 52 is facing toward the television 2 in the position shown in FIG. 21, the normal direction is slightly sideways from the direction toward the television 2 in the position shown in FIG. 23, as in the position shown in FIG. 22. It is assumed that the player is performing a predetermined operation (herein an operation of continuously touching the position of the icon 202 on the touch panel 52) while the attitude of the terminal device 7 is changed from that in the position shown in FIG. 21 to that in the position shown in FIG. 22. When the attitude of the terminal device 7 is changed while a predetermined operation is being performed as described above, the attitude of the generated drawing changes, together with the attitude of the surface 201, in accordance with the attitude of the terminal device 7. For example, in FIG. 23, the drawing made up of the lines A1 and A2 rotates together with the surface 201 about an axis in the vertical direction in the virtual space as the terminal device 7 rotates about an axis in the vertical direction. Then, the drawing is displayed on the television 2 with the direction having been changed. Therefore, the player can view the created drawing from various directions and check the shape of the drawing through the operation of changing the attitude of the terminal device 7 while touching the icon 202. Since the line-of-sight direction of an image displayed on the terminal device 7 changes together with the attitude of the surface 201, the drawing appears to be not moving. While the predetermined operation is an operation of touching the icon 202 in this game example, it may be any other suitable operation such as pressing a predetermined button of the terminal device 7, for example, in other embodiments.

(Game Processes in Second Game Example)

Figure 24:
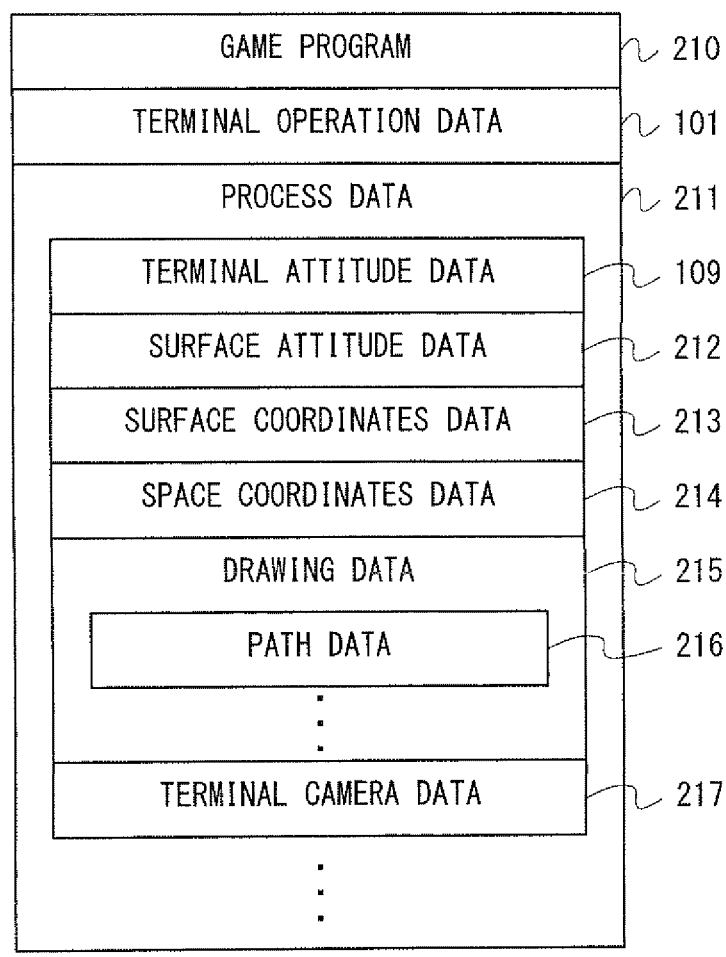
FIG. 24 is a diagram showing various example non-limiting data used in the game processes.

Next, the details of game processes performed by the game system 1 in the second game example will be described. First, various data used in the game processes will be described. FIG. 24 is a diagram showing various data used in the game processes. FIG. 24 is a diagram showing primary data to be stored in the main memory (the external main memory 12 or the internal main memory 11e) of the game device 3. As shown in FIG. 24, the main memory of the game device 3 stores a game program 210, terminal operation data 101 and process data 211. In addition to those shown in FIG. 24, the main memory also stores other data necessary for the game, such as image data of various objects appearing in the game, and sound data used in the game, etc. Various data shown in FIG. 24 will now be described. In FIG. 24, the same data as those shown in FIG. 17 will be denoted by the same reference numerals as those of FIG. 17 and will not be further described below.

The game program 210 is a program for causing a computer (the CPU 10) of the game device 3 to perform game processes of the second game example. At an appropriate point in time after the power of the game device 3 is turned ON, a part or whole of the game program 210 is loaded from the optical disc 4 and stored in the main memory. The game program 210 may be obtained from the flash memory 17 or an external device of the game device 3 (e.g., via the Internet), instead of from the optical disc 4. A part of the game program 210 (e.g., a program for calculating the attitude of the controller 5 and/or the terminal device 7) may be pre-stored in the game device 3.

The terminal operation data 101 is data representing an operation performed by the player on the terminal device 7, as in the first game example. Although it is not shown in this game example because the controller 5 is not used as the controller device, controller operation data representing an operation performed by the player on the controller 5 may be stored in the main memory.

Figure 25:
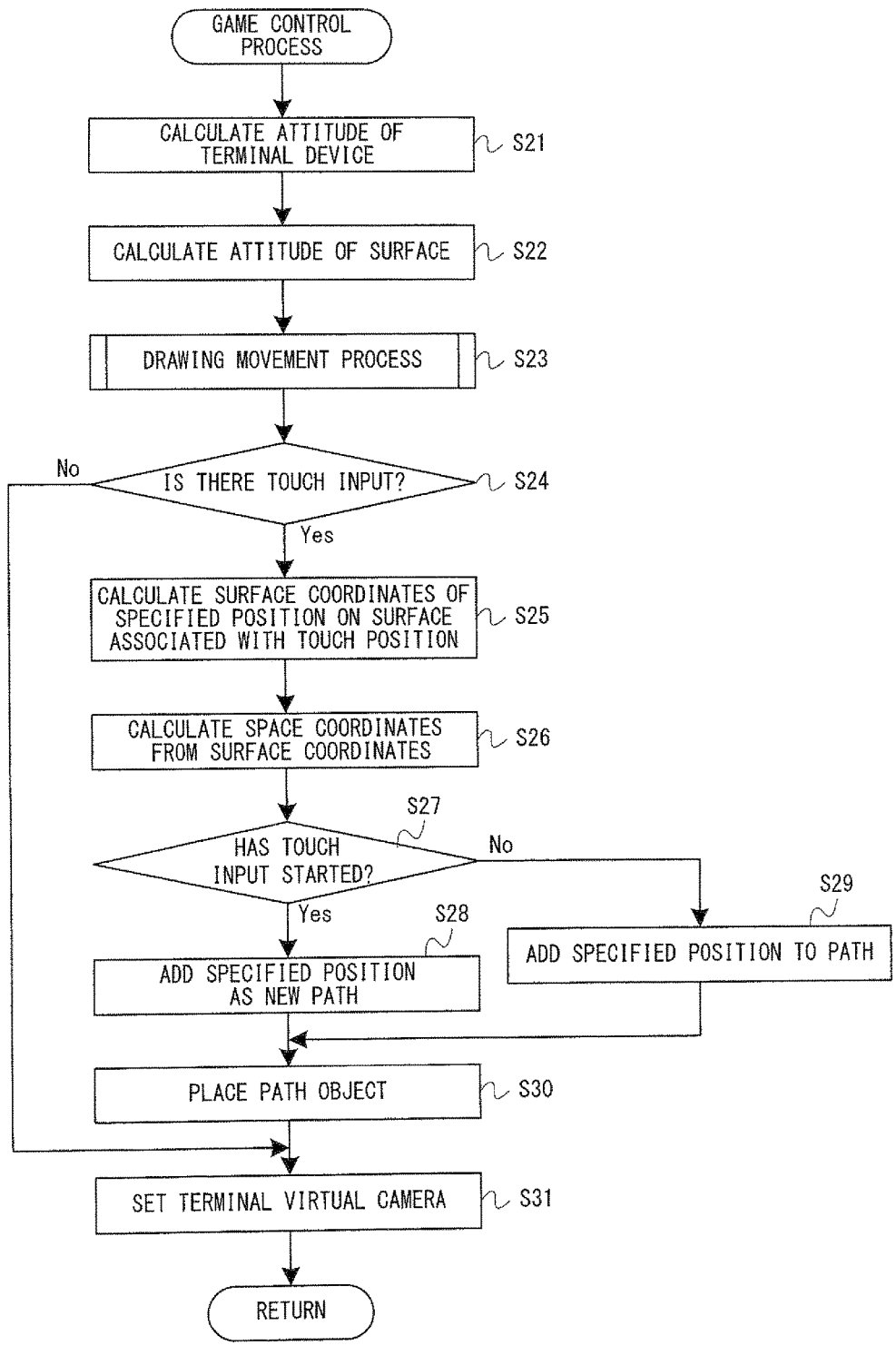
FIG. 25 is a flow chart showing a detailed flow of an example non-limiting game control process (step S3) in a second game example.

The process data 211 is data used in game processes to be described below (FIG. 25, etc.). The process data 211 includes the terminal attitude data 109, surface attitude data 212, planar coordinate data 213, space coordinate data 214, drawing data 215, and terminal camera data 217, as in the first game example. In addition to those shown in FIG. 24, the process data 211 also includes various data used in the game processes, such as data representing various parameters set for various objects appearing in the game.

The surface attitude data 212 is data representing the attitude of the surface 201 which is set in the virtual space. The attitude of the surface 201 represented by the surface attitude data 212 may be expressed by a rotation matrix, may be expressed by a cubic vector or three angles, or may be expressed by a formula of a plane. In this game example, the position of the surface 201 is fixed to a predetermined position.

The planar coordinate data 213 is data representing planar coordinates of the specified position. Planar coordinates as used herein are coordinates for expressing the specified position in a coordinate system (planar coordinate system) with respect to the surface 201. Since the specified position is a point on the surface 201, the planar coordinate data 213 may be data representing two-dimensional coordinate values. The specified position on the surface 201 corresponds to the input position on the touch panel 52, and the planar coordinate data 213 is calculated based on the input position data 104.

The space coordinate data 214 is data representing space coordinates of the specified position. Space coordinates as used herein are coordinates for expressing the specified position in a coordinate system (space coordinate system) with respect to the virtual space. The space coordinate data 214 represents the specified position by three-dimensional coordinate values. The space coordinate data 214 is calculated based on the surface attitude data 212 and the planar coordinate data 213.

The drawing data 215 is data representing a drawing formed by specified positions. The drawing data 215 includes one or more path data 216. The path data 216 is data representing a path of calculated specified positions. Specifically, when inputs are made successively on the touch panel 52 (i.e., when input positions are detected successively), the path data 216 represents a series of specified positions corresponding to input positions starting from the oldest one. The path data 216 represents coordinate values expressing specified positions in the space coordinate system. In this game example, when a next touch input is newly made after one touch input is complete, new path data 216 for the next touch input is generated and stored in the main memory, in addition to the path data 216 generated for the first touch input.

The terminal camera data 217 is data representing the position and the attitude of a virtual camera (terminal virtual camera) which is used for generating the terminal image. In this game example, the position and the attitude of the terminal virtual camera are calculated based on the position of the surface 201.

In addition to the data 212 to 217, the main memory stores various data necessary for the game processes. In this game example, for example, flag data is stored which represents whether it is in a grab state. The grab state is a state in which the icon 202 is touched, and is a state in which a drawing formed by paths of the specified positions can be moved.

Next, the details of the game processes performed by the game device 3 will be described with reference to FIGS. 25 to 28. In the second game example, the main flow chart showing the general process flow of the game processes is similar to FIG. 18, and therefore the details thereof will not be described below. The game processes of the second game example will now be described focusing on differences from the first game example.

Also in the second game example, the CPU 10 first performs an initialization process in step S1, as in the first game example. The initialization process is a process of constructing a virtual space, placing objects appearing in the virtual space at their initial positions, and setting initial values of various parameters used in the game processes. In this game example, the surface 201 is placed in a predetermined position and a predetermined attitude in the virtual space. Data representing the initial position and the initial attitude of the surface 201 is stored in the main memory. The virtual camera (television virtual camera) used for generating the television image and the virtual camera (terminal virtual camera) used for generating the terminal image are set with a predetermined initial position and a predetermined initial attitude. The data representing the initial position and the initial attitude of the television virtual camera is stored in the main memory, and data representing the initial position and the initial attitude of the terminal virtual camera is stored in the main memory as the terminal camera data 217. The television virtual camera is set with a predetermined position and a predetermined attitude so that the surface 201 is included in the range of viewing field. The initial position and the initial attitude of the terminal virtual camera are set so that the line-of-sight direction is perpendicular to the surface 201 and the surface 201 coincides with the display screen of the LCD 51. In step S1, data representing a non-grab state is stored in the main memory as the flag data. The process of step S2 is performed, following step S1.

In step S2, the CPU 10 obtains the terminal operation data transmitted from the terminal device 7. The process of step S2 is similar to the first game example. The process of step S3 is performed, following step S2.

In step S3, the CPU 10 performs the game control process. In the second game example, the game control process is a process generating an object representing a dot or line in the virtual space, moving the object, etc., in accordance with an operation by the player. The details of the game control process will now be described with reference to FIG. 25.

FIG. 25 is a flow chart showing a detailed flow of the game control process (step S3) in the second game example. In the game control process, first, in step S21, the CPU 10 calculates the attitude of the terminal device 7. The process of step S21 is similar to step S11. The process of step S22 is performed, following step S21.

In step S22, the CPU 10 sets the surface 201 so that the attitude changes in accordance with the attitude of the terminal device 7. In this game example, since the position of the surface 201 does not change, the CPU 10 calculates the attitude of the surface 201 based on the attitude of the terminal device 7. In this game example, the attitude of the surface 201 in the virtual space is controlled so as to correspond to the attitude of the terminal device 7 in the real space. Specifically, the attitude of the terminal device 7 in which the y axis (see FIG. 9) of the terminal device 7 is horizontal and faces toward the television 2 is the reference attitude, and when the terminal device 7 is in the reference attitude, the surface 201 is horizontal in the virtual space. When the attitude of the terminal device 7 changes from the reference attitude, the surface 201 is rotated from the attitude of the surface 201 in the reference attitude in a direction in accordance with the direction in which the attitude of the terminal device 7 changes by an amount in accordance with the amount of change (so that the amount of rotation of the terminal device 7 and the amount of rotation of the surface 201 are equal to each other in this game example). The attitude of the surface 201 may be controlled in any way as long as it is controlled so that it changes in accordance with the change in the attitude of the terminal device 7.

As a specific process of step S22, the CPU 10 reads out the terminal attitude data 109 from the main memory, and calculates the attitude of the surface 201 based on the attitude of the terminal device 7. Data representing the calculated attitude of the surface 201 is stored in the main memory as the surface attitude data 212. In this game example, the attitude of the surface 201 may be represented by three vectors which represent, in a space coordinate system, three axis directions in a three-dimensional planar coordinate system with respect to the surface 201, for example. The process of step S23 is performed, following step S22.

In step S23, the CPU 10 performs a drawing moving process. The drawing moving process is a process of moving (rotating), in accordance with the attitude of the terminal device 7, the drawing formed by specified positions which have been set based on inputs made by the player. The details of the drawing moving process will be described below. The process of step S24 is performed, following step S23.

In step S24, the CPU 10 determines whether there has been a touch input on the touch panel 52. This determination can be made by referencing the input position data 104 read out in step S2. If the determination result of step S24 is affirmative, the process of step S25 is performed. If the determination result of step S24 is negative, the CPU 10 skips the processes of steps S25 to S30 and performs the process of step S31 to be described below.

Figure 26:
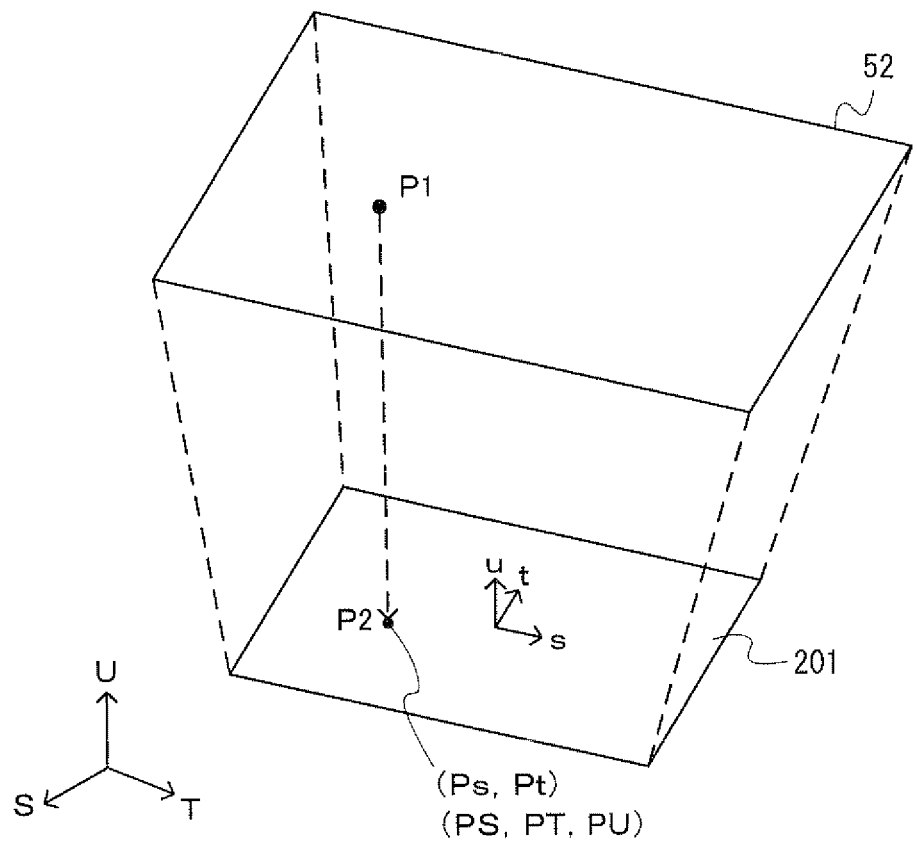
FIG. 26 is a diagram illustrating an example non-limiting method for calculating a specified position based on an input position on the input surface of a touch panel 52.

In step S25 and step S26, the specified position is calculated based on the input position. As described above, in this game example, the position on the surface 201 determined by the input position is calculated as the specified position. FIG. 26 is a diagram illustrating a method for calculating a specified position based on an input position on the input surface of the touch panel 52. As shown in FIG. 26, the specified position P2 on the surface 201 is calculated as the position on the surface 201 corresponding to the input position P1 on the input surface of the touch panel 52. In this game example, first, the planar coordinates (Ps, Pt) of the specified position P2 are calculated based on the input position P1. The planar coordinates (Ps, Pt) are coordinates which are expressed in a planar coordinate system (stu coordinate system) with respect to the surface 201. The planar coordinate system as used herein is composed of the s axis extending in the longitudinal direction of the surface 201, the t axis extending in the width direction of the surface 201, and the u axis extending in the direction vertical to the surface 201. Therefore, the position on the surface 201 is expressed by two-dimensional coordinates (Ps, Pt) including the s-direction component and the t-direction component. The u axis of the planar coordinate system is set for the purpose of representing, in a planar coordinate system, a position that is not on the surface 201 in the drawing moving process to be described below. The planar coordinates (Ps, Pt) are calculated by, for example, scaling (multiplying by a predetermined constant) the coordinate values of the input position P1 in accordance with the ratio between the size of the surface 201 and the size of the input surface of the touch panel 52. When the planar coordinate system and the space coordinate system are set so that the ratio is "1", the coordinate values of the input position 51 can be used as they are as the planar coordinates (Ps, Pt).

When the planar coordinates (Ps, Pt) of the specified position P2 are calculated, the planar coordinates (Ps, Pt) are then converted to the space coordinates (PS, PT, PU). The space coordinates (PS, PT, PU) are coordinate values representing the specified position 52 in the space coordinate system (STU coordinate system). The position of the origin and the directions of the axes of the planar coordinate system in the space coordinate system are determined by the position and the attitude of the surface 201. Therefore, the space coordinates (PS, PT, PU) can be calculated based on the position of the surface 201 ((DS, DT, DU) to be described below) and the attitude (the vector A and the vector B to be described below) and the planar coordinates (Ps, Pt). Specifically, the space coordinates (PS, PT, PU) can be calculated in accordance with Expression (1) below.

$$PS=Ps \times AS+Pt \times AS+DS$$

$$PT=Ps \times AT+Pt \times AT+DT$$

$$PU=Ps \times AU+Pt \times AU+DU \quad (1)$$

In Expression (1) above, (AS, AT, AU) are the components of the unit vector A extending in the positive s-axis direction in the planar coordinate system, and (BS, BT, BU) are the components of the unit vector B extending in the positive t-axis direction in the planar coordinate system. The position of the origin (in the space coordinate system) in the planar coordinate system is (DS, DT, DU).

Specifically, first, in step S25, the CPU 10 calculates the planar coordinates of the specified position corresponding to the input position. As described above, the planar coordinates are calculated as the position P2 on the surface 201 corresponding to the input position P1 on the input surface of the touch panel 52. While the specific method for calculating the planar coordinates may be any method, the planar coordinates are calculated so that the positional relationship of the input position P1 with respect to the four sides of the input surface of the touch panel 52 is the same as the positional relationship of the specified position P2 with respect to the four sides of the surface 201. Specifically, in this game example, the planar coordinates are calculated by scaling the coordinate values of the input position P1 in accordance with the ratio described above.

As a specific process of step S25, the CPU 10 calculates the two-dimensional coordinates for expressing, by the planar coordinate system, the position on the surface 201 corresponding to the input position, from the input position represented by the input position data 104 read out in step S2. Then, data representing the calculated two-dimensional coordinates is stored in the main memory as the planar coordinate data 213. The process of step S26 is performed, following step S25.

In step S26, the CPU 10 calculates the space coordinates of the specified position from the planar coordinates. As described above, the space coordinates can be calculated based on the planar coordinates and the position and the attitude of the surface 201 (i.e., the origin position and the directions of the coordinate axes of the planar coordinate system in the space coordinate system). That is, the CPU 10 reads out the surface attitude data 212 and the planar coordinate data 213 from the main memory, and calculates the space coordinates by substituting the planar coordinates and the position and the attitude of the surface 201 into Expression (1) above. Data representing the calculated space coordinates is stored in the main memory as the space coordinate data 214. The process of step S27 is performed, following step S26.

With steps S25 and S26, the CPU 10 calculates, as the specified position in the virtual space, a position the virtual space) corresponding to the input position on the display screen of the touch panel 52 (the LCD 51). That is, since the position touched by the player is the specified position on the display screen, the player can specify the specified position through an intuitive and easy-to-understand operation.

In step S27, the CPU 10 determines whether a touch input has been started (whether it is immediately after the start of the touch input). Specifically, the CPU 10 determines whether there has been a touch input in the previous iteration of the process loop (a process loop including a series of processes of steps S2 to S8). Taking into consideration erroneous detections of the touch panel 52 and erroneous operations of the player, the CPU 10 may determine whether there have been successive touch inputs over a predetermined number of preceding iterations, rather than whether there has been a touch input for the previous iteration. If the determination result of step S27 is affirmative, the process of step S28 is performed. If the determination result of step S27 is negative, the process of step S29 is performed.

In step S28, the CPU 10 stores the specified position calculated in steps S25 and S26 as the start point of a new path. Specifically, the CPU 10 stores the space coordinate data 214, which has been stored in the main memory, as new path data 216 in the main memory. Thus, one path data 216 included in the drawing data 215 has been added. That is, one path of a drawing has been added. The process of step S30 is performed, following step S28.

In step S29, the CPU 10 stores the specified position calculated in steps S25 and S26 as the end point of the existing path. Specifically, the CPU 10 updates the path data 216 so as to add the space coordinate data 214 to the latest one of the path data 216 included in the drawing data 215. Thus, the specified position has been added to the end point of the latest path. The process of step S30 is performed, following step S29.

In step S30, the CPU 10 places a predetermined object at the specified position calculated in steps S25 and S26. While the predetermined object may be of any shape, an object representing a path at a specified position is placed in this game example. That is, the CPU 10 places an object so that one or more specified positions including on path data 216 form one line. Specifically, in the process of one iteration of step S30, a linear object connecting between the latest specified position and the previous specified position is placed. For example, the linear object may be a cylindrical object so that it is seen to be linear from any direction. When the latest specified position is the start point of a path, an object representing a point (e.g., a spherical object) is placed. While the object placed in step S30 continues to be present in subsequent processes in this game example, it may be erased in response to an instruction from the player, for example, in other embodiments. The object placed in step S30 may be successively (automatically) moved in a predetermined direction in response to a predetermined operation by the player. Thus, for example, the player can draw a straight line only by specifying a point in the virtual space, or drawing a wavy line by reciprocating the input position in a direction perpendicular to the movement direction of the object, and the player can easily draw a wider variety of lines. The process of step S31 is performed, following step S30.

Figure 27:
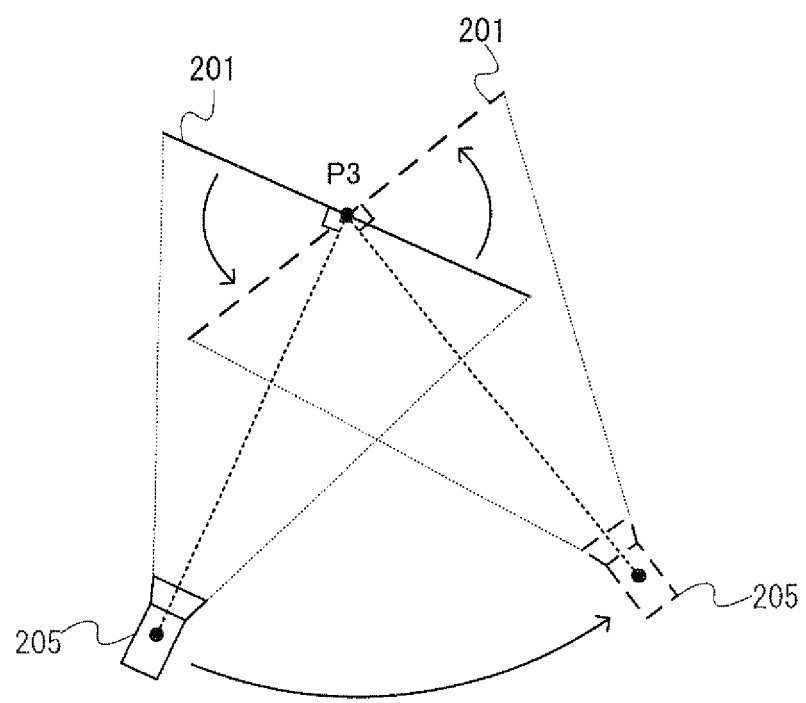
FIG. 27 is a diagram showing the example non-limiting positional relationship between a surface 201 and a terminal virtual camera 205.

In step S31, the CPU 10 controls the terminal virtual camera in accordance with the attitude of the surface 201. FIG. 27 is a diagram showing the positional relationship between the surface 201 and the terminal virtual camera 205. FIG. 27 is a diagram showing the surface 201 as seen from a direction parallel to the surface 201. As shown in FIG. 27, when the attitude of the surface 201 changes, the position and the attitude of the terminal virtual camera 205 change in accordance with the attitude of the surface 201. Specifically, the terminal virtual camera 205 is set so that the surface 201 is included in the range of viewing field. In this game example, the terminal virtual camera 205 is set so that the periphery of the surface 201 and the perimeter of the range of viewing field of the terminal virtual camera 205 coincide with each other. Therefore, the position of the terminal virtual camera 205 is set to a position along a straight line that passes through the center position P3 of the surface 201 and is perpendicular to the surface 201 such that the distance from the surface 201 is a predetermined distance in accordance with the range of viewing field. The attitude of the terminal virtual camera 205 is set so that the terminal virtual camera 205 faces toward the center position P3 of the surface 201. As the terminal virtual camera 205 is set as described above, the surface 201 is displayed on the LCD 51 of the terminal device 7 so that the input surface of the touch panel 52 and the surface 201 coincide with each other on the screen (see FIG. 21, etc.). Then, the specified position is the position on the screen touched by the player, with an object representing a dot or line generated and displayed at that position, and the operation of the touch panel 52 can be made intuitive and easy-to-understand.

As a specific process of step S31, the CPU 10 reads out the surface attitude data 212 from the main memory, and calculates the position and the attitude of the terminal virtual camera 205 based, on the position and the attitude of the surface 201. Then, data representing the position and the attitude which have been calculated is stored in the main memory as the terminal camera data 217. The CPU 10 ends the game control process after step S31.

Figure 28:
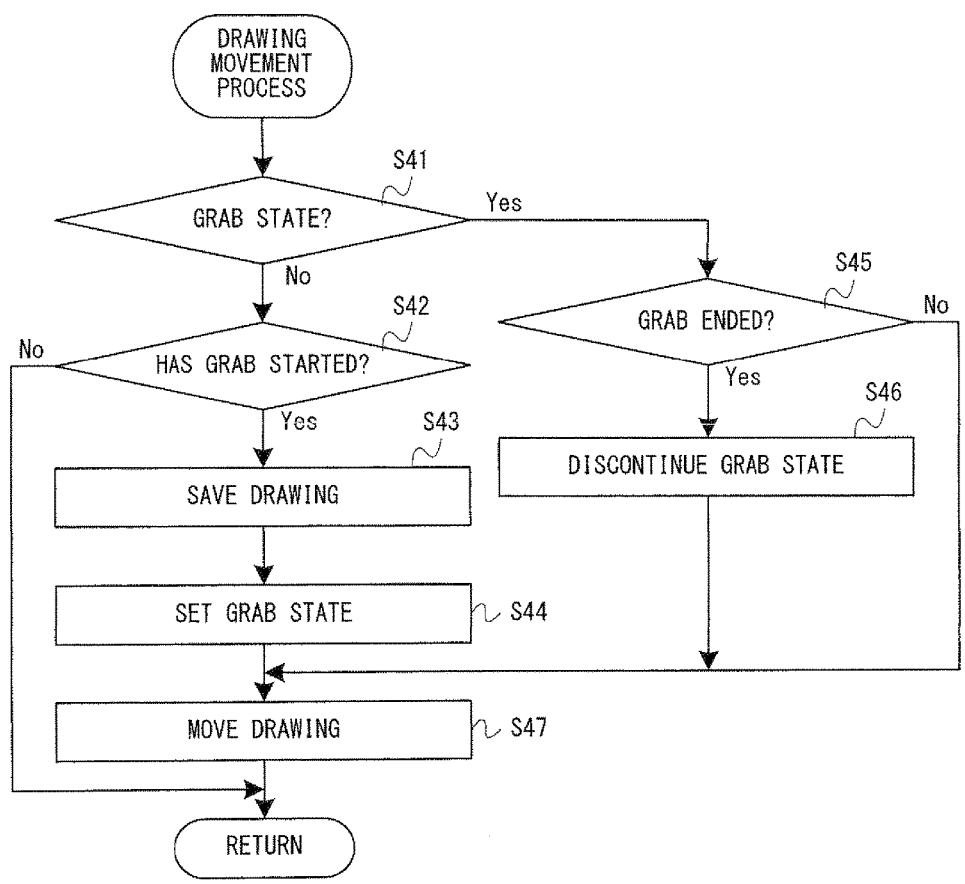
FIG. 28 is a flow chart showing a detailed flow of an example non-limiting drawing moving process (step S23) shown in FIG. 25.

Next, the details of the drawing moving process will be described. FIG. 28 is a flow chart showing a detailed flow of the drawing moving process (step S23) shown in FIG. 25. In the drawing moving process, first, in step S41, the CPU 10 determines whether the current state is a grab state. This determination can be made by reading out the flag data stored in the main memory and referencing the flag data. If the determination result of step S41 is affirmative (a grab state), the process of step S45 to be described below is performed. If the determination result of step S41 is negative (a non-grab state), the process of step S42 is performed.

In step S42, the CPU 10 determines whether a grab state has been started. A case where a grab state is started is where there is no touch input on the icon 202 in the process loop (the process loop through steps S2 to S8) of the previous iteration and there is a touch input on the icon 202 in the process loop of the current iteration. Specifically, the CPU 10 reads out the flag data from the main memory and determines that a grab state has been started if the flag data represents a non-grab state and the input position data 104 read out in step S2 represents the position of the icon 202. When the flag data represents a grab state or the input position data 104 read out in step S2 represents a position other than the icon 202, it is determined that a grab state has not been started. If the determination result of step S42 is affirmative, the process of step S43 is performed. If the determination result of step S42 is negative, the CPU 10 ends the drawing moving process.

In step S43, the CPU 10 saves the drawing formed by specified positions. In this game example, the CPU 10 saves the specified positions of the drawing in coordinate values in a planar coordinate system. That is, the CPU 10 reads out the drawing data 215 and the surface attitude data 212 from the main memory, converts the space coordinates of one or more specified position represented by the drawing data 215 into planar coordinates. This conversion is performed by using the attitude of the surface 201 represented by the surface attitude data 212. The CPU 10 stores data representing the converted planar coordinates in the main memory. As is the path data 216 included in the drawing data 215, this data is stored in such a format that the specified positions are grouped by paths. The process of step S44 is performed, following step S43.

In step S44, the CPU 10 sets the flag data so that it represents a grab state. That is, the CPU 10 updates the flag data stored in the main memory so that it represents a grab state. Thereafter, until there is no longer a touch input on the icon 202, it is determined in step S41 that it is a grab state. Step S47 to be described below is performed, following step S44.

In step S45, the CPU 10 determines whether the grab state has ended. That is, if the input position data 104 read out in step S2 represents a position other than the icon 202 or if there is no touch input, the CPU 10 determines that the grab state has ended. If the input position data 104 represents the position of the icon 202, it is determined that the grab state has not ended (that the grab state is continuing). If the determination result of step S45 is affirmative, the process of step S46 is performed. If the determination result of step S45 is negative, the process of step S47 is performed, skipping the process of step S46.

In step S46, the CPU 10 resets the flag data so that the grab state is discontinued. That is, the CPU 10 updates the flag data stored in the main memory so that it represents a non-grab state. Thus, it is determined in step S41 that it is a non-grab state in subsequent process iterations. The process of step S47 is performed, following step S46.

In step S47, the CPU 10 moves the drawing formed by the specified positions. In this game example, the drawing rotates in accordance with the attitude of the controller device 7 (that is, in accordance with the change in the attitude of the surface 201). As with the surface 201, the center of rotation of the drawing is the center position of the surface 201. As described above, the space coordinates of the current (rotated) specified position can be calculated based on the planar coordinates of the specified position and the current attitude of the surface 201. Therefore, the CPU 10 reads out data representing the planar coordinates saved in step S43 and the surface attitude data 212 from the main memory, and converts the planar coordinates into space coordinates using the attitude of the surface 201. Thus, it is possible to calculate space coordinates of specified positions of the drawing which has been rotated in accordance with the attitude of the surface 201. The CPU 10 stores data representing one or more set of space coordinates calculated in the main memory as new drawing data 215. The CPU 10 ends the drawing moving process after step S47.

With the drawing moving process, the CPU 10 moves (rotates) the object representing the drawing based on an operation on the terminal device 7 (step S47). Therefore, the player can see the drawing which has been drawn from various positions or directions, and can easily check the shape of the drawing which has been drawn. In this game example, since the drawing has a three-dimensional shape, it is particularly advantageous to see the drawing from various positions and directions.

In this game example, if a predetermined condition (specifically, that an operation of specifying the icon 202 has been performed) for an operation on the terminal device 7 is satisfied (Yes in step S41 or Yes in step S42), the CPU 10 moves the object of the drawing based on the attitude of the terminal device 7 (step S47). If the predetermined condition is not satisfied (No in step S42), the CPU 10 does not move the object based on the attitude of the terminal device 7. Thus, the player can change the direction of the drawing through an intuitive and easy operation of changing the attitude of the terminal device 7. Moreover, since the player can change the direction of the drawing through the same operation as the operation of changing the attitude of the surface 201, it is possible to further improve the controllability.

In this game example, in order to move the drawing in the drawing moving process, the CPU 10 stores planar coordinates of specified positions of the drawing. That is, planar coordinates of specified positions are stored in the process of step S43, and in the process of step S47 of moving the drawing, space coordinates of the moved specified positions are calculated using the planar coordinates and the current attitude of the surface 201. In other embodiments, the CPU 10 may store space coordinates of specified positions of the drawing in the process of step S43. In the process of step S47, the CPU 10 may rotate the drawing in accordance with the change from the attitude of the surface 201 in the process loop of the previous iteration to the attitude of the surface 201 in the process loop of the current iteration. Specifically, the drawing may be moved (rotated) in the same direction as the direction in which the attitude of the surface 201 changes and by the same amount as the amount of change of the attitude of the surface 201. With the method for storing space coordinates, an error may occur between the change of the surface 201 and the change of the drawing in the process of step S47, and the error may accumulate as the process of step S47 is repeated. Therefore, it may not be possible to accurately rotate the drawing in accordance with the rotation of the surface 201. In contrast, in this game example, the planar coordinates are saved in step S43, and it is possible to calculate the moved specified positions using the saved planar coordinates and the current attitude of the surface 201. Then, errors do not accumulate, and the drawing can be accurately rotated in accordance with the rotation of the surface 201.

In the process of step S47 in this game example, the whole of the drawing placed in the virtual space is moved. In other embodiments, only a portion of the drawing may be moved. For example, the CPU 10 may save only paths specified by the player in step S43, and move only the paths in step S47. While paths may be specified by any method, a path displayed at the input position on the screen may be specified, for example.

Referring back to the main flow chart (steps S1 to S8), The process of step S4 is performed, following the game control process of step S3. In step S4, a television image is generated. Also in the second game example, the specific method for generating a television image is similar to the first game example. The process of step S5 is performed, following step S4.

In this game example, as the predetermined object is placed at the specified position (step S30), the image of the object is generated at a position on the television image corresponding to the specified position. Therefore, the player can easily check the position at which an input has been made on the input surface of the touch panel 52, and can easily check the drawing which has been drawn on the input surface. The player can draw a three-dimensional drawing in a virtual space by drawing a dot or line on the input surface. Moreover, in this game example, the object is generated so as to represent a path of specified positions determined by input positions (input positions) successively inputted on the input surface (step S30). Thus, an image representing the path is generated and displayed on the television 2. Therefore, the player can easily check a line drawn on the touch panel 52. Since different images are displayed when the player inputs dots on the input surface and when the player inputs lines thereon, the game device can display an image that more accurately reflect inputs on the input surface.

In this game example, the surface 201 is displayed so as to make it easier for the player to check the attitude of the surface 201 (the attitude of the terminal device 7). Moreover, the surface 201 is generated as a semi-transparent object so as to make it easier for the player to grasp the depth relationship between the surface 201 and the drawing. In other embodiments, the surface 201 does not need to be displayed (it may be handled as being transparent) or may be generated as an opaque object.

In step S5, the terminal image is generated based on the game control process. Also in the second game example, the specific method for generating the terminal image is similar to that of the first game example. In this game example, an image representing an area of the virtual space where the surface 201 is set is generated as the terminal image. Specifically, the terminal image is generated so that the input surface of the touch panel 52 and the surface 201 coincide with each other on the screen of the LCD 51. Thus, the image of the surface 201 is displayed on the terminal device 7 (see FIG. 21, etc.). As does the television image, the terminal image includes the image of the object placed in step S30. Therefore, the player can check the drawing which has been drawn on the input surface also by looking at the screen of the terminal device 7. In the terminal image, the surface 201 may not be displayed, or may be generated as a semi-transparent or opaque object. The process of step S6 is performed, following step S5.

In this game example, in the television image (and the terminal image), an object is placed at the specified position in the virtual space so as to generate an image representing the specified position. The image representing the specified position may be generated by any method. For example, in other embodiments, the game device 3 may calculate a position on the television image (and the terminal image) that corresponds to the specified position and place a predetermined image at that position, thereby generating the image representing the specified position.

With the processes of steps S4 and S5, the CPU 10 generates the television image using the television virtual camera whose line-of-sight direction is set independent of the attitude of the surface 201, and generates the terminal image using the terminal virtual camera which is set so that the positional relationship thereof with respect to the surface 201 is constant (more specifically, so that the line-of-sight direction thereof is generally perpendicular to the surface 201). Therefore, when the player changes the attitude of the terminal device 7, the line-of-sight direction does not change in the image displayed on the television 2, whereas the line-of-sight direction changes in accordance with the attitude in the image displayed on the terminal device 7 (FIGS. 20 to 23, etc.). Then, since the attitude of the surface 201 is displayed to be constant on the terminal device 7, the operation of specifying the position on the surface 201 is made easy. Since the attitude of the surface 201 is displayed to be changing on the television 2, it is possible to easily grasp the attitude of the surface 201 in the virtual space. That is, in this game example, since the player can easily perform an operation of specifying the position on the surface 201 using the terminal device 7 and can easily check the attitude of the surface 201 by looking at the screen of the television 2, it is possible to easily specify a position in a three-dimensional virtual space.

In the second game example, the processes of steps S6 to S8 are similar to those of the first game example. In the second game example, as in the first game example, the series of processes through steps S2 to S8 is repeatedly performed until it is determined in step S8 that the game should be ended.

As described above, with the game processes of the second game example, the position on the surface 201 in the virtual space is specified by an input on the touch panel 52 of the terminal device 7 (step S26), and the attitude of the surface 201 changes in accordance with the attitude of the terminal device 7 (step S22). Then, the player can specify a position in a three-dimensional virtual space by specifying the position using the touch panel 52 while changing the attitude of the surface 201. Thus, in this game example, it is possible to easily input a position in a three-dimensional space using an input device having a planar input surface, i.e., the touch panel 52. Thus, for example, the player can input dots and lines on the touch panel 52, and can also draw a three-dimensional picture in the virtual space by appropriately changing the attitude of the terminal device 7 as in the above embodiment.

(Variation of Second Game Example)

While the attitude of the surface 201 changes in accordance with the attitude of the terminal device 7 in the second game example described above, the surface 201 may be moved by any other method in other embodiments. A variation regarding the method for moving the surface 201 will now be described with reference to FIGS. 29 to 32.

Figure 29:
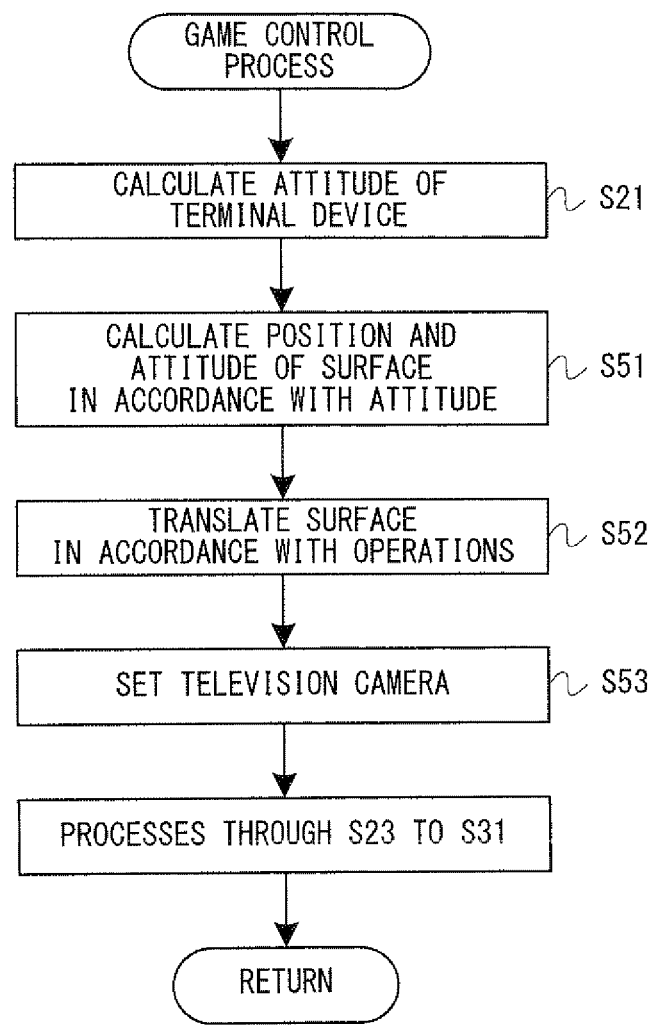
FIG. 29 is a flow chart showing the flow of an example non-limiting game control process according to a variation of the second game example.

FIG. 29 is a flow chart showing the flow of the game control process in the variation of the second game example. In FIG. 29, the same processes as those shown in FIG. 25 are denoted by the same step numbers and will not be further described below.

In this variation, the process of step S51 is performed, following step S21. In step S51, the CPU 10 calculates the position and the attitude of the surface 201 in accordance with the attitude of the terminal device 7. That is, the CPU 10 controls the attitude of the surface 201 so as to correspond to the attitude of the terminal device 7, and controls the position of the surface 201 in accordance with the attitude of the terminal device 7. The attitude of the surface 201 is controlled based on the attitude of the terminal device 7 as in the second game example. The position of the surface 201 is controlled in accordance with the attitude of the surface 201 so that the surface 201 moves in an arc about a position out side the surface 201.

Figure 30:
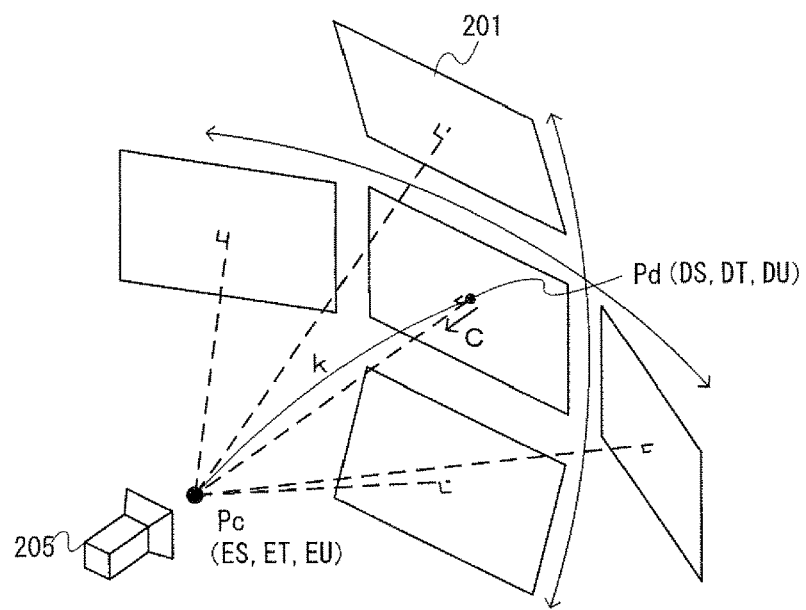
FIG. 30 is a diagram showing how the surface 201 is moved in this variation.

FIG. 30 is a diagram showing the movement of the surface 201 in this variation. In FIG. 30, the point Pc is the central point for the movement of the surface 201 in an arc and is fixedly set in the game space. In FIG. 30, the point Pc is set on the same side as the terminal virtual camera 205 with respect to the surface 201. When the attitude of the terminal device 7 changes, the position of the surface 201 changes as if to rotate about the reference point Pc while the attitude thereof also changes, as shown in FIG. 30. Specifically, the position of the surface 201 is calculated so that the length of the perpendicular extending from the reference point Pc to the surface 201 is equal to a predetermined value (that is, so that the distance from the reference point Pc is constant). Thus, in this variation, the position and the attitude of the surface 201 change so that the surface 201 moves along a spherical surface whose center is the point Pc (see FIG. 30). Therefore, the player can feel as if the player were drawing a picture on an inner surface of a sphere by making inputs on the touch panel 52 while changing the attitude of the terminal device 7.

As a specific process of step S51, the CPU 10 first calculates the attitude of the surface 201 by a method similar to step S22. Next, the CPU 10 calculates the position of the surface 201 so that the length of the perpendicular is equal to a predetermined value based on the calculated attitude and the position of the reference point Pc. For example, the position Pd (DS, DT, DU) of the surface 201 is calculated as shown in Expression (2) below, where (ES, ET, EU) are the coordinates of the reference point Pc and k is the distance from the reference point Pc to the surface 201.

$$DS = -k \times CS + ES$$

$$DT = -k \times CT + ET$$

$$DU = -k \times CU + EU \qquad (2)$$

In Expression (2) above, (CS, CT, CU) are the components of the unit vector C (see FIG. 30) which extends in the forward u-axis direction in the planar coordinate system.

Data representing the position and the attitude of the surface 201 calculated is stored in the main memory. The process of step S52 is performed, following step S51.

Figure 31:
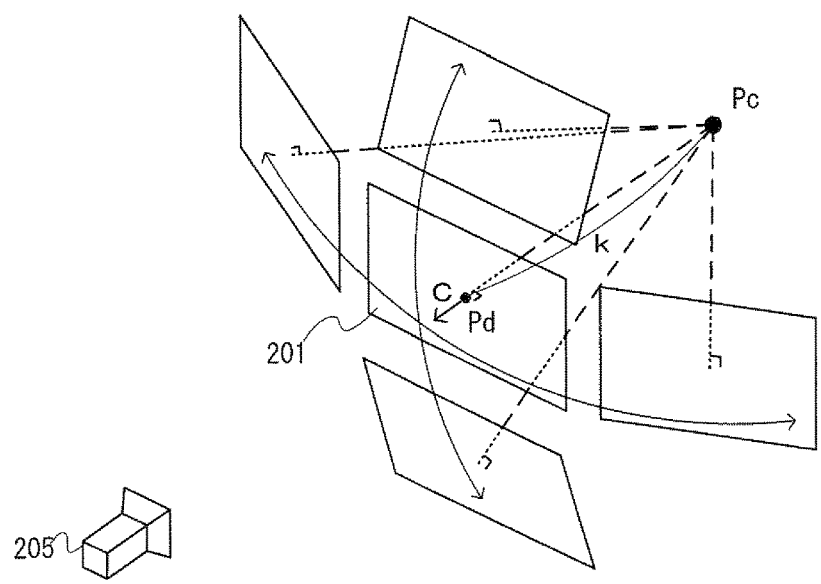
FIG. 31 is a diagram showing how the surface 201 is moved in another embodiment.
Figure 32:
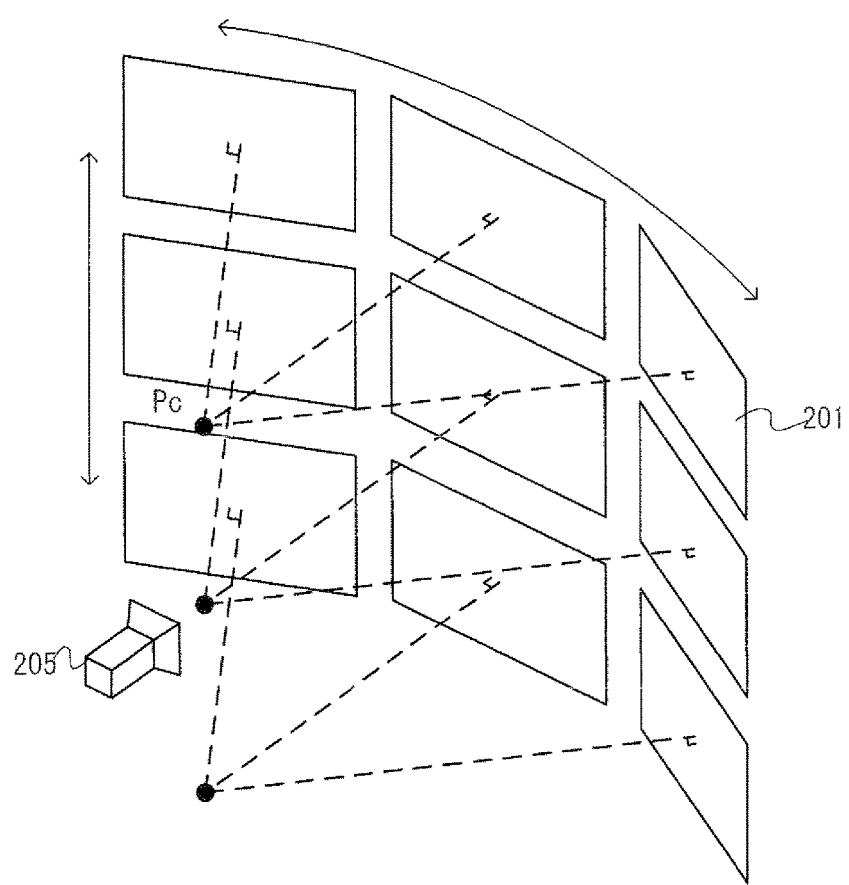
FIG. 32 is a diagram showing how the surface 201 is moved in another embodiment.

While the reference point Pc is set on the same side as the terminal virtual camera 205 with respect to the surface 201 in this variation, the position of the reference point may be any position. FIGS. 31 and 32 are diagrams showing how the surface 201 is moved in other embodiments. In another embodiment, the reference point Pc may be set on the opposite side of the terminal virtual camera 205 with respect to the surface 201 as shown in FIG. 31. Then, the player can feel as if the player were drawing a picture on the outer surface of a sphere by making inputs on the touch panel 52 while changing the attitude of the terminal device 7. In the case shown in FIG. 31, since the direction from the reference point Pc to the position Pd of the surface 201 and the direction of the vector C are equal to each other, the position Pd of the surface 201 can be calculated by changing "−k" to "k" in Expression (2) above. Where k=0, the surface 201 rotates about the position Pd (the reference point Pc) as in the second game example (see FIG. 27).

In another embodiment, the surface 201 may be moved in an arc about the reference point Pc for a predetermined rotation direction (the rotation direction about the up/down direction in FIG. 32) while the surface 201 is translated for another direction, as shown in FIG. 32. Then, the player can feel as if the player were drawing a picture on the inner surface of a cylinder. The translation of the surface 201 shown in FIG. 32 may be done in accordance with the change in the attitude of the terminal device 7 or may be done in accordance with a direction input operation in step S52 to be described below.

In step S52, the CPU 10 moves the surface 201 based on a direction input operation on the terminal device 7. While the direction input operation may be performed by any method, it may be for example an input operation on the analog stick 53 or the cross button 54A. Specifically, the surface 201 is controlled so as to move in an up, down, left, right, forward or backward direction of the surface 201 in accordance with an up, down, left, right, forward or backward direction input operation. That is, the CPU 10 determines the direction specified by the direction input operation based on the terminal operation data 101 obtained in step S2. Then, data representing the position and the attitude of the surface 201 is read out from the main memory, and the surface 201 is moved in a direction in accordance with the specified direction. The above data stored in the main memory is updated so as to represent the moved position of the surface 201. The process of step S53 is performed, following step S52.

With the process of step S52, the surface 201 can be freely translated through direction input operations on the terminal device 7. In other embodiments, the CPU 10 may move the surface 201 in an arc (rather than translate it) in step S52. For example, the CPU 10 may control the surface 201 so that the surface 201 moves along a spherical surface or a cylindrical surface as shown in FIGS. 30 to 32.

In step S53, the CPU 10 controls the television virtual camera based on the position and the attitude of the surface 201. The television virtual camera may be controlled in any way as long as the position and the attitude are controlled so that the surface 201 is included in the range of viewing field. For example, the position of the television virtual camera may be controlled at a predetermined distance from the surface 201 so that the line-of-sight direction thereof faces toward the surface 201. It may be controlled so that the attitude of the television virtual camera does not change, i.e.,
so that the television virtual camera is translated. Then, as in the second game example, the player can check, on the television image, the attitude of the surface 201 in the virtual space. As a specific process of step S53, the CPU 10 reads out data representing the position and the attitude of the surface 201 from the main memory, and calculates the position and the attitude of the television virtual camera in accordance with the position of the surface 201. The television camera data representing the position and the attitude which have been calculated is stored in the main memory. In the process of step S4, the television image is generated using the television camera data. The process of step S23 is performed, following step S53. In and after step S23, similar processes to those of the second game example are performed.

In other embodiments, the television virtual camera may be controlled in accordance with direction input operations on the terminal device 7. That is, the CPU 10 may translate, move in an arc, or rotate the television virtual camera in accordance with the direction input operation. Then, as in a case in which a drawing is rotated through the drawing moving process described above, the player can see the drawing from various directions and can easily check the shape of the drawing.

(Variation Regarding Game Process Using Specified Position)

The second game example is directed to an example of a drawing game in which a picture can be drawn in a three-dimensional virtual space, as a game using the specified position as an input. That is, the second game example is directed to a process of placing an object at a specified position (step S30) as an example of a game process using the specified position as an input. The game processes to be performed using the specified position as an input may be any processes, and may be game examples as follows, for example.

Figure 33:
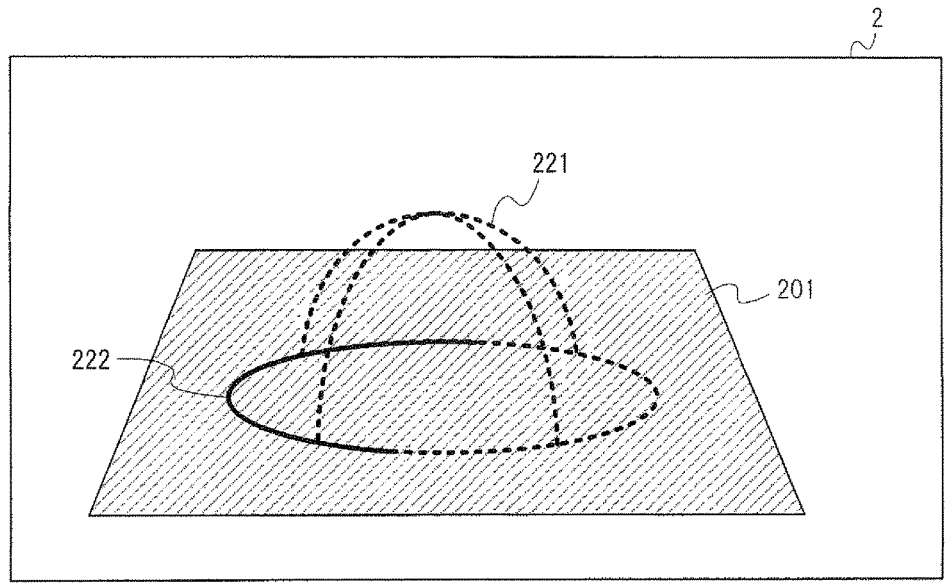
FIG. 33 is a diagram showing an example non-limiting game image to be displayed on the television 2 in a game in which a player draws a drawing so that it is the same as a sample.

FIG. 33 is a diagram showing a game image to be displayed on the television 2 in a game in which a player draws a drawing so that it is the same as a sample. As shown in FIG. 33, the surface 201 and a sample object 221 are displayed on the television 2. The sample object 221 is an object representing a sample of the drawing to be drawn by the player, and a plurality of different sample objects are provided in the game program. The image to be displayed on the terminal device 7 is similar to that of the second game example. In this game, the player draws lines (an object 222 representing a path of specified positions) in the virtual space so that it is the same as the sample object 221 using the terminal device 7 as in the second game example. Then, the CPU 10 may calculate the similarity between the sample object 221 and the object 222 generated based on player inputs, or perform game processes such as calculating the score based on the similarity. Thus, the game device 3 may perform a game process using, as an input, a path representing specified positions which have been inputted.

Figure 34:
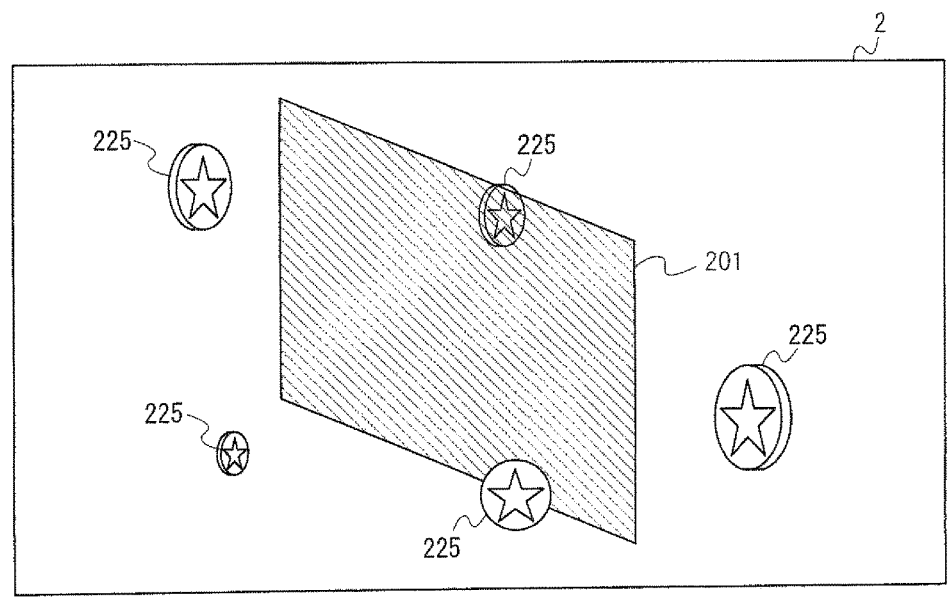
FIG. 34 is a diagram showing an example non-limiting game image to be displayed on the television 2 in a game in which an object (coin) 225 placed in a three-dimensional virtual space is specified through the operation on the terminal device.

FIG. 34 is a diagram showing a game image to be displayed on the television 2 in a game in which a player specifies, by operations performed on the terminal device, objects (coins) 225 placed in a three-dimensional virtual space. As shown in FIG. 34, the surface 201 and the coins 225 are displayed on the television 2. The image displayed on the terminal device 7 is similar to that in the second game example. In this game, the player specifies a position in the virtual space by a method similar to that of the second game example. Then, it is possible to obtain a coin 225 by specifying the position of the coin 225. For example, the player plays a game by competing for the accuracy in specifying the coin 225 or for the number of coins 225 obtained within a time limit. In this case, as a game process performed using the specified position as an input, the CPU 10 determines whether the specified position is a position of a coin 225, and performs the process of incrementing the number of coins 225 obtained if the specified position is the position of a coin 225. Thus, the game process is not limited to a process of displaying an image at a specified position as in the second game example, but may be a process of specifying (selecting) an object in the virtual space.

Figure 35:
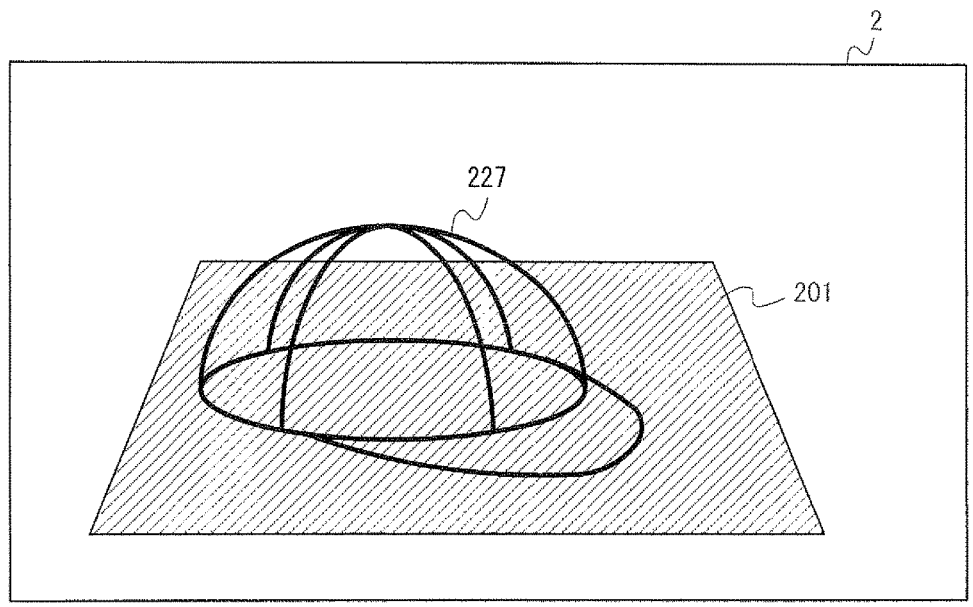
FIG. 35 is a diagram showing an example non-limiting game image to be displayed on the television 2 in a game in which an object is generated based on a drawing drawn by a player.
Figure 36:
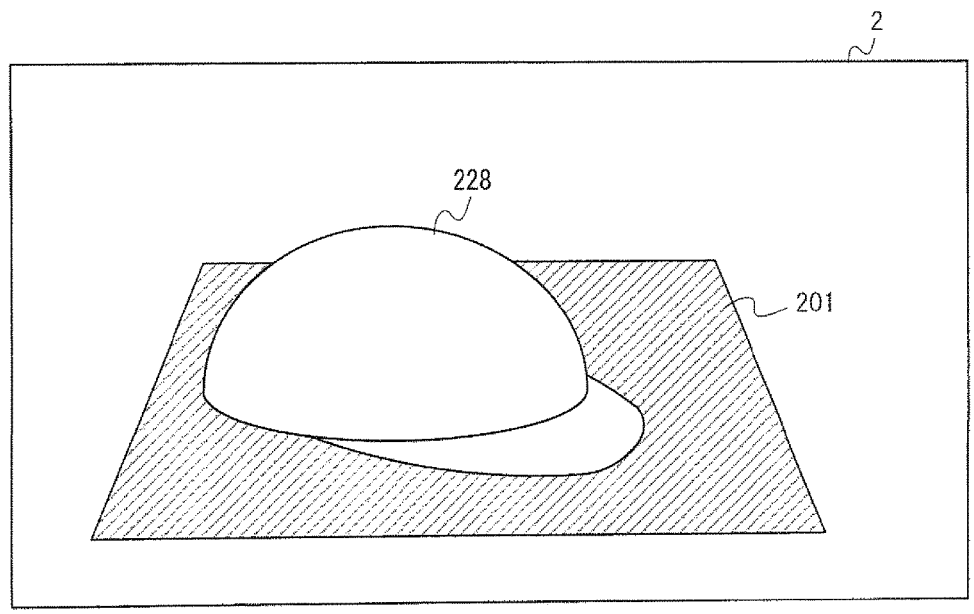
FIG. 36 is a diagram showing an example non-limiting game image to be displayed on the television 2 in a game in which an object is generated based on a drawing drawn by a player.

FIGS. 35 and 36 are diagrams showing game images to be displayed on the television 2 in a game in which an object is generated based on a drawing drawn by the player. In this game, the player first generates a drawing in the virtual space by operations similar to those of the second game example. In FIG. 35, an object 227 representing the drawing based on player inputs is generated and displayed. As a game process to be performed using a specified position as an input, the CPU 10 generates a three-dimensional object based on specified positions of the drawing. For example, the CPU 10 generates a three-dimensional object by setting a surface based on paths of the specified positions. For example, when a closed curve is formed by the path, a surface whose perimeter is the closed curve may be set. FIG. 36 shows a game image in a case in which a three-dimensional object 228 is generated based on the object 227 shown in FIG. 35. Thus, the game system 1 may be a system for performing a game process of generating a three-dimensional object based on specified positions. The generated object may be used in a game. For example, the player character may be allowed to use the generated object as an item, or the generated object may be used as a player character.

In addition to those described above, the game process to be performed using a specified position as an input may be any other process. For example, in other embodiments, the CPU 10 may perform a game process of moving the player character in accordance with paths of specified positions. That is, the game to be performed by the game device 3 may be a game in which when a player inputs a path of specified positions, a player character in the virtual space moves along the path.

[8. Third Game Example]

A third game example to be performed by the game system 1 of the present embodiment will be described with reference to FIGS. 37 to 42. The third game example is directed to a game process for a game in which the player operates a hand-held device 9 to move an object in a virtual game space.

It is assumed in the third game example that the game system 1 is the hand-held device 9 which is a portable game device, instead of the terminal device 7. The hand-held device 9 is a device that can be held by the player as is the terminal device 7, and includes the touch panel 52 similar to that of the terminal device 7. That is, the controller device used by the player is not limited to the terminal device 7, and may be any device as long as it is a portable device that can be held by the player and is a controller device with which an input can be made on the input surface.

In the two different games to be shown below, the controller device 7 is not used in the game operation, and the first operation data from the controller device 7 is not used in the game process. In the game example to be illustrated below, the controller 5 is not used for game operations, and the controller operation data from the controller 5 is not used in game processes. That is, the game system 1 may be configured without the controller 5. In other embodiments, the game process may be such that the hand-held device 9 and the controller 5 are both used in the game operation.

First, the game of the third game example will be outlined. The game is a game in which an object (a shuriken, or a throwing star) is shot in the game space by operating the hand-held device 9. The player can specify the direction (and the velocity) in which a shuriken is launched through an operation of changing the attitude of the hand-held device 9 and drawing a line on the touch panel 52. In the present example, the operation of drawing a line refers to an operation of moving the touch position on a surface through the operation of touching the touch panel or the touch pad with a finger or a touch pen and drawing a line while touching, and a line does not need to be drawn actually.

Figure 37:
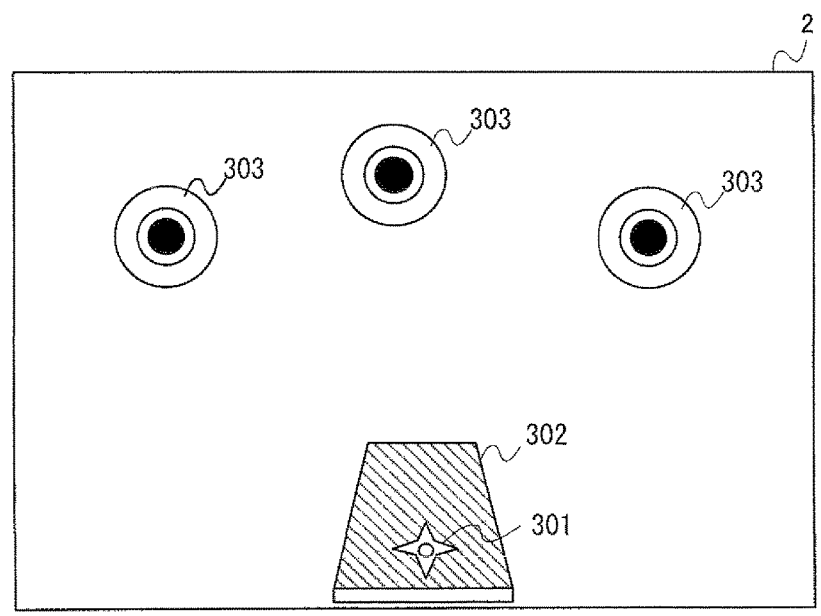
FIG. 37 is a diagram showing the example non-limiting screen of the television 2 and a hand-held device 9 in a third game example.
Figure 37:
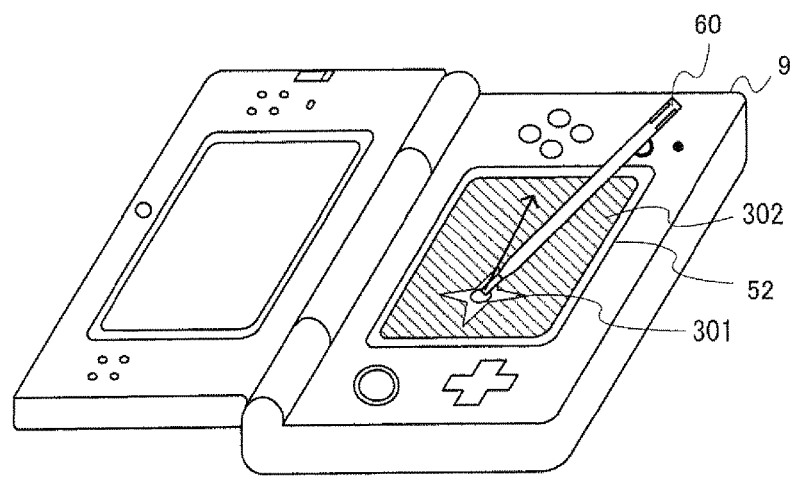

FIG. 37 is a diagram showing the screen of the television 2 and the hand-held device 9 in the third game example. In FIG. 37, an image of the game space is displayed as the game image on the television 2 and the lower LCD (the LCD including the touch panel 52 provided thereon) of the hand-held device 9. A shuriken 301, a control surface 302 and a target 303 are displayed on the television 2. The control surface 302 (and the shuriken 301) are displayed on the lower LCD. In the third game example, the player plays the game by shooting a shuriken 301 at a target 303 through an operation using the hand-held device 9.

When shooting the shuriken 301, the player first changes the attitude of the control surface 302 to an intended attitude by changing or varying the attitude of the terminal device 7. Then, the player performs an operation of drawing a line on the touch panel 52 as shown in FIG. 37. Through this operation, the direction on the control surface 302 is determined, and the shuriken 301 is launched in this direction. In the third game example, the player can shoot the shuriken 301 in an intended direction through these operations. Although FIG. 37 shows an example in which the hand-held device 9 is used in a portrait position, the hand-held device 9 may be used in a landscape position and it may be used in any attitude.

Figure 38:
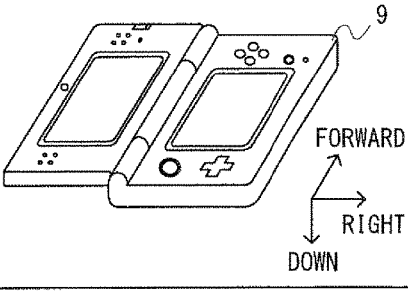
FIG. 38 is a diagram showing the example non-limiting relationship between the attitude of the hand-held device 9 and the attitude of a control surface 302.
Figure 38:
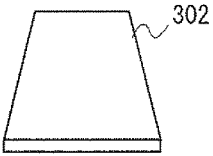
Figure 38:
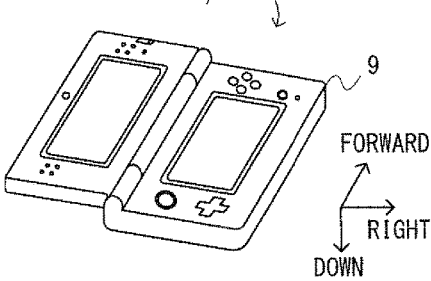
Figure 38:
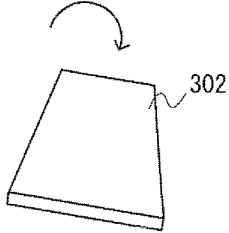
Figure 38:
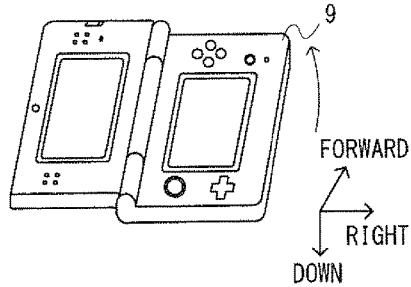
Figure 38:
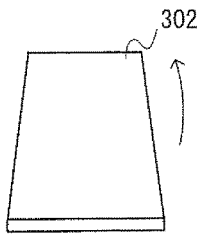

In the present embodiment, the attitude of the control surface 302 is determined in accordance with the attitude of the hand-held device 9. FIG. 38 is a diagram showing the relationship between the attitude of the hand-held device 9 and the attitude of the control surface 302. As shown in the upper row of the table of FIG. 38, when the input surface of the touch panel 52 of the hand-held device 9 is horizontal, the control surface 302 is placed horizontal in the game space. As shown in the middle row of the table of FIG. 38, when the hand-held device 9 is rotated about an axis in the forward/backward direction (specifically, tilted so that the right side thereof lowers), the control surface 302 is rotated about an axis in the forward/backward direction (specifically, tilted so that the right side thereof lowers). Moreover, as shown in the lower row of the table of FIG. 38, when the hand-held device 9 is rotated about an axis in the left/right direction (specifically, tilted so that the rear side lowers), the control surface 302 is rotated in the left/right direction (specifically, tilted so that the rear side lowers). Although not shown in the figure, when the hand-held device 9 is rotated about an axis in the up/down direction, the control surface 302 is also rotated about an axis in the up/down direction. Thus, the attitude of the control surface 302 is controlled so as to correspond to the attitude of the hand-held device 9. In the present embodiment, the position of the control surface 302 is fixed to a predetermined position in the game space.

The launch direction of the shuriken 301 is determined by determining the direction on the control surface 302 whose attitude is determined as described above. That is, a direction in the three-dimensional game space is determined by determining a direction on the control surface 302 of which the attitude in the three-dimensional game space has been set. The direction on the control surface 302 is calculated based on a line (input trace) input on the touch panel 52 of the hand-held device 9.

Figure 39:
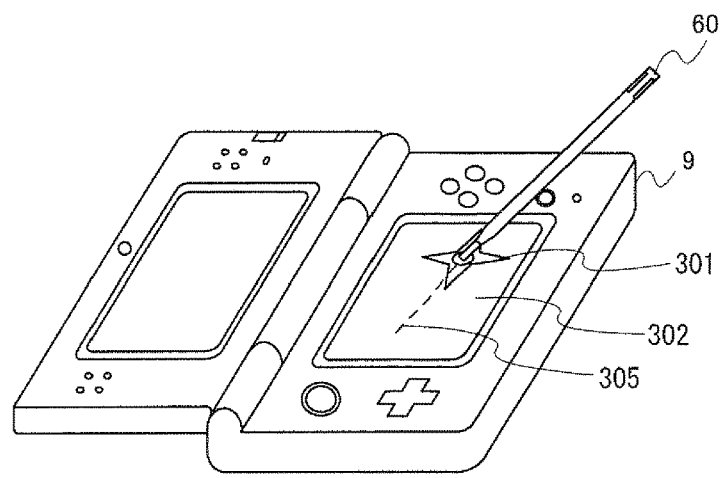
FIG. 39 is a diagram showing an example non-limiting line being drawn on the touch panel 52 of the hand-held device 9.
Figure 40:
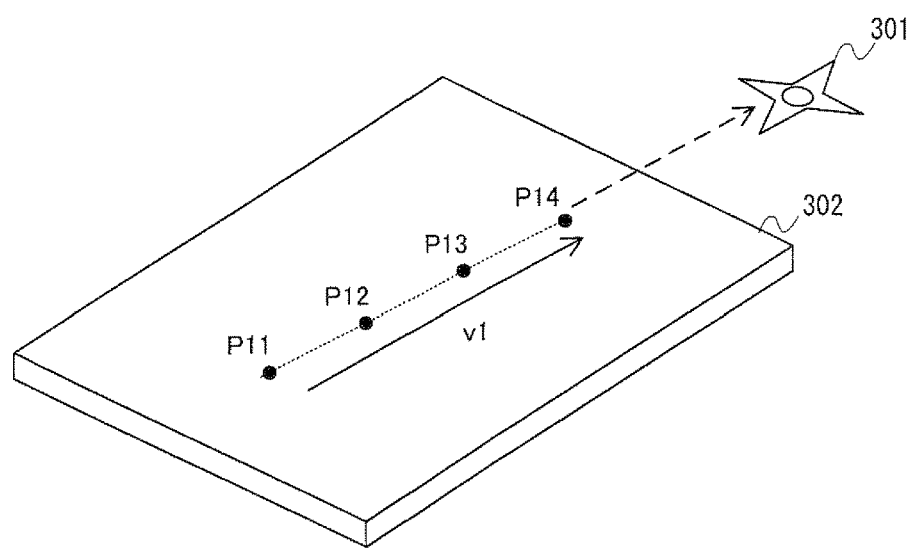
FIG. 40 a diagram showing an example non-limiting control position and a control direction to be calculated on a control surface 302 when the line shown in FIG. 39 is drawn on the touch panel 52.

FIG. 39 is a diagram showing a line being drawn on the touch panel 52 of the hand-held device 9. FIG. 40 is a diagram showing the control position and the control direction calculated on the control surface 302 in a case in which a line shown in FIG. 39 is drawn on the touch panel 52. As shown in FIG. 39, the control surface 302 is displayed on the lower LCD of the hand-held device 9. Herein, the control surface 302 is displayed so that the input surface of the touch panel 52 and the control surface 302 coincide with each other on the screen (i.e., so that the screen is filled up by the control surface 302).

When launching the shuriken 301, the player performs an operation of drawing a line on the touch panel 52 as shown in FIG. 39. In the present embodiment, while an input is being made on the touch panel 52, the shuriken 301 is displayed at the input position. Although FIG. 39 shows the line drawn by the player in a dotted line, this line does not actually need to be displayed.

When a line is drawn by the player, i.e., when there is an input on the touch panel 52, the game device 3 calculates a position on the control surface 302 corresponding to the input position (the "specified position": referred to as the "control position" in the third game example). The control position is calculated as a position (on the control surface 302) corresponding to the input position on the screen of the lower LCD. In FIG. 40, the dotted line represents a line (on the control surface 302) corresponding to the line drawn on the input surface. The control position is calculated to be a position on this line such as the points 211 to 214 shown in FIG. 40, for example. The game device 3 repeatedly calculates the control position while an input is being made on the touch panel 52 (while a line is being drawn).

When the input of drawing a line on the touch panel 52 is ended, the game device 3 identifies the control direction (the vector v1 shown in FIG. 40) based on the control positions. The control direction is identified to be a direction that is represented by the control positions corresponding to the drawn line. That is, the control direction is calculated so as to be generally aligned with the line. In the present embodiment, the control direction is calculated as a vector which represents an average velocity of the control positions, the details of which will be described later. Since the control surface 302 is placed in the three-dimensional game space, the control direction is also calculated as a three-dimensional direction in the three-dimensional game space. Thus, the launch direction of the shuriken 301 in the game space is determined.

Once the control direction is calculated, the shuriken 301 is launched. The movement of the shuriken 301 in the game space is displayed on the television 2. In the present embodiment, the attitude of the shuriken 301 is determined to be an attitude in accordance with the control surface 302. Therefore, the shuriken 301 is launched (moved) in the control direction in an attitude in accordance with the attitude of the control surface 302. The behavior of the shuriken 301 after it is launched may be determined arbitrarily. For example, the shuriken 301 may be controlled to move straight in the control direction, or a gravitational influence may be virtually added so that it drops over time. The trajectory may be curved by the spin. It may be controlled with a movement direction determined in accordance with the attitude of the shuriken 301 (e.g., so that it curves to the right when the shuriken 301 is tilted to the right and to the left when it is tilted to the left).

As described above, in the present embodiment, the player can specify the attitude of the control surface 302 using the attitude of the hand-held device 9, and specify a direction on the control surface 302 using a line input on the touch panel 52. Then, the shuriken 301 is controlled so as to move in the specified direction (control direction) on the control surface 302. Therefore, according to the present embodiment, the player uses one hand to actually adjust the attitude of the hand-held device 9 and the other to input a direction by a line on the touch panel 52, and it is therefore possible to easily specify a direction through an intuitive operation as if the player were actually inputting a direction in the space. Particularly, in the present example, it is possible to operate as if the player were actually shooting a shuriken with a hand toward the screen. Since the operation of the attitude of the hand-held device 9 and the input operation on the touch panel 52 can be done simultaneously in parallel, the player can quickly perform an operation of specifying a direction in a three-dimensional space.

(Game Processes in Third Game Example)

Figure 41:
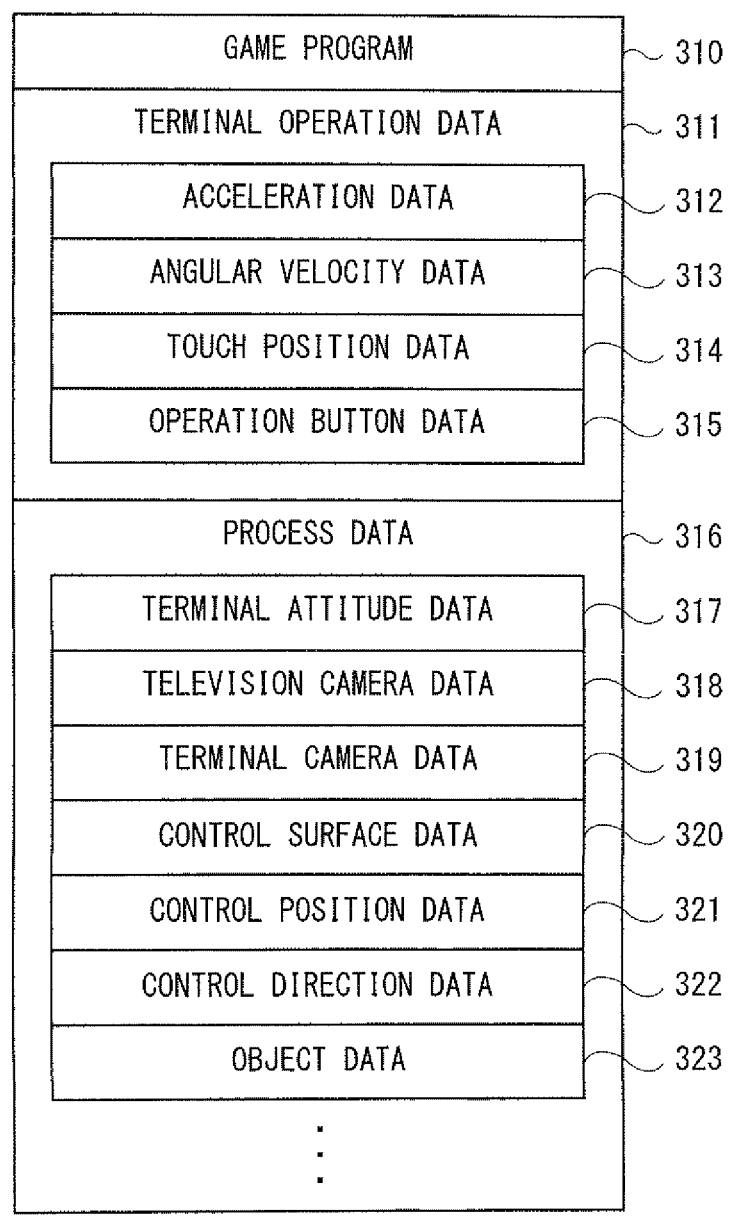
FIG. 41 is a diagram showing various example non-limiting data used in game processes.

Next, the details of the game processes of the third game example will be described. First, various example data used in the game processes will be described. FIG. 41 is a diagram showing various data used in the game processes. FIG. 41 is a diagram showing primary data to be stored in the main memory (the external main memory 12 or the internal main memory 11*e*) of the game device 3. As shown in FIG. 41, the main memory of the game device 3 stores a game program 310, terminal operation data 311, and process data 316. In addition to those shown in FIG. 41, the main memory also stores other data necessary for the game, such as image data of various objects appearing in the game, and sound data used in the game, etc.

The game program 310 is a program for causing the computer (the CPU 10) of the game device 3 to perform game processes of the third game example. At an appropriate point in time after the power of the game device 3 is turned ON, a part or whole of the game program 310 is loaded from the optical disc 4 and stored in the main memory. The game program 310 may be obtained from an external device of the game device 3 (e.g., via the Internet), instead of from the optical disc 4. A part of the game program 310 (e.g., a program for calculating the attitude of the controller 5 and/or the hand-held device 9) may be pre-stored in the game device 3.

The terminal operation data 311 is data representing a user operation on the hand-held device 9. The terminal operation data 311 is transmitted from the hand-held device 9 and received by the game device 3. The terminal operation data 311 includes acceleration data 312, angular velocity data 313, input position data 314, and operation button data 315. The main memory may store a predetermined number of latest (most recently obtained) sets of terminal operation data.

The acceleration data 312 is data representing the acceleration (acceleration vector) detected by an acceleration sensor of the hand-held device 9. While the acceleration data 312 herein represents three-dimensional acceleration of which each component is the acceleration for one of predetermined three axes, it may represent acceleration for any one or more directions in other embodiments.

The angular velocity data 313 is data representing the angular velocity detected by the gyrosensor of the hand-held device 9. While the angular velocity data 313 herein represents angular velocity about each of predetermined three axes, it may represent angular velocity about any one or more axes in other embodiments.

The input position data 314 is data representing the position (input position) on the input surface of the touch panel 52 at which an input is made. The input position data 314 herein represents coordinate values in a two-dimensional coordinate system for representing an input position. When no input is being made on the touch panel 52, the input position data 314 indicates that there is no input.

The operation button data 315 is data representing input status of operation buttons provided on the hand-held device 9.

The terminal operation data 311 may be any data that includes data representing the player input position on the input surface (the input position data 314 in the present embodiment) and data whose value changes in accordance with the movement of the hand-held device 9 (the acceleration data 312 and the angular velocity data 313 in the present embodiment). Therefore, the terminal operation data 311 may be data that does not include the operation button data 315, or data that includes only one of the acceleration data 312 and the angular velocity data 313. That is, the hand-held device 9 may not include the operation buttons, or may include only one of the acceleration sensor and the gyrosensor. If the hand-held device 9 includes the image capturing/processing section 35 instead of the acceleration sensor and the gyrosensor, the terminal operation data 311 may include marker coordinate data instead of the acceleration data 312 and the angular velocity data 313.

The process data 316 is data used in the game processes (FIG. 42) to be described later. The process data 316 includes terminal attitude data 317, television camera data 318, terminal camera data 319, control surface data 320, control position data 321, control direction data 322, and object data 323. In addition to those shown in FIG. 41, the process data 316 also includes various data used in the game processes, such as data representing parameters set for various objects.

The terminal attitude data 317 is data representing the attitude of the hand-held device 9. In the present embodiment, the terminal attitude data 317 is calculated based on the acceleration data 312 and the angular velocity data 313 included in the terminal operation data 311. The method for calculating the terminal attitude data 317 will be described later.

The television camera data 318 is data representing the placement of the television virtual camera for generating the television image displayed on the television 2. Specifically, the television camera data 318 represents the position and the attitude of the television virtual camera in the virtual game space. The television camera data 318 may include, for example, data representing the angle of view (range of viewing field) of the television virtual camera.

The terminal camera data 319 is data representing the placement of the terminal virtual camera for generating the terminal image displayed on the lower LCD of the hand-held device 9. Specifically, the terminal camera data 319 represents the position and the attitude of the terminal virtual camera in the game space. The terminal camera data 319 may include, for example, data representing the angle of view (range of viewing field) of the terminal virtual camera. In the present embodiment, the terminal virtual camera is placed in accordance with the position and the attitude of the control surface 302 so that the control surface 302 is displayed on the lower LCD.

The control surface data 320 is data representing the position and the attitude of the control surface 302 in the game space. Specifically, the control surface data 320 represents a formula of a plane that represents the control surface 302. In the present embodiment, the position of the control surface 302 is fixed to a predetermined position, and the attitude of the control surface 302 is calculated based on the attitude of the hand-held device 9.

The control position data 321 is data representing a specified position (control position) on the control surface 302 corresponding to the input position. In the third game example, the specified position is used for calculating the control direction to be described below, and therefore the specified position is referred to as the "control position". The control position data 321 represents three-dimensional coordinate values which represent a position in the game space. In other embodiments, the control position data 321 may represent coordinate values in a two-dimensional coordinate system which represent a position on the control surface. In the present embodiment, when inputs are made successively an the touch panel 52 (i.e., when input positions are detected successively), data representing a plurality of control positions corresponding to a predetermined number of latest input positions is stored as the control position data 321. When the input on the touch panel 52 is ended, the contents of the control position data 321 are reset.

The control direction data 322 is data representing the control direction for determining the launch direction (movement direction) of the shuriken 301. Specifically, the control direction data 322 represents a three-dimensional vector indicating a direction in a three-dimensional game space. The vector representing this control direction will be hereinafter referred to as the "control direction vector". The control direction data 322 is calculated based on the control position data 321.

The object data 323 is data representing the status of an object (the shuriken 301 in the present embodiment) moved based on the control direction. Specifically, the object data 323 represents the position and the attitude of the shuriken 301 in the game space. The game device 3 places the shuriken 301 in the game space based on the object data 323, and generates and displays an image of the game space with the shuriken 301 placed therein.

Next, the details of the game processes performed by the game device 3 will be described with reference to FIG. 42. In the third game example, the main flow chart showing the general process flow in the game processes is similar to FIG. 18, and will not be further described below. The game processes in the third game example will now be described focusing on differences from the first game example.

Also in the third game example, as in the first game example, first, in step S1, the CPU 10 performs an initialization process. The initialization process is a process of constructing a virtual game space, placing objects appearing in the virtual space at their initial positions, and setting initial values of various parameters used in the game processes. In this game example, the position and the attitude of the television virtual camera are set in the initialization process. The position and the attitude of the television virtual camera are set so that the control surface 302 is included in the image-capturing range (range of the view volume of the virtual camera). Data representing the position and the attitude which have been set is stored in the main memory as the television camera data 318. Since the attitude of the control surface 302 is variable but the position thereof is fixed, it is possible to set television virtual camera in the initialization process so that the control surface 302 is included in the image-capturing range. The process of step S2 is performed, following step S1.

In step S2, the CPU 10 obtains the terminal operation data from the hand-held device 9. Since the hand-held device 9 repeatedly transmits various data, which are outputted from the acceleration sensor, the gyrosensor, the touch panel 52 and the operation buttons, to the game device 3 as the terminal operation data, the game device 3 successively receives the data from the hand-held device 9 and stores them as the terminal operation data 311 in the main memory. In step S2, the CPU 10 may obtain the controller operation data from the controller 5 in addition to the terminal operation data. In step S2, the CPU 10 reads out the latest terminal operation data 311 from the main memory. The process of step S3 is performed, following step S2.

In step S3, the CPU 10 performs the game control process. The game control process is a process for allowing the game to progress by, for example, performing processes such as controlling the action of an object the shuriken 301, etc.) in the game space in accordance with operations by the player. The details of the game control process will now be described with reference to FIG. 42. The game control process will be described below, focusing on the process relating to the calculation of the control direction, and processes that can be performed in a manner similar to the conventional processes will not be described in detail. For example, the detailed description will be omitted for the process relating to the movement control of the shuriken 301 after the shuriken 301 is launched in accordance with the control direction, the process for determining whether the shuriken 301 has hit the target 303, the process of calculating the score when the shuriken 301 has hit the target 303, etc., because these operations can be performed in a manner similar to the conventional processes.

Figure 42:
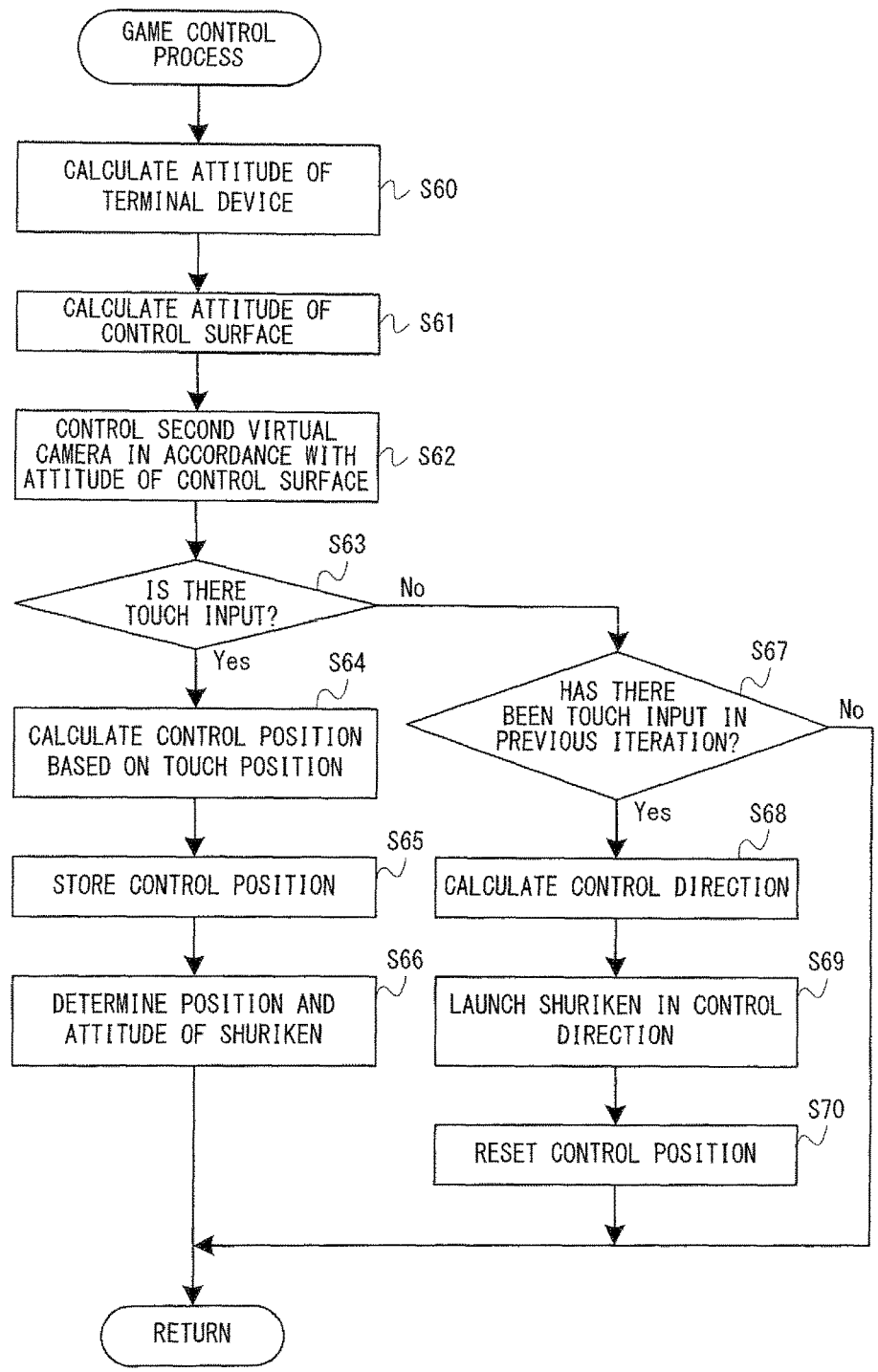
FIG. 42 is a flowchart showing a detailed flow of example non-limiting game control processes.

FIG. 42 is a flow chart showing a detailed flow of game control processes. In the game control process, first, in step S60, the CPU 10 calculates the attitude of the hand-held device 9. While the attitude of the hand-held device 9 may be calculated by any method as long as it is calculated based on the terminal operation data 311, the attitude is calculated by the following method in this game example. The method for calculating the attitude of the hand-held device 9 will be described below.

First, the CPU 10 calculates the attitude of the hand-held device 9 based on the angular velocity data 313 stored in the main memory. While the method for calculating the attitude of the hand-held device 9 from the angular velocity may be any method, the attitude can be calculated by a method similar to that with the terminal device 7 of the first game example. The process of step S61 is performed, following step S60.

In step S61, the CPU 10 calculates the attitude of the control surface 302 based on the attitude of the hand-held device 9. In this game example, the attitude of the control surface 302 in the game space is set so as to correspond to the attitude of the hand-held device 9 in the real space. Specifically, when the hand-held device 9 is in a reference attitude, the attitude of the control surface 302 is calculated to be a predetermined reference attitude. In this game example, the reference attitude of the hand-held device 9 is such an attitude that the input surface of the touch panel 52 is horizontal, and the predetermined reference attitude of the control surface 302 is such an attitude that it is horizontal in the game space (see the upper row of FIG. 38). When the hand-held device 9 is in an attitude other than the reference attitude, the attitude of the control surface 302 is calculated to be an attitude obtained by rotating it from the predetermined reference attitude in a direction in which the hand-held device 9 is rotated from the reference attitude by an amount by which the hand-held device 9 is rotated from the reference attitude (see the middle row and the lower row of FIG. 38). As described above, in this game example, the attitude of the control surface 302 is calculated so that the attitude of the control surface 302 in the virtual space coincides with the attitude of the hand-held device 9 in the real space. In other embodiments, the attitude of the hand-held device 9 and the attitude of the control surface 302 do not need to coincide with each other, and the attitude of the control surface 302 may be calculated so as to change in accordance with the attitude of the hand-held device 9.

As a specific process of step S61, the CPU 10 reads out the terminal attitude data 317 from the main memory, and calculates the attitude of the control surface 302 based on the terminal attitude data 317. The position of the control surface 302 is set to a predetermined position. Then, data representing the calculated attitude and the set position is stored in the main memory as the control surface data 320. The process of step S62 is performed, following step S61.

In step S61, the CPU 10 fixes the position of the control surface 302, and changes the attitude of the control surface 302 in accordance with the attitude of the hand-held device 9. In other embodiments, the attitude and the position of the control surface 302 may be changed in accordance with the attitude of the hand-held device 9. For example, when rotating the control surface 302 to the left, the CPU 10 may move the position of the control surface 302 to the left while rotating the control surface 302 to the left.

In step S62, the CPU 10 controls the terminal virtual camera in accordance with the attitude of the control surface 302. As described above, the control surface 302 is displayed on the lower LCD of the hand-held device 9, and specifically, the control surface 302 is displayed so that the input surface of the touch panel 52 and the control surface 302 coincide with each other on the screen. Therefore, the position and the attitude of the terminal virtual camera are controlled in accordance with the attitude of the control surface 302 so that the control surface 302 is included in the range of viewing field (specifically, so that the periphery of the control surface 302 and the perimeter of the range of viewing field of the terminal virtual camera coincide with each other). The terminal virtual camera is controlled so that the line-of-sight direction thereof is orthogonal to the control surface 302.

By the process of step S62, the terminal virtual camera is moved in accordance with the change of the control surface 302 so that the positional relationship between the control surface 302 and the terminal virtual camera is kept constant. Thus, since the correspondence between the input position and the control position does not change irrespective of the attitude of the control surface 302, it is possible to improve the controllability of the touch operation on the touch panel 52.

As a specific process of step S62, the CPU 10 reads out the control surface data 320 from the main memory, and calculates the position and the attitude of the terminal virtual camera based on the attitude of the control surface 302. Then, data representing the position and the attitude which have been calculated is stored in the main memory as the terminal camera data 319. The process of step S63 is performed, following step S62.

In step S63, the CPU 10 determines whether there has been an input on the touch panel 52 (a touch input). Specifically, the CPU 10 reads out and references the latest input position data 314 stored in the main memory, and determines whether the input position data 314 represents the coordinate values of the input position or it indicates that there has been no input. If the determination result of step S63 is affirmative, the process of step S64 is performed. If the determination result of step S63 is negative, the process of step S67 to be described below is performed.

In step S64, the CPU 10 calculates the control position on the control surface 302 based on the input position. The control position is calculated as a position on the control surface 302 corresponding to the input position. Specifically, the control position is calculated so that the positional relationship of the input position with respect to the four sides of the input surface of the touch panel 52 is the same as the positional relationship of the control position with respect to the four sides of the control surface 302.

As a specific process of step S64, the CPU 10 first reads out the latest input position data 314 stored in the main memory, and converts the input position represented by the input position data 314 into coordinates of a two-dimensional coordinate system representing a position on the control surface 302. Then, the CPU 10 converts the two-dimensional coordinates obtained through the conversion into three-dimensional coordinates representing a position in the three-dimensional game space. The three-dimensional coordinates can be calculated by using the coordinates of the two-dimensional coordinate system and a formula of a plane representing the control surface 302 (the control surface data 320). That is, the CPU 10 reads out the control surface data 320 from the main memory, and calculates the three-dimensional coordinates based on the two-dimensional coordinates and the control surface data 320. The three-dimensional coordinates thus calculated represent the control position. The process of step S65 is performed, following step S64 described above.

In step S64, the control position may be calculated so that the input position is the control position on the screen of the lower LCD. Then, the player can more easily grasp the control position in the virtual game space, and can more easily specify a control direction. In this game example, the shape (aspect ratio) of the input surface of the touch panel 52 and the shape (aspect ratio) of the control surface 302 are made equal to each other, and the input surface of the touch panel 52 and the control surface 302 are made to coincide with each other on the screen of the lower LCD. Then, by calculating the control position as described above, the input position and the control position can be made to correspond to each other on the screen of the lower LCD. In other embodiments, the method for calculating the control position from the input position may be any method, and it may be such a method that the input position and the control position do not correspond to each other on the screen.

In step S65, the CPU 10 stores data representing the control position calculated in step S64 in the main memory. When inputs are made successively on the touch panel 52, the CPU 10 stores a plurality of control positions corresponding to a predetermined number of latest input positions. Therefore, the CPU 10 reads out the control position data 321 from the main memory, and if the control position represented by the control position data 321 is smaller than the predetermined number, the CPU 10 generates data obtained by adding a new control position (the control position calculated in step S64) to the control position represented by the control position data 321. If the control position represented by the read-out control position data 321 is greater than or equal to the predetermined number, the CPU 10 generates data obtained by removing the oldest control position from the control positions represented by the control position data 321 and adding a new control position (the control position calculated in step S64). The data generated as described above is stored in the main memory as the new control position data 321. Therefore, the control position data 321 represents control positions corresponding to the input positions which have been input within a predetermined amount of time from the present. The process of step S66 is performed, following step S65.

In step S66, the CPU 10 calculates the position and the attitude of the shuriken 301 in the game space. In the period from when the input is made on the touch panel 52 until the shuriken 301 is launched, the shuriken 301 is placed at the control position in an attitude in accordance with the control surface 302. That is, the CPU 10 reads out the control surface data 320 and the control position data 321 from the main memory, and calculates the position and the attitude of the shuriken 301. Data representing the position and the attitude which have been calculated is stored in the main memory as the object data 323. While the shuriken 301 is placed/displayed on the control surface 302 during a period in which an input is being made on the touch panel 52 in the third game example, the shuriken 301 may not be placed/displayed during the period in other embodiments. In other embodiments, the CPU 10 may only control the position of the shuriken 301 in accordance with the control position while the attitude of the shuriken 301 is not controlled (the attitude may be fixed). The CPU 10 ends the game control process after step S66.

If the determination result of step S66 is negative, the process of step S67 is performed. In step S67, the CPU 10 determines whether there has been a touch input in the previous iteration of the process loop (the process loop including a series of processes of steps S2 to S8). The determination of step S67 can be made based on whether the control position data 321 is stored in the main memory, for example. The determination may be made as to whether touch inputs have been made successively a predetermined number of previous iterations, instead of making the determination as to only the previous touch input. If the determination result of step S67 is affirmative, the process of step S68 is performed. If the determination result of step S67 is negative, the CPU 10 skips the processes of steps S68 to S70 and ends the game control process.

In step S68, the CPU 10 calculates the control direction. In this game example, the control direction (control direction vector) is calculated as a vector representing the average velocity of control positions. That is, the CPU 10 reads out the control position data 321 from the main memory, and calculates a vector representing the average velocity from a plurality of control positions represented by the control position data 321. Specifically, a vector representing the average velocity can be calculated by dividing, by the number of control positions, a vector whose start point is the oldest one of the plurality of control positions and whose end point is the latest one of the plurality of control positions. Data representing the calculated vector is stored in the main memory as the control direction data 322. The process of step S69 is performed, following step S68.

Step S68 employs a method for calculating the control direction as the average velocity of the plurality of control positions represented by the control position data 321. With this method, if the player stops moving the input position in the middle of drawing a line on the touch panel, the average velocity to be calculated may be very small. Therefore, in other embodiments, the CPU 10 may calculate the average velocity while discarding control positions that correspond to input positions for which no movement is assumed to have been made. Specifically, in step S65, if there is no (or little) movement from the previously-calculated control position to the new control position calculated in step S64, the CPU 10 may not store the new control position. That is, the CPU 10 may not update the control position data 321 if the distance between the new control position and the previously-calculated control position is within a predetermined value.

In step S69, the CPU 10 launches the shuriken 301 in the control direction. In this game example, the movement direction and the movement velocity of the shuriken 301 are determined based on the control direction vector. That is, the shuriken 301 is moved in the direction of the control direction vector by an amount of movement in accordance with the control direction vector. Specifically, in step S69, the CPU 10 reads out the object data 323 and the control direction data 322, and calculates a position obtained by moving the position represented by the object data 323 in the direction of the control direction vector by an amount of movement in accordance with the control direction vector. Then, the position represented by the object data 323 is updated to the moved position, and the updated object data is stored in the main memory. Thus, the position of the shuriken 301 is updated, meaning that the shuriken 301 has been moved in the control direction. In this game example, the shuriken 301 is placed in an attitude in accordance with the control surface 302 as described above in step S66. Therefore, the shuriken 301 is launched in a direction determined by the control direction and in an attitude determined by the attitude of the control surface. If the magnitude of the control direction vector is smaller than a predetermined value, it is presumed that the player does not intend to perform an operation of drawing a line on the touch panel 52 (i.e., an operation of launching the shuriken 301). Therefore, in such a case, the CPU 10 may not launch the shuriken 301. The process of step S70 is performed, following step S69.

In step S70, the CPU 10 resets the control position. Specifically, the control position data 321 stored in the main memory is erased. Therefore, when a touch input is next made, control positions are stored afresh in step S65. After step S70, the CPU 10 ends the game control process.

With the game control process shown in FIG. 42, the attitude of the control surface 302 is controlled in accordance with the attitude of the hand-held device 9 (steps S61 and S62), and a control direction in accordance with the direction of a line inputted on the touch panel 52 is calculated on the control surface 302 (step S68). Therefore, the player can easily and intuitively specify a direction in a three-dimensional space by operating the attitude of the hand-held device 9 and by performing an operation on the touch panel 52.

In the game control process described above, the control direction is calculated as the average velocity of a plurality of control positions. The method for calculating a control direction from control positions is not limited to the method described above, but may be any method. For example, in a case in which the player makes an input by drawing a line as in this game example, the CPU 10 may calculate, as the control direction vector, a vector whose end point is the latest one of a plurality of control positions represented by the control position data 321 and whose start point is the second latest control position. The player may be allowed to specify the control direction by specifying two points on the touch panel 52. That is, the CPU 10 may calculate, as the control direction vector, a vector whose start point is a control position corresponding to an input position that is touched first and whose end point is a control position corresponding to an input position that is touched next.

Referring back to the main flow chart (steps S1 to S8), The process of step S4 is performed, following the game control process of step S3. In step S4, a television image is generated. Also in the third game example, the specific method for generating a television image is similar to that of the first game example. In the third game example, an image of the game space including the control surface 302 is generated as the television image (see FIG. 37). If the position and the attitude of the television virtual camera do not change even if the attitude of the control surface 302 changes as in the third game example, the player can easily grasp the attitude of the control surface 302 in the game space. The process of step S5 is performed, following step S4.

In step S5, a terminal image is generated based on the game control process. Also in the third game example, the specific method for generating a terminal image is similar to that of the first game example. In this game example, an image of the game space as seen from the terminal virtual camera set in step S62 is generated as the terminal image. Thus, an image of the control surface 302 is generated as the terminal image (see FIG. 37). The process of step S6 is performed, following step S5.

In the third game example, the processes of steps S6 to S8 are similar to those of the first game example. In the hand-held device 9, it is assumed that the process of receiving the image data and the sound transmitted from the game device 3 and outputting them to the display section and the lower LCD is similar to the process in the terminal device 7. Also in the third game example, the series of processes of steps S2 to S8 are performed repeatedly until it is determined in step S8 that the game should be ended, as in the first game example.

With the game process of the third game example described above, the attitude of the control surface 302 is determined by the attitude of the hand-held device 9, and the control direction on the control surface 302 is determined based on the input on the touch panel. Then, the shuriken 301 is launched in the determined control direction. Thus, according to this game example, the player can easily specify a direction in a three-dimensional space using the touch panel 52 through an intuitive operation.

Since the game process of the third game example calculates the control direction vector on the control surface 302, it is possible to control the amount of movement, in addition to the movement direction, of an object with the control direction vector. Therefore, it is possible to control an object in a more detailed manner using the hand-held device 9.

With the game process of the third game example, an image including the control surface 302 is displayed on the television 2 as the television image, the player can check the attitude and the launch direction of the shuriken 301 by the television image, and it is therefore possible to more easily perform the operation.

[9. Fourth Game Example]

A fourth game example to be performed by the game system 1 of the present embodiment will now be described with reference to FIGS. 43 to 46. The fourth game example is a game in which an object (cannonball) is launched in the game space by operating the hand-held device 9. The player can specify the direction in which the cannonball is launched by specifying (touching) a position on the touch panel 52 while changing the attitude of the hand-held device 9. Also in the fourth game example, as in the third game example, it is assumed that the game system 1 includes the hand-held device 9 which is a portable game device, instead of the terminal device V.

Figure 43:
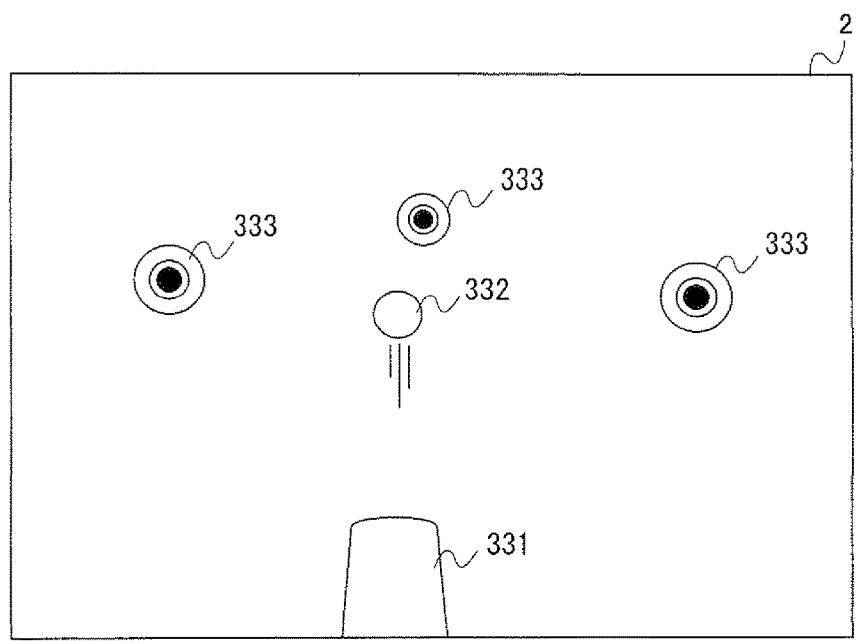
FIG. 43 is a diagram showing the example non-limiting screen of the television 2 and the hand-held device 9 in a fourth game example.
Figure 43:
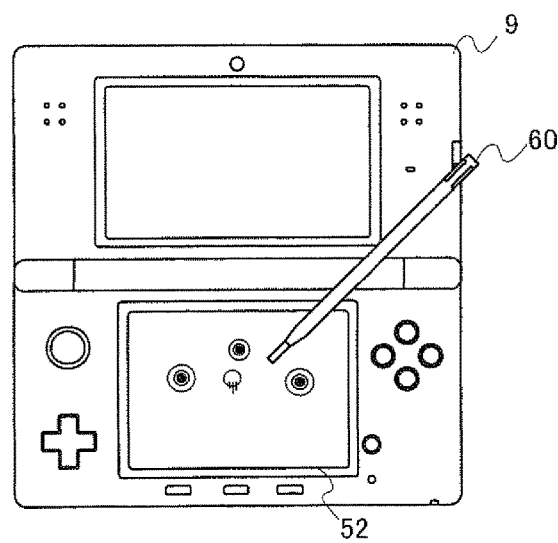

FIG. 43 is a diagram showing the screen of the television 2 and the hand-held device 9 in the fourth game example. In FIG. 43, an image of the game space is displayed as the game image on the television 2 and the lower LCD of the hand-held device 9. A cannon 331, a cannonball 332 and a target 333 are displayed on the television 2. The cannonball 332 and the target 333 are displayed on the lower LCD. In FIG. 43, the terminal image displayed on the lower LCD is an image of the game space as seen from the position of the cannon 331. Also in the fourth game example, a control surface is set in the game space as in the third game example, but the control surface is not displayed as opposed to the third game example. Therefore, in the present example, the player can play the game from a subjective viewpoint while looking at the lower LCD of the hand-held device 9. Although the image displayed on the television 2 may be an image seen from the same viewpoint as the lower LCD, it is possible to provide a game that makes use of two screens if an image seen from a different viewpoint is displayed. For example, if an area that cannot be seen on the lower LCD is displayed on the television 2, it is possible to realize such gameplay that the player can look at the television 2 and aim at an area that cannot be seen from the subjective viewpoint while hiding himself/herself. Although the gameplay will be different, an image from the subjective viewpoint may be displayed on the television 2, while the hand-held device is not provided with a screen and receives inputs on the touch pad.

When launching the cannonball 332 from the cannon 331, the player first operates the attitude of the hand-held device 9 to change the attitude of the control surface to an intended attitude. That is, also in the fourth game example, the attitude of the control surface is determined in accordance with the attitude of the hand-held device 9 as in the third game example. In the fourth game example, the position of the control surface changes (moves) in accordance with the attitude of the control surface, the details of which will be described later.

In the fourth game example, the player further performs an operation of touching an intended position on the touch panel 52 as shown in FIG. 43. Through this operation, a position in the game space corresponding to the input position (the control position on the control surface) is determined. Also in the fourth game example, the method for determining the control position is similar to the third game example.

Figure 44:
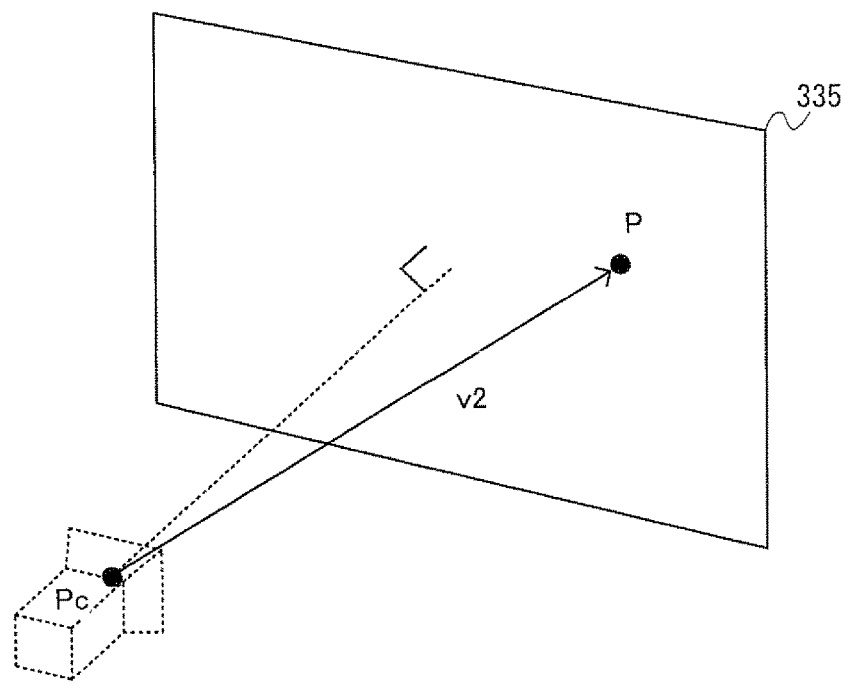
FIG. 44 is a diagram showing an example non-limiting virtual camera and a control surface in a game space.

In the fourth game example, the control direction is determined as a direction from the position of the terminal virtual camera to the control position. FIG. 44 is a diagram showing a virtual camera and a control surface in the game space. In FIG. 44, the point P represents the control position which is set on a control surface 335, and the vector v2 represents the control direction. In the fourth game example, as shown in FIG. 44, the control direction (the control direction vector v2) is calculated based on the position Pc of the terminal virtual camera and the control position P. Specifically, the control direction vector v2 is calculated as a vector whose start point is the position Pc of the terminal virtual camera and whose endpoint is the control position P. The cannonball 332 is launched in the calculated control direction.

As described above, in the fourth game example, the player can shoot the cannonball 332 in an intended direction by operating the attitude of the hand-held device 9 and specifying a position on the touch panel 52. Therefore, in the fourth game example, as in the third game example, the player can easily specify a direction in a three-dimensional space using the touch panel 52 through an intuitive operation. Since the operation of the attitude of the hand-held device 9 and the input operation on the touch panel 52 can be done simultaneously in parallel, the player can quickly perform an operation of specifying a direction in a three-dimensional space.

(Game Process in Fourth Game Example)

Next, the details of the game processes of the fourth game example will be described. First, referring to FIG. 41, various data used in the game process of the fourth game example will be described focusing on differences from the third game example.

Figure 45:
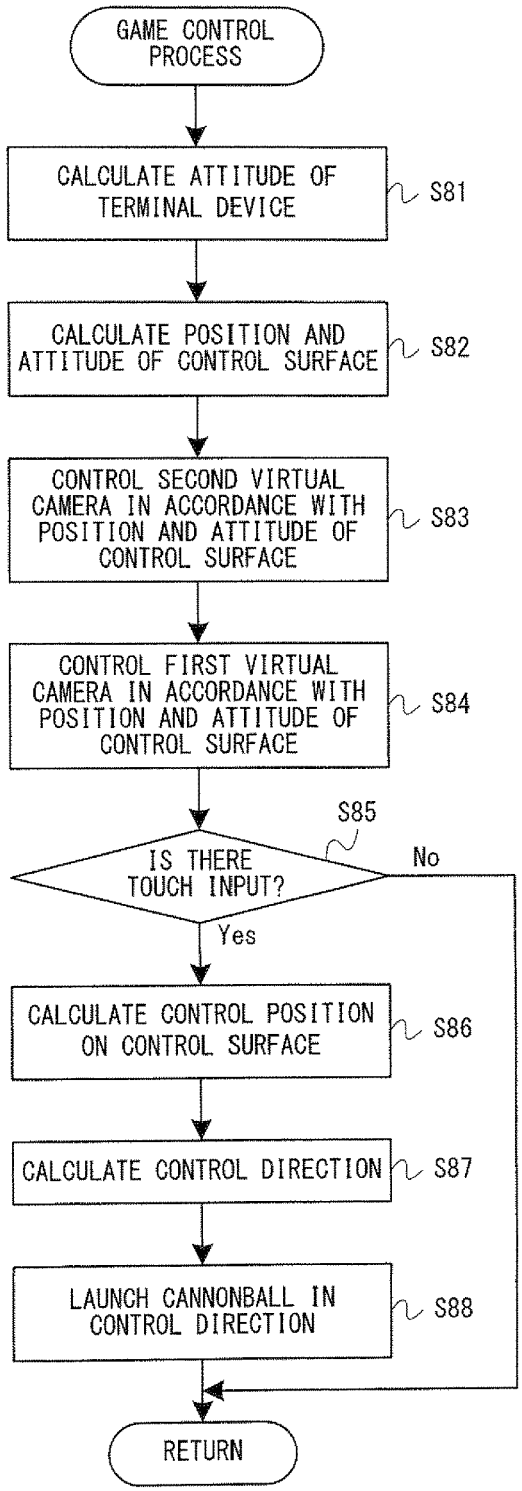
FIG. 45 is a flow chart showing a detailed flow of example non-limiting game control processes in the fourth game example.

In the fourth game example, a game program for performing a game process shown in FIG. 45 is stored in the game program 310. The terminal operation data 311 is similar to that of the third game example.

As the process data 316, data similar to that of the third game example is stored also in the fourth game example. Note however that the control position data 321 may be data that represents one latest control position in the fourth game example. The object data 323 represents the position of the cannonball 332.

Figure 46:
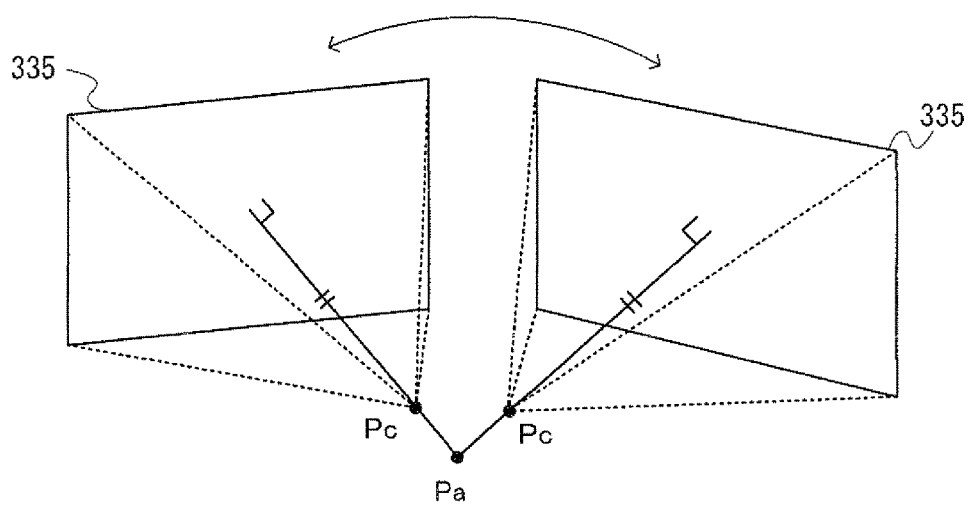
FIG. 46 is a diagram showing how the position and the attitude of a control surface 335 change.

Next, the details of the game process in the fourth game example will be described with reference to FIGS. 45 and 46. Also in the fourth game example, as in the third game example, the process of steps S1 to S8 shown in FIG. 42 is performed. The game process of the fourth game example will now be described focusing on differences from the game process of the third game example.

In step S1, the CPU 10 performs an initialization process similar to that of the third game example. Note however that in the fourth game example, the television virtual camera is controlled in accordance with the position and the attitude of the control surface (step S84 to be described below), and therefore the position and the attitude of the television virtual camera are not set in the initialization process. The process of step S2 in the fourth game example is similar to that of the third game example.

In step S3, the CPU 10 performs the game control process. The game control process of the fourth game example is a process for allowing the game to progress by, for example, performing processes such as controlling the action of an object (the cannonball 332, etc.) in the game space in accordance with operations by the player. The details of the game control process of the fourth game example will now be described with reference to FIG. 45. The game control process will be described below, focusing on the process relating to the calculation of the control direction, and processes that can be performed in a manner similar to the conventional processes will not be described in detail. For example, the detailed description will be omitted for the process relating to the movement control of the cannonball 332 after the cannonball 332 is launched in accordance with the control direction, the process for determining whether the cannonball 332 has hit the target 333, the process of calculating the score when the cannonball 332 has hit the target 333, etc., because these operations can be performed in a manner similar to the conventional processes.

FIG. 45 is a flow chart showing a detailed flow of game control processes of the fourth game example. In the game control process, first, in step S81, the CPU 10 calculates the attitude of the hand-held device 9. The process of step S81 is the same as the process of step S60 of the third game example. The process of step S82 is performed, following step S81.

In step S82, the CPU 10 calculates the position and the attitude of the control surface 335 based on the attitude of the hand-held device 9. The process of calculating the attitude of the control surface 335 based on the attitude of the hand-held device 9 is the same as the process of step S61 of the third game example. That is, also in the fourth game example, the attitude of the control surface 335 in the game space is set so as to correspond to the attitude of the hand-held device 9 in the real space.

The position of the control surface 335 is calculated as follows in accordance with the attitude of the control surface 335. FIG. 46 is a diagram showing how the position and the attitude of the control surface 335 change. In FIG. 46, the point Pa is a reference point for determining the position of the control surface 335 and is set fixedly in the game space. As shown in FIG. 46, when the attitude of the hand-held device 9 changes, the position of the control surface 335 changes as if to rotate about the reference point Pa as the attitude changes. Specifically, the position of the control surface 335 is calculated so that the length of the perpendicular from the reference point Pa to the control surface 335 is equal to a predetermined value (i.e., so that the distance from the reference point Pa is constant).

As a specific process of step S82, the CPU 10 first calculates the attitude of the control surface 335 by a method similar to step S61. Then, the CPU 10 calculates the position of the control surface 335 based on the calculated attitude and the position of the reference point Pa so that the length of the perpendicular is equal to the predetermined value. Data representing the position and the attitude of the calculated control surface 335 is stored in the main memory as the control surface data 320. The process of step S83 is performed, following step S82.

With the process of step S82, the control surface 335 is controlled so that the position of the control surface 335 changes together with the attitude thereof. By changing the position of the control surface 335 in accordance with the attitude of the hand-held device 9 about the position of the terminal virtual camera (or the position of a reference point), the player can perform game operations with such gameplay as if the player were looking around from a predetermined position. In other examples, it is possible to realize such gameplay as if to look at a particular position in the virtual space from different angles, for example. That is, the position of the terminal virtual camera may be changed in accordance with the attitude of the hand-held device 9 without changing the position of the control surface 335. The position of the control surface 335 and the position of the terminal virtual camera may be allowed to move in accordance with the attitude so that the player can perform game operations with such gameplay that the player can also change the line-of-sight direction while changing the viewpoint moving around in the virtual space.

In step S83, the CPU 10 controls the terminal virtual camera in accordance with the position and the attitude of the control surface 335. The point Pc shown in FIG. 46 is a point representing the position of the terminal virtual camera. As shown in FIG. 46, the terminal virtual camera is controlled so that the control surface 302 is included in the range of viewing field (more specifically, so that the periphery of the control surface 335 and the perimeter of the range of viewing field of the terminal virtual camera coincide with each other). Therefore, the position of the terminal virtual camera is calculated so as to be along a straight line passing through the reference point Pa and the center of the control surface 335 and so that the distance from the control surface 335 is in accordance with the range of viewing field. The terminal virtual camera only needs to be along the straight line, and it may be at a position behind the reference point Pa (on the side farther away from the control surface 335) depending on the range of viewing field (viewing angle).

By setting the terminal virtual camera as described above, the control surface 335 is displayed on the lower LCD so that the input surface of the touch panel 52 and the control surface 335 coincide with each other on the screen (see FIG. 43). Then, the cannonball 332 is launched toward a position in the game space corresponding to the position touched by the player, and it is therefore possible to provide intuitive and easy-to-understand game operations. Also in the fourth game example, as in the third game example, the terminal virtual camera is moved around in accordance with the change of the control surface 302 so that the positional relationship between the control surface 302 and the terminal virtual camera is constant.

As a specific process of step S83, the CPU 10 reads out the control surface data 320 from the main memory, and calculates the position and the attitude of the terminal virtual camera based on the position and the attitude of the control surface 335. Then, data representing the position and the attitude which have been calculated is stored in the main memory as the terminal camera data 319. The process of step S84 is performed, following step S83.

In step S84, the CPU 10 controls the television virtual camera in accordance with the position and the attitude of the control surface 335. In the fourth game example, the television virtual camera is included in the range of viewing field of the control surface 335 and is controlled so as to be at a position different from the terminal virtual camera (see FIG. 43). Specifically, the television virtual camera is placed so as to face toward the control surface 335 from a position slightly behind the cannon 331 so that the cannon 331 is displayed. It is assumed that the cannon 331 is placed at the position of the terminal virtual camera. As a specific process, the CPU 10 reads out the control surface data 320 from the main memory and calculates the position and the attitude of the television virtual camera so that the position and the attitude are in accordance with the position and the attitude of the control surface 335. Then, data representing the position and the attitude which have been calculated is stored in the main memory as the television camera data 318. The process of step S85 is performed, following step S84.

With the process of step S84, the television virtual camera is placed at a position different from the terminal virtual camera. Thus, the player can see the game space as seen from two different viewpoints, and can more easily perform the game operations. For example, since the television virtual camera is placed so as to capture an image of a larger area of the game space than the terminal virtual camera in the fourth game example (see FIG. 43), the player can more easily grasp how things are in the game space (the placement of the objects, etc.) by looking at the television image.

By making the positions of the two virtual cameras different from each other, it is possible to also improve the playability of the game. For example, if a wall is placed between the cannon 331 and the target 333 (so that the target 333 are not seen from the terminal virtual camera) with the television virtual camera placed at a position above the wall where the target 333 can be seen, the target 333 can be displayed only on the television 2. In this case, the player performs game operations while visually comparing the screen of the hand-held device 9 and the screen of the television 2 with each other, and the playability of the game can be thus enhanced. In other embodiments, the position and the attitude of the television virtual camera may be controlled in any way, and the television virtual camera may be placed at such a position the control surface 335 cannot be seen or the position and the attitude thereof may be set to be equal to those of the terminal virtual camera (i.e., only one virtual camera may be set).

In step S85, the CPU 10 determines whether there has been an input on the touch panel 52 (a touch input). The process of step S85 is the same as the process of step S63 of the third game example. If the determination result of step S85 is affirmative, the process of step S86 is performed. If the determination result of step S85 is negative, the CPU 10 ends the game control process.

In step S86, the CPU 10 calculates the control position on the control surface 335 based on the input position. The method for calculating the control position of step S86 is the same as the calculation method of step S64 of the third game example. In the fourth game example, the control direction is calculated based on the latest control position. Therefore, in step S86, the CPU 10 stores data representing the calculated control position in the main memory as the control position data 321. The process of step S87 is performed, following step S86.

In step S87, the CPU 10 calculates the control direction based on the control position calculated in step S86. The control direction is calculated as a direction that connects between a predetermined position in the game space and the control position. In the fourth game example, the control direction is calculated as a direction from the position of the terminal virtual camera (the cannon 331) to the control position (see FIG. 44). Specifically, the CPU 10 reads out the terminal camera data 319 and the control position data 321 from the main memory, and calculates the control direction vector v2 whose start point is the position of the terminal virtual camera and whose end point is the control position. Data representing the calculated control direction vector v2 is stored in the main memory as the control direction data 322. The process of step S88 is performed, following step S87.

In step S87, the position of the terminal virtual camera is used as the predetermined position. In other embodiments, the predetermined position may be a different position. For example, the predetermined position may be the position of the reference point Pa shown in FIG. 46, or the position of a particular object. If a position other than the position of the virtual camera is used as the predetermined position, the object (the cannonball 332) appears to be launched from a position different from the viewpoint. If the start point of the control direction is made to coincide with the viewpoint of the terminal image as in the fourth game example, the player can perform an operation of launching the cannonball from a subjective viewpoint, and it is possible to provide easier game operations.

In step S88, the CPU 10 launches the cannonball 332 in the control direction calculated in step S87. In the fourth game example, the cannonball 332 is moved in a predetermined movement direction with a predetermined velocity (a predetermined amount of movement). The predetermined movement direction is a direction determined by the control direction, and is a direction that is facing upward by a predetermined angle from the control direction. In the fourth game example, it is assumed that the launched cannonball 332 is controlled so as to describe a parabola taking gravity into consideration. In a case in which the cannonball 332 flies so as to describe a parabola, if the cannonball 332 is launched in the control direction, the player may feel that the cannonball 332 is launched in a direction slightly downward from the control direction. Therefore, in the fourth game example, the CPU 10 launches the cannonball 332 in a direction that is more upward than the control direction by a predetermined angle. Thus, the movement direction of the object may be any direction that is determined by the control direction, and does not need to coincide with the control direction.

As a specific process of step S88, the CPU 10 reads out the control direction data 322, and calculates the movement direction of the cannonball 332 from the control direction. Then, the CPU 10 reads out the object data 323 and calculates a position obtained by moving the position represented by the object data 323 by a predetermined amount of movement in the movement direction calculated. Then, the position represented by the object data 323 is updated to the moved position, and the updated object data is stored in the main memory. Thus, the position of the cannonball 332 is updated, meaning that the cannonball 332 has been moved in the control direction. After step S88, the CPU 10 ends the game control process.

Following the game control process, the process of steps S3 to S8 is performed also in the fourth game example as in the third game example. That is, the television image is generated in step S4, and the terminal image is generated in step S5. Moreover, the television image is displayed on the television 2 in step S6, and the terminal image is displayed on the lower LCD of the hand-held device 9 in step S7. In the fourth game example, the game space is displayed (the control surface 335 is not displayed) on the lower LCD so that the input surface of the touch panel 52 and the control surface 335 coincide with each other on the screen, and the game space of a wider area than the lower LCD is displayed on the television 2 (see FIG. 43). It is determined in step S8 whether the game should be ended, and the series of processes through steps S2 to S8 is repeatedly performed until it is determined in step S8 that the game should be ended.

With the game process of the fourth game example described above, the attitude of the control surface 335 is determined by the attitude of the hand-held device 9, and the control position on the control surface 302 is determined based on the input on the touch panel. Then, the cannonball 332 of the cannon 331 is launched in the control direction determined by the control position. Thus, according to this game example, the player can easily specify a direction in a three-dimensional space using the touch panel 52 through an intuitive operation.

(Variation of Third and Fourth Game Examples)

In the third and fourth game examples, the CPU 10 performs a game process in which the movement direction of a predetermined object (the shuriken 301 or the cannonball 332) in the game space is controlled based on the control direction. The game process is not limited to the game process for controlling the movement direction of an object, and the CPU 10 may perform any game process based on the control direction. For example, in other embodiments, the CPU 10 may perform a predetermined process on an object that is placed along a straight line extending from a predetermined position (e.g., from the position of the virtual camera) to the control direction.

While the third and fourth game examples are directed to examples in which the hand-held device 9 includes the touch panel 52, the hand-held device 9 may include a touch pad as described above. If the hand-held device 9 includes a touch pad, the hand-held device 9 may or may not include a display device.

The touch panel or the touch pad may be those of a type (so-called multi-touch) capable of detecting a plurality of input positions that are inputted simultaneously. In this case, in the examples described above, the CPU 10 may calculate the control position and the control direction for each input position. Specifically, in the game control process shown in FIG. 42, the CPU 10 may perform the process of steps S64 to S66 and the process of steps S68 to S70 for each input position. In the game control process shown in FIG. 45, the CPU 10 may perform the process of steps S86 to S88 for each input position.

In the third and fourth game examples, the control surface is controlled by an operation of tilting (changing the attitude of) the hand-held device 9 itself. That is, the CPU 10 calculates the attitude of the hand-held device 9 based on data whose values change in accordance with the movement of the hand-held device 9 (the acceleration data 312 and the angular velocity data 313), and controls the control surface based on the attitude of the hand-held device 9. The control surface may be controlled so that at least the attitude thereof changes in accordance with the movement of the hand-held device 9. For example, in other embodiments, the control surface may be controlled in accordance with the change in the position of the hand-held device 9. Specifically, the CPU 10 can calculate the change in the position of the hand-held device 9 based on an acceleration obtained by removing the gravitational acceleration from the acceleration represented by the acceleration data 312. Therefore, for example, in the process of step S61 or S82, the CPU 10 may change the position and/or the attitude of the control surface in accordance with the change in the position of the hand-held device 9 (e.g., the control surface may be tilted in a direction in accordance with the direction in which the position of the hand-held device 9 has changed). Then, the position and/or the attitude of the control surface can be changed by moving the hand-held device 9 up, down, left or right.

[10. Variation]

The above embodiment is an example of systems, devices, storage mediums, and methods that can be carried out, and systems, devices, storage mediums, and methods may also be carried out with, for example, the following configurations in other embodiments.

(Other Applications of Input System)

The game examples above are each directed to the game system 1 in which a player performs game operations using a controller device (the terminal device 7 or the hand-held device 9), as an example of the position calculation system for calculating a three-dimensional position in a virtual space. In other embodiments, the position calculation system is not limited to game applications, but may be applied to any information processing system for calculating a three-dimensional position in a virtual space based on operations on a controller device.

(Variation Regarding Surface Set in Virtual Space)

In the game examples above, the surface (control surface) set in a three-dimensional virtual space is a flat surface. In other embodiments, the surface set in the three-dimensional virtual space may be a curved surface. For example, in a case in which the surface is controlled so as to move along a spherical surface or the side surface of a cylinder (FIGS. 30 to 32), a curved surface extending along the spherical surface or the cylinder side surface may be set. In the game examples above, the surface has the same shape as the shape of the display screen of the terminal device 7, the shape of the surface and the shape of the display screen may be different from each other. In a case in which the surface is a flat surface and the surface is controlled so as to move in a direction parallel to the surface itself, as in the first game example, the range over which the user can specify a position is the range within the flat surface in the three-dimensional space (a range that does not have a dimension in the depth direction). In contrast, in a case in which the surface is a flat surface and the surface is controlled so as to move in a direction that is not parallel to the surface itself, as in the second to fourth game examples, the range over which the user can specify a position is a three-dimensional range in a three-dimensional space (a range that has dimensions in the vertical, horizontal and depth directions). Since the surface is a flat surface, the correspondence between the position on the input surface and the position on the surface is easy to understand for the user, and therefore it is easy to perform the operation of inputting a three-dimensional position. In a case in which the surface is a curved surface, the range over which the user can specify a position is a three-dimensional range in a three-dimensional space (a range that has dimensions in the vertical, horizontal and depth directions) even if the surface translates in accordance with the attitude of the terminal device 7.

In the game examples above, at least the attitude of the surface is controlled in accordance with the attitude of the terminal device 7. In other embodiments, it is only required that the surface is determined in a virtual space in accordance with the movement of the terminal device 7, and the game system 1 may be such that at least one of the position, the attitude and the shape of the surface changes in accordance with the movement of the terminal device 7. Then, the range over which a position can be specified by an input on the input surface (the range on the surface) changes in accordance with the movement of the terminal device 7, thus allowing the user to specify a three-dimensional position. The "movement of the terminal device 7" as used herein includes the position or the attitude of the terminal device 7, and changes thereof.

(Variation Regarding Configuration of Game System)

In the second game example, the game system 1 includes the portable terminal device 7 and the television 2 as display devices. As long as the game system has a configuration including a controller device that can be held by a user (player), the game system 1 may have a configuration in which the image is displayed on one display device (e.g., the television 2) while the image is not displayed on the terminal device 7 in other embodiments, for example. The game system 1 may include two display devices different from the terminal device 7. Then, the television image of the second game example is displayed on one of the display devices, and the terminal image is displayed on the other display device.

Although the game system 1 includes the controller 5 as a controller device different from the terminal device 7, it may not include the controller 5 in other embodiments. In other embodiments, the controller 5 may be used further as a controller device, in addition to the terminal device 7. For example, when a player draws a drawing in a virtual space by drawing a line on the touch panel 52 using the terminal device 7, the game device 3 may move or deform the drawing in accordance with operations on the controller 5.

The position calculation system for calculating a three-dimensional position in a virtual space is not limited to a system implemented with a plurality of devices, but may be implemented by a single device. For example, the position calculation system may be implemented by a portable information processing device (which may be a game device) including a display section and an input device (a touch panel, a touch pad, etc.) with which an input can be made on the input surface. Then, the information processing device displays the terminal image of the second game example on the display screen including the touch panel provided thereon, and displays the television image of the second game example on the other display screen. The information processing device may include a sensor (e.g., a gyrosensor or an acceleration sensor) for detecting the physical quantity for calculating the attitude of itself.

(Variation Regarding Method for Detecting Input Position on Input Surface)

In the game examples above, the controller device (the terminal device 7 or the hand-held device 9) includes the touch panel 52 provided on the front screen of the LCD, as an example of the position detection section for detecting the input position on a predetermined input surface. In other embodiments, the position detection section may be a touch pad, for example. That is, the terminal device 7 and the hand-held device 9 may include a touch pad without the display section (the LCD 51) and the touch panel 52. The controller device may display a cursor on the LCD, move the cursor in accordance with a predetermined direction input operation (e.g., an operation on an analog stick or a cross button), and use the position of the cursor as the input position.

(Variation Regarding Information Processing Device for Performing Game Processes)

While the game device 3 performs the series of game processes performed in the game system 1 in the game examples above, some of the game processes may be performed by another device. For example, in other embodiments, some of the game processes (e.g., the process of generating the terminal image) may be performed by the terminal device 7. In other embodiments, in a position calculation system including a plurality of information processing devices that can communicate with each other, the game processes may be divided among the plurality of information processing devices.

In a case in which the information processes are performed by a plurality of information processing devices, the processes performed by different information processing devices need to be synchronized with each other, thus complicating the information processes. In contrast, in a case in which information processes are performed by one game device 3 and the terminal device 7 receives and displays images (that is, a case in which the terminal device 7 or the hand-held device 9 functions as a thin client terminal) as in the game examples above, it is not necessary to synchronize information processes between a plurality of information processing devices, and it is possible to simplify the information processes.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g. wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs.

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

As described above, the systems, devices, storage mediums, and methods described herein are applicable to, for example, a game system, a game device or an information processing program with the aim of, for example, making it possible to easily specify a position in a three-dimensional space.

While the systems, devices, storage mediums, and methods have been described in detail, the foregoing description is in all aspects illustrative and not restrictive. It is understood that numerous other modifications and variations can be devised.

What is claimed is:

1. A position calculation system for calculating a position in a three-dimensional virtual space based on an operation on a controller device, comprising:
a processing system having at least one processor and configured to at least:
calculate the position on a virtual surface in the three-dimensional virtual space based on an attitude of the controller device and an input position on an input surface of the controller device, the input surface including a touch sensitive display surface, at least an attitude and/or a position of the virtual surface in the three-dimensional virtual space corresponding to the attitude of the controller device.

2. The position calculation system according to claim 1, comprising the controller device and an information processing device, wherein:
the controller device is configured to:
detect an input position on the input surface;
output data for calculating the attitude; and
transmit outputted data to the information processing device; and
the information processing device configured to:
calculate the attitude of the controller device based on data outputted from the controller device; and
calculate the position in the virtual space based on the attitude and the input position.

3. The position calculation system according to claim 2, wherein the controller device includes an inertial sensor.

4. The position calculation system according to claim 1, wherein the controller device further comprises a display device, having at least the touch sensitive display surface, for displaying an image representing the virtual space.

5. The position calculation system according to claim 1, wherein the processing system further configured to calculate, as the position in the virtual space, a position on the virtual surface which is determined in accordance with the attitude of the controller device in the virtual space, based on the input position.

6. The position calculation system according to claim 5, wherein the processing system further configured to set the virtual surface so that the attitude of the virtual surface changes in accordance with the attitude of the controller device.

7. The position calculation system according to claim 5, wherein:
the controller device comprises:
a display device configured to display an image representing a virtual space including an area of the virtual surface; and
a touch panel provided on a screen of the display device,
the position on the virtual surface, which is calculated based on the input position, is calculated so that the input position on the touch panel and the position on the virtual surface coincide with each other on the screen.

8. The position calculation system according to claim 1, wherein the processing system further configured to perform a predetermined process using the position in the virtual space associated with the input position as an input.

9. The position calculation system according to claim 8, wherein the processing system further configured to identify one of a plurality of areas set in the virtual space that includes the position in the virtual space associated with the input position, and cause a predetermined sound output device to output a sound associated with the identified area.

10. The position calculation system according to claim 9, wherein:
the plurality of areas are arranged in a generally arc shape;
the virtual surface is set in the virtual space so that the virtual surface moves along the plurality of areas in accordance with a change in the attitude of the controller device; and
a position on the virtual surface is calculated based on the input position.

11. The position calculation system according to claim 8, wherein the processing system further configured to:
set the predetermined object in the virtual space;
generate an image representing the virtual space including the predetermined object as an image to be displayed on a predetermined display device; and
perform the predetermined process when the position in the virtual space associated with the input position is calculated to be a position of the predetermined object.

12. The position calculation system according to claim 11, wherein the processing system further configured to:
generate, as an image to be displayed on a display device of the controller device, an image representing a partial region of the object so that the region changes in accordance with the attitude of the controller device; and
generate, as an image to be displayed on another display device separate from the display device of the controller device, an image representing a larger region of the object than the partial region.

13. The position calculation system according to claim 1, wherein the processing system further configured to:
place, in the virtual space, an object whose attitude is controlled so as to correspond to the attitude of the controller device; and
generate, as an image to be displayed on a predetermined display device, an image representing the virtual space including the object.

14. The position calculation system according to claim 1, wherein:
the controller device includes a display device for displaying keys arranged in the virtual space; and
when the position in the virtual space associated with the input position is calculated to be a position of one of the keys, a predetermined sound output device outputs a sound associated with the key corresponding to the position.

15. The position calculation system according to claim 1, wherein the virtual surface in the virtual space being movable along a first, a second, and a third axis based on the attitude of the controller device.

16. The position calculation system according to claim 1, wherein the position in the virtual space along a first axis and a second axis is determined based on the input position on the input surface of the touch sensitive display surface of the controller device, and the position in the virtual space along a third axis is determined based on the attitude of the controller device.

17. A position calculation method for calculating a position in a three-dimensional virtual space based on an operation on a controller device, comprising:
    calculating the position on a virtual surface in the three-dimensional virtual space based on an attitude of the controller device and an input position on an input surface of the controller device, the input surface including a touch sensitive display surface, at least an attitude and/or a position of the virtual surface in the three-dimensional virtual space corresponding to the attitude of the controller device.

18. The position calculation method according to claim 17, wherein the position calculation method is carried out in a system including the controller device and an information processing device, the method further comprising:
    detecting the input position on the input surface;
    transmitting data of the input position and data for calculating the attitude to the information processing device;
    calculating the attitude of the controller device based on the data for calculating the attitude; and
    calculating the position in the virtual space based on the attitude and the input position.

19. The position calculation method according to claim 17, further comprising displaying an image representing the virtual space on a display device of the controller device.

20. The position calculation method according to claim 17, further comprising calculating, as the position in the virtual space, a position on the virtual surface which is determined in accordance with the attitude of the controller device in the virtual space, based on the input position.

21. The position calculation method according to claim 20, further comprising setting the virtual surface so that the attitude of the virtual surface changes in accordance with the attitude of the controller device.

22. The position calculation method according to claim 20, wherein:
    the controller device comprises:
        a display device configured to display an image representing a virtual space including an area of the virtual surface; and
        a touch panel provided on a screen of the display device,
    the position on the virtual surface, which is calculated based on the input position, is calculated so that the input position on the touch panel and the position on the virtual surface coincide with each other on the screen.

23. The position calculation method according to claim 17, further comprising performing a predetermined process using the position in the virtual space associated with the input position as an input.

24. The position calculation method according to claim 23, further comprising identifying one of a plurality of areas set in the virtual space that includes the position in the virtual space associated with the input position, and outputting a sound associated with the identified area to a predetermined sound output device.

25. The position calculation method according to claim 24, wherein:
    the plurality of areas are arranged in a generally arc shape;
    the virtual surface is set in the virtual space so that the virtual surface moves along the plurality of areas in accordance with a change in the attitude of the controller device; and
    a position on the virtual surface is calculated based on the input position.

26. The position calculation method according to claim 23, further comprising:
    setting the predetermined object in the virtual space;
    generating, as an image to be displayed on a predetermined display device, an image representing the virtual space including the predetermined object; and
    performing the predetermined process when the position in the virtual space associated with the input position is calculated to be a position of the predetermined object.

27. The position calculation method according to claim 26, further comprising:
    generating, as an image to be displayed on a display device of the controller device, an image representing a partial region of the object so that the region changes in accordance with the attitude of the controller device; and
    generating, as an image to be displayed on another display device separate from the display device of the controller device, an image representing a larger region of the object than the partial region.

28. The position calculation method according to claim 17, further comprising:
    placing, in the virtual space, an object whose attitude is controlled so as to correspond to the attitude of the controller device; and
    generating, as an image to be displayed on a predetermined display device, an image representing the virtual space including the object.

29. The position calculation method according to claim 17, wherein:
    keys arranged in the virtual space are displayed on a display device of the controller device; and
    when the position in the virtual space associated with the input position is calculated to be a position of one of the keys, a predetermined sound output device outputs a sound associated with the key corresponding to the position.

30. A position calculation device for calculating a position in a three-dimensional virtual space based on an operation on a controller device and comprising at least one processor, the position calculation device configured to at least:
    calculate the position on a virtual surface in the three-dimensional virtual space based on an attitude of the controller device and an input position on an input surface of the controller device, the input surface including a touch sensitive display surface, at least an attitude and/or a position of the virtual surface in the three-dimensional virtual space corresponding to the attitude of the controller device.

31. The position calculation device according to claim 30, wherein:
    an image representing keys arranged in the virtual space is generated as an image to be displayed on a display device of the controller device; and
    when the position in the virtual space associated with the input position is calculated to be a position of one of the keys, a sound associated with the position is generated as a sound to be outputted from a predetermined sound output device.

32. A non-transitory computer-readable storage medium comprising a position calculation program executable on a computer of a position calculation device for calculating a position in a three-dimensional virtual space based on an operation on a controller device, wherein the position calculation program causes the computer to:

calculate the position on a virtual surface in the three-dimensional virtual space based on an attitude of the controller device and an input position on an input surface of the controller device, the input surface including a touch sensitive display surface, at least an attitude and/or a position of the virtual surface in the three-dimensional virtual space corresponding to the attitude of the controller device.

33. The non-transitory storage medium according to claim 32, wherein the position calculation program further causes the computer to:

generate, as an image to be displayed on a display device of the controller device, an image representing keys arranged in the virtual space; and generate, when the position in the virtual space associated with the input position is calculated to be a position of one of the keys, a sound associated with the key corresponding to the position as a sound to be outputted from a predetermined sound output device.

34. A position calculation system for calculating a position in a three-dimensional virtual space based on an operation on a controller device, comprising:

a processing system having at least one processor and configured to at least:

calculate an input position made to a touch sensitive display surface of the controller device using an input device;

calculate an attitude of the controller device using at least one inertial sensor disposed within a housing of the controller device;

calculate a position in the three-dimensional virtual space along a three-dimensional axis, the position along a first axis and a second axis corresponding to the calculated input position and the position along a third axis corresponding to the calculated attitude of the controller device.

35. The position calculation system according to claim 34, wherein the position corresponding to an input coordinate position in the three-dimensional virtual space, the input coordinate position along the first axis and the second axis corresponding to the calculated input position and the input coordinate position along the third axis corresponding to the calculated attitude of the controller device.

36. The position calculation system according to claim 34, the position in the virtual space corresponds to a position on a virtual surface, the virtual surface having an attitude corresponding to the attitude of the controller device and the position on the virtual surface corresponding to the calculated input position.

* * * * *